July 24, 1962 J. E. OSTLINE ET AL 3,046,342

AUTOMATIC TOLL TICKETING TELEPHONE SYSTEM

Filed April 3, 1957 33 Sheets-Sheet 1

INVENTORS
John E. Ostline
Jack W. Taugner
BY
C. A. Gulbrandsen
ATTY

July 24, 1962 J. E. OSTLINE ETAL 3,046,342

AUTOMATIC TOLL TICKETING TELEPHONE SYSTEM

Filed April 3, 1957 33 Sheets-Sheet 2

INVENTORS.
John E. Ostline
Jack W. Taugner

BY

C. A. Gullbrandsen

ATTY.

July 24, 1962 J. E. OSTLINE ETAL 3,046,342

AUTOMATIC TOLL TICKETING TELEPHONE SYSTEM

Filed April 3, 1957 33 Sheets-Sheet 3

INVENTORS.
John E. Ostline
Jack W. Taugner

BY C. A. Gulbrandsen

ATTY

July 24, 1962 J. E. OSTLINE ETAL 3,046,342

AUTOMATIC TOLL TICKETING TELEPHONE SYSTEM

Filed April 3, 1957 33 Sheets-Sheet 4

INVENTORS
John E. Ostline
Jack W. Taugner
BY
C. A. Gulbrandsen
ATTY.

INVENTORS.
John E. Ostline
Jack W. Taugner
BY
C. A. Gulbrandsen
ATTY

INVENTORS.
John E. Ostline
Jack W. Taugner
BY
C. A. Gulbrandsen
ATTY.

INVENTORS.
John E. Ostline
Jack W. Taugner
BY
C. A. Gulbrandsen
ATTY.

July 24, 1962 J. E. OSTLINE ETAL 3,046,342

AUTOMATIC TOLL TICKETING TELEPHONE SYSTEM

Filed April 3, 1957 33 Sheets-Sheet 8

INVENTORS.
John E. Ostline
Jack W. Taugner
BY
C. A. Gulbrandsen
ATTY.

AUTOMATIC TOLL TICKETING TELEPHONE SYSTEM

Filed April 3, 1957 33 Sheets-Sheet 9

INVENTORS.
John E. Ostline
Jack W. Taugner

BY

C. A. Gulbrandsen

ATTY

July 24, 1962 J. E. OSTLINE ETAL 3,046,342

AUTOMATIC TOLL TICKETING TELEPHONE SYSTEM

Filed April 3, 1957 33 Sheets-Sheet 10

INVENTORS.
John E. Ostline
Jack W. Taugner
BY
C. A. Gulbrandsen
ATTY.

AUTOMATIC TOLL TICKETING TELEPHONE SYSTEM

Filed April 3, 1957

INVENTORS.
John E. Ostline
Jack W. Taugner
BY
C. A. Gulbrandsen
ATTY.

AUTOMATIC TOLL TICKETING TELEPHONE SYSTEM

Filed April 3, 1957 33 Sheets-Sheet 12

INVENTORS.
John C. Ostline
Jack W. Taugner
BY
C. A. Gulbrandsen
ATTY.

AUTOMATIC TOLL TICKETING TELEPHONE SYSTEM

Filed April 3, 1957

INVENTORS.
John E. Ostline
Jack W. Taugner
BY
C. A. Gulbrandsen
ATTY.

AUTOMATIC TOLL TICKETING TELEPHONE SYSTEM

Filed April 3, 1957 33 Sheets-Sheet 14

INVENTORS.
John E. Ostline
Jack W. Taugner
BY
C. A. Gulbrandsen
ATTY.

AUTOMATIC TOLL TICKETING TELEPHONE SYSTEM

Filed April 3, 1957 33 Sheets-Sheet 15

INVENTORS.
John E. Ostline
Jack W. Taugner
BY
C. A. Gulbrandsen
ATTY.

INVENTORS.
John E. Ostline
Jack W. Taugner
BY C. A. Gulbrandsen
ATTY.

AUTOMATIC TOLL TICKETING TELEPHONE SYSTEM

Filed April 3, 1957

INVENTORS
John E. Ostline
Jack W. Taugner

BY C. A. Gulbrandsen

ATTY.

INVENTORS
John E. Ostline
Jack W. Taugner
BY
C. A. Gulbrandsen
ATTY.

AUTOMATIC TOLL TICKETING TELEPHONE SYSTEM

Filed April 3, 1957 33 Sheets-Sheet 19

INVENTORS.
John E. Ostline
Jack W. Taugner
BY
C. A. Gulbrandsen
ATTY.

AUTOMATIC TOLL TICKETING TELEPHONE SYSTEM

INVENTORS.
John C. Ostline
Jack W. Taugner
BY
C. A. Gulbrandsen
ATTY.

AUTOMATIC TOLL TICKETING TELEPHONE SYSTEM

Filed April 3, 1957 33 Sheets-Sheet 21

INVENTORS.
John C. Ostline
Jack W. Tauguer
BY
C. A. Gulbrandsen
ATTY.

INVENTORS.
John C. Ostline
Jack W. Taugner
BY
C. A. Gulbrandsen
ATTY.

INVENTORS.
John E. Ostline
Jack W. Taugner
BY
C. A. Gulbrandsen
ATTY.

AUTOMATIC TOLL TICKETING TELEPHONE SYSTEM

Filed April 3, 1957 33 Sheets-Sheet 24

INVENTORS.
John E. Ostline
Jack W. Taugner
BY
C. A. Gulbrandsen
ATTY.

INVENTORS.
John E. Ostline
Jack W. Taugner

BY C. A. Gulbrandsen

ATTY.

INVENTORS.
John E. Ostline
Jack W. Taugner
BY
C. A. Gulbrandsen
ATTY

AUTOMATIC TOLL TICKETING TELEPHONE SYSTEM

Filed April 3, 1957 33 Sheets-Sheet 27

INVENTORS.
John E. Ostline
Jack W. Taugner
BY
C. A. Gulbrandsen
ATTY.

INVENTORS
John C. Ostline
Jack W. Taugner
BY C. A. Gulbrandsen
ATTY.

INVENTORS
John E. Ostline
Jack W. Taugner
BY C. A. Gulbrandsen
ATTY.

INVENTORS.
John E. Ostline
Jack W. Taugner
BY
C. A. Gulbrandsen
ATTY.

July 24, 1962 J. E. OSTLINE ET AL 3,046,342

AUTOMATIC TOLL TICKETING TELEPHONE SYSTEM

Filed April 3, 1957 33 Sheets-Sheet 31

INVENTORS.
John E. Ostline
Jack W. Taugner
BY
C. A. Gulbrandsen
ATTY.

INVENTORS.
John E. Ostline
Jack W. Taugner
BY C. A. Gulbrandsen
ATTY.

INVENTORS.
John E. Ostline
Jack W. Taugner
BY
C. A. Gulbrandsen
ATTY.

United States Patent Office 3,046,342
Patented July 24, 1962

3,046,342
AUTOMATIC TOLL TICKETING TELEPHONE SYSTEM

John E. Ostline, Chicago, and Jack W. Taugner, Park Ridge, Ill., assignors to Automatic Electric Laboratories, Inc., a corporation of Delaware
Filed Apr. 3, 1957, Ser. No. 650,508
9 Claims. (Cl. 179—7.1)

The present invention relates in general to automatic telephone systems and more particularly to improvements in automatic toll ticketing telephone systems arranged to produce an individual record of certain items of information pertaining to each toll telephone connection so that an appropriate charge may be assessed against the calling subscriber.

In prior automatic toll ticketing telephone networks of the type disclosed in the Ostline, Coleman and Taugner patent application, Serial No. 628,474, now U.S. Patent No. 3,019,295, toll ticketing telephone connections are established under the control of common equipment accessed by a code dialled into the local switch train by the calling subscriber. The common equipment usually includes a toll ticket repeater, a calling line directory number detector, a translator-sender circuit to insure that the digits are properly dialled into the succeeding exchange and a tabulator with its associated daters and ticket perforators to compile the data relating to the call and make a record of it. This type of ticketing equipment has met with great success when used in offices of moderate size. To further increase the economics offered by systems of this general type, the equipment has been improved so that the advantages of toll ticketing may be extended to other exchanges in a network without entailing the duplication of all of the equipment. This is performed by using only a detector and simplified ticketing trunk repeater in each branch exchange of a network having access to the centralized ticketing equipments. This improved dual type ticketer, installed in a main office, is used for the processing of subscriber dialled toll calls from that office as well as from stations served by the branch offices. This eliminates the need for ticketing repeaters, translator-senders and tabulators with their associated equipment in each smaller branch office, and concentrates record of calls from such offices at a central point.

Full automatic identification of calling station numbers in both main and branch offices and the recording of such numbers in the main exchange are provided.

Automatic toll ticketing apparatus of the type noted above is particularly useful in moderate sized exchanges in the vicinity of 10,000 stations or smaller and in areas where there are a number of urban centers of comparable size. Occasionally, due to light toll traffic from certain of the exchanges in a network, it may be uneconomical to install even the simplified equipment required for a branch exchange to permit a central exchange to automatically ticket all calls therefrom. Under such conditions it is still desirable to have direct dialling between the exchanges of the network and of course the inherent economies of the automatic ticketing operation from the main office and these branch offices that warrant such service. To provide the automatic ticketing functions and still permit the direct dialling between all exchanges of a network required the central ticketing equipment to accept calls from exchanges with the simplified equipment and those not having any type of toll ticketing equipment.

Accordingly, it is the main object of the present invention to provide an automatic toll ticketing telephone system for use in telephone networks including relatively remote small exchanges in which it is not economical to install any type of toll ticketing equipment, but whose calls it is desired to ticket in a central ticketing office by means of its automatic ticketing equipment.

It is still another object of the invention to provide new and improved circuits and apparatus for accomplishing the above ticketing operations.

It is still another object of the invention to provide in a telephone system improved toll ticketing repeaters which are directly controllable by calling subscriber dials to register the items of record information pertinent to each toll ticketing connection, and to record this information as it is transmitted to the ticket repeaters by the calling subscribers.

It is still another object of the invention to provide means in the toll ticketing repeater for working in conjunction with automatic subscriber directory number detecting apparatus and to register this detected directory number in the toll ticket repeater, or to route the call to an operator for obtaining the subscriber's directory number when the call is from an exchange not equipped with automatic directory number detecting apparatus.

It is still another object of the invention to provide an improved toll ticketing repeater of the type noted which is arranged to be accessible from both local selectors and incoming trunk lines from a branch exchange when the calling subscriber's directory number is to be automatically detected and from an incoming selector when the subscriber's directory number is to be obtained by an operator.

Further objects and features of the present invention pertain to the particular arrangement of the various circuit elements of the automatic toll ticketing telephone system, whereby the above objects and additional operating features are attained.

The invention, both as to its organization and method of operation, together with further objects and advantages thereof will best be understood by reference to the following specification taken in connection with the accompanying drawings, in which FIGS. 1 to 15, inclusive, illustrate in schematic form the details of a ticketer in the main exchange. FIGS. 16 to 20, inclusive, illustrate the details of the apparatus incorporated in branch exchange B of a toll ticketing telephone system. FIGS. 21 and 22 illustrate the details of the incoming trunk located in the main exchange serving the incoming trunks from exchange B. FIGS. 23 to 29 illustrate in schematic form the details of the operators equipment and trunk circuits. FIG. 30 illustrate a branch exchange "D" in which there is no auxiliary equipment for aiding the automatic toll ticketing equipment in the main exchange. FIGS. 31 and 32 illustrate the details of the apparatus incorporated in the main exchange of a toll ticketing telephone system, and FIG. 33 illustrates the manner of combining FIGS. 1 to 32, inclusive, of the drawings to form a unified system.

FIGS. 1 to 15, inclusive, illustrate in schematic form the details of the ticketer. This circuit is seized from a selector on locally originated calls, from an incoming trunk circuit on calls originating in a branch exchange having subscriber directory number detecting equipment such as exchange "B," and from an incoming selector on calls originating in a branch exchange having no directory number detecting equipment.

In this type of system, it is necessary to dial an access code to seize this circuit. The last digit of the access code is always the party identification digit "0" (zero) on calls originating in exchanges having detecting equipment. On locally originated calls, the party identification digit "0" is the first digit dialled into this circuit.

The principal functions of the Ticketer are as follows:

(1) Function Common to All Calls.

(*a*) It calls for a Transender (a detailed explanation of this unit may be found in the Ostline, Coleman, Taugner copending application, Serial No. 628,474, filed December 3, 1956. It is a unit for pulsing the outgoing code digits for routing the call as determined by the translator unit), when seized.

(b) It repeats to the Transender the office code digits on seven or eight digit calls or the area code plus the office code digits (if needed) on ten or eleven digit calls.

(c) It absorbs those digits of the called number which are not required for sending.

(d) It provides for stop-dial and flashing signal supervision.

(e) After an adjustable "grace" period, it times the length of conversation from the time the called party answers until the calling party disconnects.

(f) It stores the following ticketing information during conversation: the calling number (7 digits); the called number (7, 8, 10, or 11 digits); and a change in toll rates indication, if it occurs during the call.

(g) After the calling party has disconnected, it calls for a Tabulator and transfers to it the ticketing information. During this transfer operation, the Ticketer is guarded against seizure from another call, but the calling line and the outgoing trunk are released. The Ticketer releases after transfer is completed.

(h) If the call is not answered, the Ticketer releases when the calling party disconnects and no ticketing information is recorded for the call.

(i) It provides special markings to the Transender when unstandard conditions are encountered.

(j) It provides visual supervision of the progress of a call through the Ticketer by means of the SUPY lamp.

(2) Functions of the Ticketer Pertaining to Local Access Calls.

(a) It tests for a low-resistance ground leak on the calling line.

(b) It determines the party identity and calls for a detection of the calling party's number after the party identification digit "0" has been dialed.

(c) It provides for extending the call to a "D" operator should an incomplete detection occur.

(3) Functions of the Ticketer Pertaining to Remote Access Calls (Type "B" Service).

(a) It receives the calling party's number which has been detected in the branch office.

(b) It provides for extending the call to a "D" operator should an incomplete detection occur.

(4) Functions of the Ticketer Pertaining to Remote Access Calls (Type "D" Service).

(a) It provides for extending the call to a "D" operator when the calling party has completed dialing the called number.

FIG. 16 of the drawing discloses in schematic block diagram form the switching equipment of branch exchange B, and also includes in block diagram form the detector and detector allotter.

FIGS. 17 to 20, inclusive, illustrate in schematic form the details of the outgoing toll trunk circuit from exchange B to the main exchange. This circuit is designed to provide outgoing service from a branch exchange having a detector, to a main exchange equipped with toll ticketing equipment. This circuit's functions are to:

(1) Provides transmission battery to calling station.

(2) Repeats dial pulses over "—" side of trunk to the distant Ticketer.

(3) Registers spotter pulses while extra digit-"0" is dialed; blocks digit-"0" from being repeated by the Ticketer.

(4) Initiates a terminal detection after digit-"0" is dialed.

(5) Registers party identity and pulses this information over "+" side of the trunk to the distant office.

(6) Switches the talking circuit through the repeat coil transmission bridge connecting the calling station to the trunk.

FIGS. 21 and 22 disclose in schematic form the details of the trunk circuit incoming from a branch exchange to a main exchange ticketer, through an associated ticketer hunter. This circuit is designed to provide incoming service from an outgoing trunk circuit in a branch exchange, to a ticketer. When seized, the incoming trunk circuit causes its associated ticketer hunter to hunt for an idle ticketer. The incoming trunk circuit receives the detected calling party's number from the branch office over the "+" side of the line and forwards this information to the ticketer. This circuit's functions are:

(1) To be seized over the "—" side of the trunk.

(2) To stop hunting if the subscriber dials prematurely.

(3) To step the ticketer hunter if a ticketer is simultaneously seized by more than one ticketer hunter or selector.

(4) To convert incoming dial pulses on the "—" side of the trunk to outgoing loop pulses to the ticketer.

FIG. 23 discloses in schematic block diagram form the operator's position board including a keysender.

FIGS. 24 and 25 disclose in schematic form the details of the operator's position equipment circuit. The functions of this circuit are:

(1) To connect a Ticketer Circuit to an individual operator via the Operator's Trunk Circuit to provide "D" service to the Ticketer.

(2) Provides a "D" Wait lamp to signal a "D" call, a "D" Pilot lamp to mark the processing of the "D" call by the operator, and a "D" Accept key for the operator to accept the "D" call. These are face equipment.

(3) Provides a common allotter to prevent the same ticketer from being simultaneously seized by two or more operators.

(4) Extends the talking leads from the ticketer to the operator's headset, and the control leads to the position keyset.

FIGS. 26 to 29 inclusive, disclose in schematic form the details of the operator's trunk circuit. The functions of this circuit are:

(1) To provide "D" operator service.

(2) To find the Ticketer requesting operator service from a group of Ticketers.

(3) Seizes Ticketers which request operator service.

(4) Connects operator to Ticketer and provides pilot lamp to supervise operator keying operations.

(5) Provides signal tone when seized by operator.

(6) Extends operator's keyset to Ticketer and repeats keyset operations to Ticketer.

(7) Automatically releases when operator's Start key is operated.

Figure 32:
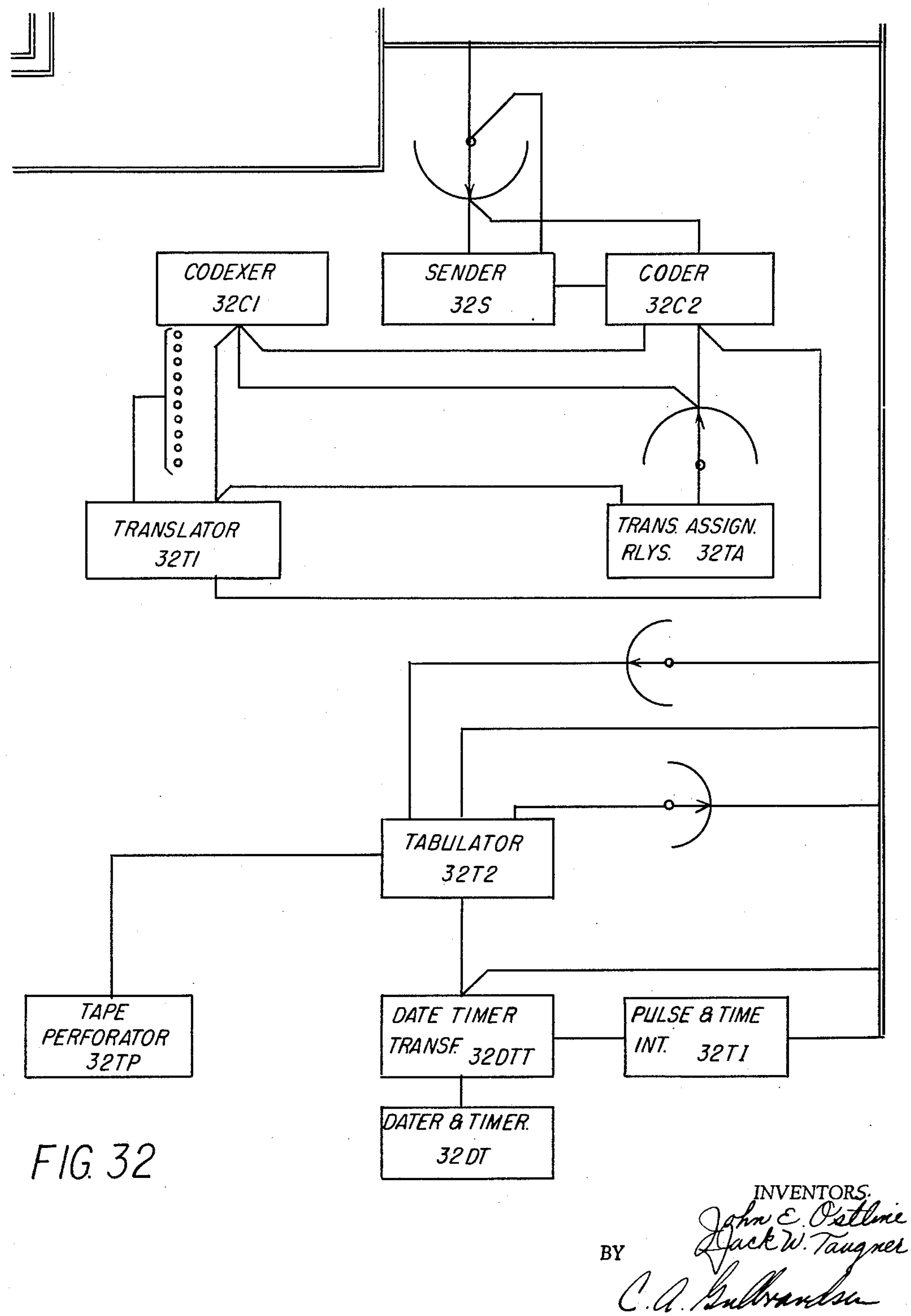

FIG. 32 illustrates in schematic block diagram form the transender and tabulator equipment. The transender equipment consists of a transender hunter, transender coder, transender sender, transender codexer (this is a unit of the transender in which is registered or indexed the called office area and/or office code as dialed by the calling subscriber. A detailed explanation of this unit may be found in the previously mentioned Ostline, Coleman, Taugner application, while its functions are explained in a succeeding section), and the associated translator and translator allotter. The tabulator equipment consists of a tabulator allotter, a tabulator circuit, a dater and timer circuit, a pulse and time interrupter and a tape perforator.

The transender hunter circuit is associated with a ticketer and its function is to find or hunt for an idle transender.

The transender coder is an integral part of the transender and as such operates in direct conjunction with the transender codexer and transender sender.

One transender from a common pool is associated with a ticketer while the subscriber dials the called number. It is retained under control of the ticketer until it obtains a routing directive either from the common translator or from the built-in directive in its coder and until it completes the required sending. Upon completion of sending, the ticketer switches through and frees the transender for use on other calls. The functions of the coder are:

(1) When it receives a "skip" control directive and a routing directive from the translator through a bar relay to store them on coded relays (these are named for the code in which they store this information. The codel code is a modified binary code for indicating the digits 1–0 as one or two markings in a potential group of four for each digit. A list of the markings and their corresponding indications is shown in the section titled "Dialing Digit A of the Office Code").

(2) To route calls to an operator or release the transender and provide busy tone if the translation is of a non-standard nature such as: "TX" translation for failure to dial digit "0," "TY" translation for ground fault on line, "TZ" translation for incomplete detection, "TT" translation for translator assigner failure.

When the coder is used on calls requiring routing directives from the translator, all codel leads and other leads are extended for a brief period to the translator. At the same time, a relay is operated in the translator as determined by the office code and area code dialled by the subscriber. The relay momentarily grounds some of these leads and operates the corresponding relays of the coder extended to it. The operated codel relays in turn place ground on codel leads and thereby make the routing directive available to the transender-sender. Most routing directives consist of fewer digits than the six provided during the interdigital interval following the sending of the preceding routing digit, and upon encountering the first empty codel will cause the coder out sequence switch to "skip" over the remaining codels of the routing digit storage.

The major function of the sender is to control the sending of impulses from the transender. The sending operation is started as soon as the coder has received the routing directive, or the coder may await a signal from the ticketer before starting the sender.

Pulses are generated by a small constant speed motor (48 v. D.C.) to control the sender pulse relay to provide pulses at a uniform speed and pulse ratio. Pulses sent by this circuit are determined by information stored in the coder and ticketer. Pulses are sent over a lead (sender control digit) and over the loop to the ticketer selector (or equivalent switches). An adjustable interdigital pause is provided.

Stop dial supervision can be received during the interdigital period. Upon receipt of a stop signal, the sender extends the interdigital counting interval by 2.2 seconds so that slow flashing busy signals (30 i.p.m.) can be differentiated from momentary stop dial signals. The outgoing trunk and the transender are automatically released when a flash busy is recognized. A stop signal can also be recognized for flash counting purpose during the out-pulsing of a digit, but pulsing will not be interrupted unless a flash is recognized before the digit is completed.

The transender codexer's main functions are:

(1) To receive subscriber dial pulses, inverted and repeated to the transender by a ticketer.

(2) To register the three-digit office or foreign area code on an 800 point Strowger switch to select a code lead extending into the common translator. The selected code lead is marked, and the single code indication is forwarded under control of the translator assigner.

(3) To recognize specific foreign area code requiring dual translation, in which case the area code is stored on rotary switches and the Strowger switch is released and re-positioned on the three-digit office code. The original area code is forwarded via one of five leads and the selected office code lead is marked under control of the translator assigner.

(4) To provide facilities to identify up to five foreign area codes for dual translation.

(5) To provide homing circuits for rotary switches and a release magnet for the Strowger switch with release failure alarm under control of the associated sender unit of the transender.

The translator is a group of relays which is used in conjunction with the transenders for the purpose of supplying the transenders with the necessary routing directive as determined by the first three or six digits registered in the transender on its codexer. The translator is common to the transenders; it is seized only momentarily when a routing directive is required. The connection of the transender to the translator is controlled by the translator assigner. The transender and translator are described in greater detail in the Ostline, Coleman and Taugner application Serial No. 628,474, filed December 3, 1956, now U.S. Patent No. 3,019,295.

The tabulator circuit's function is to forward toll call ticketing data to tape perforators. The toll call ticketing data consists of information received from the ticketer, the dater-timer, and from the tabulator itself.

The information received from the ticketers consists of the ticketer identity number (three digits), conversation time (three digits), called number (seven, ten or eleven digits), calling number (five digits) and a possible change in rates during call conversation timing indication. The information received from the dater-timer consists of the calendar date (day and month), the time of day and a day or night rate indication. The dater-timer is directly connected to the tabulator via a dater-timer transfer circuit. The information connected directly within the tabulator is the tabulator identity (two digits) and the ABC office code (three digits) of the calling party.

The calling number received from the ticketer is composed of four terminal digits and an office code unit. The office code unit is a special marking to one of ten relays, each of which represents a separate office. Thus, the tabulator is capable of supplying a maximum of ten ABC office codes to the tape perforator.

The tabulator provides for access to as many as fifty ticketers. Under control of the tabulator allotter, it will hunt for and find a ticketer calling for a tabulator.

All data received from the ticketer is stored on relays in the tabulator prior to being forwarded to the tape perforator.

When the punched tape is processed for printing a ticket or punching a record card, the tape roll is removed and fed into other equipment in the reverse direction from that of the original punching.

In order that the ticket or punching card come out with a "straight" record of the call, all data is sent in reverse order from the ticketer to the tabulator and from the tabulator to the tape perforators. The tabulator is described in greater detail in the Ostline application Serial No. 625,773, filed December 3, 1956, now U.S. Patent No. 2,981,798.

Figure 33:
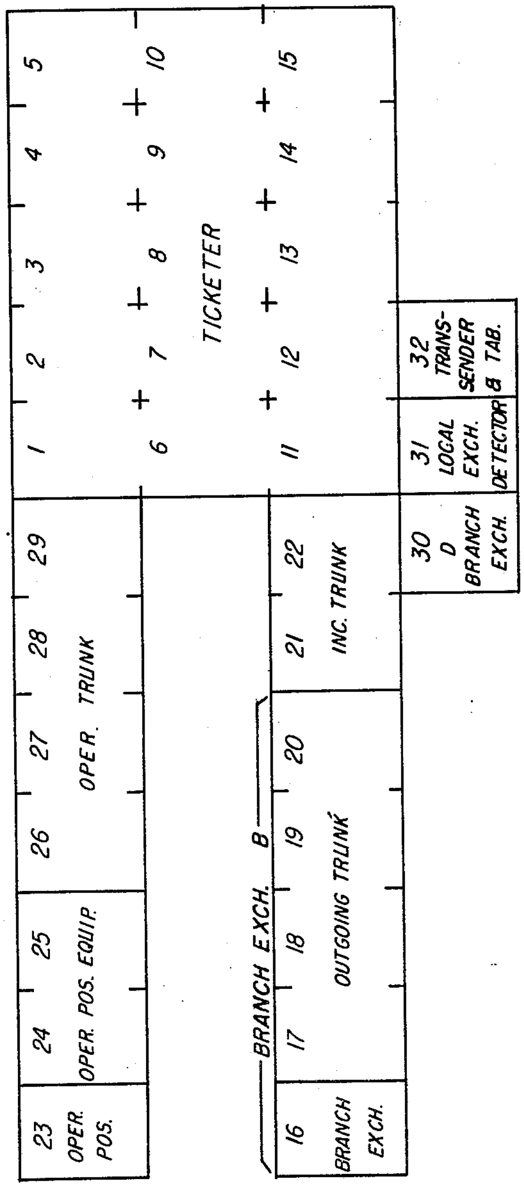

FIG. 33 illustrates the manner of combining FIGS. 1 to 32 and 33 inclusive of the drawings to form a unified system.

DETAILED OPERATION

*Seizure From Local Selector-Local Access Calls (Type "B" Service)*

When the calling subscriber at station 31PS4 (whose directory terminal number is 0004) removes his receiver, the usual loop circuit, including the line conductors 31T and 31R is completed for operating the line circuit 31L2. In response to the completion of the above mentioned loop circuit, the line circuit 31L2 initiates operation of the distributor and marks the terminals of the calling subscriber line in the bank contacts of a group of line finders, including the line finder 31F, having access to the calling subscriber line. For the purpose of this description it will be assumed that the distributor selects the line finder 31F and that the latter finder operates its wiper in a vertical and then in a rotary direction in the well-known manner to select the terminals in the associated bank terminating to the calling line. When the calling line is found by the line finder 31F, it extends the calling line to the individually associated first selector 31S1 and the latter selector transmits the usual dial tone signal to the calling subscriber to indicate that the dialling may be started. The above noted switching apparatus, including the line circuit 31L2, the distributor, the line finder 31F and the first selector 31S1 may be of conventional construction and arrangement and may be, for example, of the type illustrated in the Bakker Patent No. 2,289,896, granted July 14, 1942, and in the Saunders Patent No. 1,849,694, granted March 15, 1932.

Since the calling subscriber at station 0004 intends to extend the connection to a called subscriber in a remote exchange it is necessary to prefix the directory number of the called subscriber with the access code digits "90." Consequently, when the calling subscriber received the dialling tone signal the dial is actuated in accordance with the digit 9 to transmit nine loop impulses to the first selector 31S1. This selector then raises its wipers in a vertical direction to the ninth level and then rotates its wipers over the selected level to search for an idle ticketer, such as the ticketer of FIGS. 1–15. It will be assumed for the purpose of this description that the first selector 31S1 now extends the connection from the calling subscriber line by way of the cable to the ticketer illustrated in FIGS. 1 to 15, inclusive. The cable includes the "—" conductors 12TL, the "+" conductor 12RL and the control conductor 12CL. If the ticketer is busy, the control conductor will be grounded in order to indicate the busy condition to the first selector 31S1. Thus, as the selector rotates its wipers over the ninth level it will pass over contacts terminating ticketers having grounded control conductors corresponding to the 12CL conductor.

*Seizure of Ticketer*

Resistance 13R7 battery through contacts 13BS3, 13BA2, 13EN5 and 12BC1 on lead 12CL marks this switch idle to preceding selectors. When seized, the "tip" side of the subscriber's loop is closed, via lead 12TL, through contacts 12DC3, 13EN7, 14HD6, polar relay 10PA and Lamp 1001 to exchange battery terminal 1002 and the "ring" side of the subscriber's loop is closed, via lead 12RL, through contacts 12DC5, 13EN9, the number one winding of relay 14AA, contacts 14HD11, and resistor 14R1 to Spotter Battery at terminal 14SB. Relay 14AA operates from this Spotter Battery but relay 10PA does not operate at this time. Relay 14AA closes a circuit through the number one winding of relay 13BA (negative battery, 13BA, 14AA2, 13EN10 to ground) and 15BN (negative battery, 15BN, 10FC13, 14AA3, 10CB11 to ground). Relay 13BA operates, closes the number one winding of relay 12BB at contacts 13BA5, and closes ground to leads 12CU, 12CL and 12CD, through contacts 12BC1, 13EN5, 13BA1, 12KD1 and 13LP1, to hold the preceding equipment and mark this circuit busy. Relay 15BN operates and at contacts 15BN5 closes ground to relay 14SF and lead 14G through contacts 3SA8, 14SF3, 14SH6, 15BN6, 10FC10, to lead 15M of the Transender Hunter. Relay 12BB operates, at contacts 12BB1 closes a circuit to relay 13BS, at contacts 12BB10 closes ground to lead 12HU to provide an additional busy mark to the Incoming Trunk circuit and closes at contacts 12BB4 the SUPY lamp 9SL to lead 12SL. Relay 13BS operates, at contacts 13BS4 it shorts the number one winding of relay 15HB and at contacts 13BS2 through contacts 9AN9, 9BD10 and 9BE3 closes direct ground to lead 12SL and the SUPY lamp 9SL. The SUPY lamp 9SL lights brightly to indicate that the Ticketer has been seized.

If the associated Transender is busy, ground appears on lead 14G, thus shorting relay 14SF and causing the Transender Hunter to search for an idle Transender. When an idle Transender is found, absence of ground appears on lead 14G. Relay 14SF operates through the magnet in the Transender Hunter over lead 15M, closes ground to lead 14G to mark the associated Transender busy, prepares the holding circuit to the codel relays at contacts 14SF1 and closes a circuit to relay 14SH contacts 14SF4, 15BN8, 10FC3, to ground at 13EN10. Relay 14SH operates its "X" contacts 14SH5 first, transfers the holding path of 14SF from lead 15M to lead 15HT, and in operating fully, opens lead 15M, closes leads 15SC, 14XT, 14YT and 15ZT, and closes leads 15ST and 15SR to switch-through the Transender to the Ticketer Selector or Trunk Circuit.

*Dialling Party Identification Digit "0"*

As the subscriber dials the party identification digit "0," relay 14AA follows the dial pulses. Relay 13BA, being slow-to-release, remains operated during pulsing. When 14AA restores on the first dial pulse, it closes ground via contacts 13EN10, 14AA1, 1TE5, 13BA4, to relay 14CA and through contacts 15HB5 and 10T6 to relay 10S and closes ground via contacts 13EN10, 13BA3, 10FC13, 14AA4, 15HB6, 15PB4, 12BB5 to magnet 11PS. Magnet 11PS and relay 10S operate. Relay 14CA operates and at contacts 14CA6 closes a circuit to relay 10CB. Relay 10CB operates and closes a holding circuit to 10S through the number two winding of relay 10T which is shorted for the duration of the pulse.

At the end of the first dial pulse, relay 14AA reoperates, opens 14CA, opens the circuit to 11PS and removes the short from the second winding of relay 10T. Relay 10T operates in series with 10S and transfers the pulsing circuit through the number one winding of relay 10T to magnet 5DS. Relay 14CA, being slow-to-release, remains operated during dialling of the digit.

Magnet 11PS restores and advances the wipers of switch 11PS one step. Switch 11PS may or may not advance its wipers on the remaining dial pulses depending on the SATT "spotter pulse" of the calling party. Further operation of magnet 11PS is described in the section entitled "Identification of Calling Party."

When 14AA restores on the second dial pulse, it closes ground to magnet 5DS through the first winding of relay 10T. Magnet 5DS operates and opens its INT springs 5DS1. The INT springs 5DS1 open the circuit to relay 10S. Relay 10S restores but relay 10T remains operated on its number one winding for the duration of the pulse.

At the end of the second dial pulse, relay 14AA reoperates, opens magnet 5DS and the number one winding of relay 10T. Magnet 5DS restores and advances the wipers of switch 5DS one step. Relay 10T restores and transfers the pulsing circuit back to relay 10S. This same sequence of operations for relays 10S and 10T and switch 5 DS is repeated for the remaining dial pulses and switch 5 DS will advance its wipers following the second, fourth, sixth, eighth and tenth dial pulses.

After the tenth dial pulse, the wipers of switch 5DS are engaged on bank terminal 1 or 6, depending on the position of the switch at the start of dialling. At this time it might be well to bring out the fact that switch 5DS is a "homing" switch. That is, when a digit is completed and relay 10CB restores, ground is closed via INT, contacts 5DS1 and 10CB to level A bank terminals 2, 3, 4, 5, 7, 8, 9 and 10 of switch 5DS. If the wipers are engaged on any of these bank terminals, switch 5DS will step to bank terminal 1 or 6.

When digit "0" is completed, relay 14CA restores, opens 10CB, which is slow-to-release, and closes ground via contacts 13BA7, 14CA3, 3SM7, the level B wiper of switch 4SS in normal position, 10CB1 the level B wiper of switch 5DS engaged on bank terminal 1 or 6, 15HB1 and 10T7 to relay 15HA. Relay 15HA operates, locks at contacts 15HA4 through the number two winding of relay 15HB, 15BN9 to ground, and closes ground to lead 13PD of the Ticketer Selector at contact 15HA6. The number two winding of 15HB is shorted until relay 10CB restores.

Relay 10CB restores, removes the short from the number two winding of relay 15HB, closes ground via contacts 12BB9, ON springs 11PS2 of 11PS, 10FC8, 12BB6, 10CB10, 15BN2, 15HC2, 8KC7, 15GT1, 15HA1 and 7KE11 to relay 7KA. Relay 15HB operates through 15HA, closes 14HD and transfers the pulsing circuit from switch 11PS to the Transender via lead WP.

Relay 7KA operates, closes ground via lead 11 START to the Detector Assigner, removes ground from lead 11 GUARD and closes relay 12KB to lead 11 HOLD. Relay 14HD operates, momentarily closes number two winding of relay 14AA while transferring the "ring" side of the line (lead RL) from Spotter Battery to exchange battery through resistor 14R5 and the "tip" side of the line (lead TL) from relay 10PA to ground. Relay 14AA is now held by exchange battery over the subscriber's loop.

*Identification of Calling Party*

Type B SATT installations are capable of serving both single party lines and party lines with as many as ten stations. All stations on party lines must be equipped with special "spotter" dials. Stations on single party lines are equipped with regular dials.

The spotter dial differs from the regular dial in that it provides an additional set of spotter springs, which can be closed by a special cam during the return of the dial. The spotter spring's closed interval is positioned to occur only during the period when the regular pulsing contacts are closed. The spotter contacts, when closed by the special cam, close a spotter ground pulse on the "tip" side of the line.

The spotter cam can be arranged to close the spotter ground pulse on the line after any one of the individual dial pulses. For the first station, the spotter dials are adjusted to send a spotter pulse after the first dial pulse of the digit "0." For the second station, the spotter dials are adjusted to send a spotter pulse after the second dial pulse of the digit "0." The third, fourth, fifth, sixth, seventh, eighth, ninth, and tenth stations on a party line are arranged accordingly.

For purposes of this explanation, assume the calling station to be the fourth station on a party line. Thus, no spotter pulse will be closed via the "tip" side of the line to lead 12TL until after the fourth dial pulse.

Now consider what happned to switch 11PS as the digit "0" was being dialled in the preceding section. Switch 11PS stepped its wipers to bank terminal 1 after the first dial pulse. As relay 14AA follows the second, third and fourth dial pulses, the wipers of switch 11PS are advanced to bank terminals 2, 3 and 4. Immediately after the fourth dial pulse, the spotter dial closes a spotter pulse via the "tip" side of the line to lead 12TL.

Relay 10PA is a high speed polarized relay which will not operate from Spotter Battery over the normal dialling loop, but will operate from exchange battery when a "spotter" ground pulse appears on lead 12TL. Relay 10PA operates during the interdigital pause between the 4th and 5th dial pulse and closes ground via contacts 13EN10, 13BA3, 10FC13, 14AA3, 10PA1 and 10CB7 to the number one winding of relay 15PB. Relay 15PB operates and locks through its "X" contacts 15PB1, opens the pulsing circuit to switch 11PS, removes ground from lead 11P0 and closes ground to the level D wipers of switch 11PS which are engaged on bank terminal 4. When bar relay 11BR operates later, this ground will be closed to lead 11P4 to the Detector to indicate the party identity of the calling station. Further dial pulses do not affect switch 11PS. Levels A, B and C of switch 11PS serve no function on locally originated calls.

If the calling station has a single party line, no spotter pulses are closed to lead 12TL. Switch 11PS follows the 10 dial pulses of the digit "0" and steps to bank terminal 10. Since relays 10PA and 15PB do not operate, ground remains on lead 11P0 to indicate a single party line.

Although the spotter pulse may appear on the "tip" side of the line during the dialling of subsequent digits, they are ineffective to relay 10PA since the "tip" side of the line is transferred from relay 10PA to ground after the "0" digit is completed.

*Initiating Detection Cycle*

Ordinarily, the detection cycle is so rapid it will occur shortly after the digit "0" is completed. Ground on lead START and absence of ground on lead GUARD indicates to the Detector Assigner that a detection of a calling number is desired by a Ticketer. When the Detector Assigner steps to the Ticketer, relay 12KB operates over lead HOLD in series with a relay in the Detector Assigner. Relay 12KB operates, closes ground to lead TCA (peg count), closes ground to relay 11KF, to bar relay 11BR and closes relay 12KD. Relay 11KF operates, closes bank terminals 5 to 10 of level D, of switch 11PS via leads 11P5 to 11P10 and lead 11P0 (IND) to the Detector. Bar relay 11BR operates and closes leads 11W1 through 11Z7 and 11EB, 11P1 through 11P4 to the Detector and leads 11NC and 11KD0 to Detector Assigner. Ground appearing on lead 11GC causes relay 12KD to operate and replace ground with +80 v. Detector Battery on leads 12CD, 12CL and 12CU. During the detection cycle, the Detector Assigner may momentarily remove ground from lead 11GC causing relay 12KD to pulse and momentarily remove the +80 v. Detector Battery from leads 12CD, 12CL and 12CU.

In the course of the detection cycle, the Detector closes ground to the various 11W1 through 11Z7 leads. These grounds represent, in codel code, the office code and terminal number of the calling station. Various codel relays in Codels 1 through 7 operate from these grounds and lock to store the calling number. The decimal equivalents of the W, X, Y, Z codel relays are described in section titled "Dialling Digit A of the Office Code."

When the detection is complete, the Detector closes ground via lead 11EB to 8KC. Relay 8KC operates and locks, closes battery through magnet 4OS to lead 15SC of the Transender, opens relay 7KA and opens relay 12KB. Relay 7KA restores, removes ground from lead START and closes ground to lead GUARD. Relay 12KB restores, opens relay 12KD, opens relay 11KF, opens bar relay 11BR and opens ground from lead 1201. Relay 12KD restores and replaces +80 v. D.C. detector battery with ground on lead 12CL. Resistor 12R11 is used in conjunction with "X" contacts 12KD2 on relay 12KD to facilitate application of Detector battery to the "C" lead without dropping the switch train and without burning contacts when ground is connected to the +80 v. detector battery. Relay 11KF and bar relay 11BR restore.

DIALLING CALLED NUMBER FOR SEVEN OR EIGHT DIGIT CALLS

*Dialling Digit A of the Office Code*

Relay 14AA follows the dial pulses of digit A and repeats them over lead 14WP to the Transender. As relay 14AA restores on the first pulse, it closes relay 14CA.

Relay 14CA operates and, being slow-to-release, remains operated for the duration of the digit. Relay 14CA closes a circuit to relay 10CB. Relay 10CB operates and closes ground via contacts 10CB12, 15HB3, 10FC12 to energize magnet 4SS. Switch 4SS is an indirect drive switch and does not advance its wipers at this time.

The cycle of operation for relays 10S and 10T and switch 5DS is the same as for the digit "0" in the section titled Dialling Party Identification Digit "0" and can be summed up as follows:

| After Dial Pulse | Relays 10T and 10S | Switch 5DS Engaged On Terminal |
|---|---|---|
| 1 | Operated | 1 or 6. |
| 2 | Restored | 2 or 7. |
| 3 | Operated | 2 or 7. |
| 4 | Restored | 3 or 8. |
| 5 | Operated | 3 or 8. |
| 6 | Restored | 4 or 9. |
| 7 | Operated | 4 or 9. |
| 8 | Restored | 5 or 10. |
| 9 | Operated | 5 or 10. |
| 10 | Restored | 1 or 6. |

After dialling is completed, relay 14CA restores and opens relay 10CB. Relay 10CB is slow-to-release and does not restore immediately. During the interval of time when relay 14CA is restored and relay 10CB remains operated, ground is closed via the various level C, E, D and F wipers of switch 5DS to codel relays in Codel 21.

The different combinations of codel relays which operate will depend on the digit dialled. If the digit is odd, relay 10T is operated and ground is closed over the level D and F wipers of switch 5DS. If the digit is even, relay 10T is restored and ground is closed over the level C and E wipers of switch 5DS. The codel relay combinations and their decimal equivalents are as follows:

| | | | |
|---|---|---|---|
| WX | 1 | YZ | 6 |
| WY | 2 | W | 7 |
| WZ | 3 | X | 8 |
| XY | 4 | Y | 9 |
| XZ | 5 | Z | 0 |

As the various W, X, Y, Z codel relays in Codel 21 operate and lock, they close ground to the corresponding bank terminals of switch 4OS and 2SEND. When relay 10CB restores, it opens magnet 4SS, closes the "homing" circuit to switch 5DS, and opens relays 10S and 10T which, if operated, restore. Switch 4SS advances its wipers to bank terminal 1, prepares a circuit to Codel 22, and closes a circuit to relay 3ON. Switch 5DS "homes" to bank terminal 1 or 6. Relay 3ON operates and locks to the contacts of relay 15BN.

*Dialling Digit B of the Office Code*

Relay 14AA follows the dial pulses of digit B and repeats them over lead 14WP to the Transender. The cycle of operation for relays 10S, 14CA, 10CB and 10T and switches 5DS and 4SS during dialling is the same as for digit A of the office code in the preceding section.

After dialling is completed, the codel relays in Codel 22 operate and lock to store digit B of the office code, switch 4SS advances to bank terminal 2, switch 5DS "homes" and relays 10S and 10T, if operated, restore.

*Dialling Digit C of the Office Code*

Relay 14AA follows the dial pulses of digit C and repeats them over lead 14WP to the Transender. The cycle of operation for relays 10S, 14CA, 10CB and 10T, and switches 5DS and 4SS during dialling is the same as for digit A of the office code in section titled "Dialling Digit A of the Office Code."

After dialling is completed, the codel relays in Codel 23 operate and lock to store digit C of the office code, switch 4SS advances its wipers to bank terminal 3, switch 5DS homes and relays 10S and 10T, if operated, restore. When switch 4SS steps to its third bank terminal, it closes ground via contacts 13BA7, 14CA3, 3SM7, the level B wipers of switch 4SS engaged on bank terminal 3, 4LH6, INT contacts 4SS1 to magnet 4SS. Magnet 4SS operates and opens contacts 4SS1. Magnet 4SS restores and advances the wipers of switch 4SS. This self-interrupted stepping continues until switch 4SS steps to bank terminal 6.

*Dialling the Terminal Digits*

Relay 14AA follows the dial pulses of the four terminal digits. The cycle of operation for relays 10S, 14CA, 10CB, 10T and switches 5DS and 4SS for each of the terminal digits is the same as for digit A of the office code in section titled "Dialling Digit A of the Office Code." The first, second, third and fourth terminal digits are stored on Codels 27, 28, 29 and 30 respectively.

After the seventh digit (fourth terminal digit) is dialled, switch 4SS steps to bank terminal 10. Should the call be an eight digit call, the eighth digit (fifth terminal digit) is stored on Codel 31 and switch 4SS will step to normal position after the last digit is completed and closes ground to 1TE. Relay 1TE operates and opens the circuit to relays 14CA, 10S, 10T, and magnet 5DS.

*Dialling Called Number for Ten or Eleven Digit Calls*

On a ten or eleven digit call, the first three digits constitute the area code, of which the second digit is always either 1 or 0; the second three digits constitute the ABC office code; and the last four or five digits constitute the terminal digits.

*Dialling First Digit of Area Code*

Relay 14AA follows the dial pulses of the first digit of the area code and repeats them over lead 14WP to the Transender.

The cycle of operation for relays 10S, 14CA, 10CB and 10T and switches 5DS and 4SS during the dialling of this digit is the same as for digit A of the office code in the section titled "Dialling Digit A of the Office Code." After dialling is completed, the codel relays in Codel 21 operate and lock to store the first digit of the area code, switch 4SS steps to the first bank terminal, closes a circuit to relay 3ON via lead SSA and switch 5DS "homes." Relay 3ON operates and locks via lead 15BNL to the contacts of relay 15BN9.

*Dialling Second Digit of Area Code*

Relay 14AA follows the dial pulses of the second digit of the area code and repeats them over lead 14WP to the Transender. The cycle of operation for relays 10S, 14CA, 10CB, 10T and switches 5DS and 4SS during the dialling of this digit is the same as for digit A of the office code in section titled "Dialling Digit A of the Office Code." Since the second digit of the area code is 1 or 0, switch 5DS will either not step at all or will step five times. In either case, switch 5DS engages bank terminal 1 or 6 after the last dial pulse.

At the end of dialling relay 14CA restores. Relay 14CA closes the codel relays in Codel 22 and closes ground via contacts 13BA7, 14CA3, 3SM7, the level B wipers of switch 4SS engaged on the first bank terminals, contacts 10CB1, the level B wipers of switch 5DS engaged on the first or sixth bank terminals, 15HB2 to the number one winding of relay 4LH. The codel relays in Codel 22 operate and lock to store the second digit of the area code. Relay 4LH operates, locks over its number two winding, closes ground to the fourteenth level B bank terminal of switch 2SEND and opens the circuit of magnet 4SS to the third, fourth and fifth level B bank terminals of switch 4SS.

Relay 10CB restores and opens magnet 4SS. Switch 4SS steps to the second bank terminal.

*Dialling Third Digit of Area Code*

Relay 14AA follows the dial pulses of the third digit of the area code and repeats them over lead 14WP to the Transender. The cycle of operation for relays 10S, 14CA, 10CB and 10T and switches 5DS and 4SS during dialling of this digit is the same as for digit A of the office code. After dialling is completed, the codel relays in Codel 23 operate and lock to store the third digit of the office code, switch 4SS steps to the third bank terminal and switch 5DS "homes."

*Dialling ABC Office Code and Terminal Digits*

Relay 14AA follows the dial pulses and repeats them over lead 14WP to the Transender should the Transender require it. The cycle of operation for relays 10S, 14CA, 10CB, 10T and switches 5DS and 4SS during dialling of these digits is the same as for digit A of the office code. The ABC office code and four terminal digits for ten digit calls are stored in the Codels as follows:

| | |
|---|---|
| Office code digit A | Codel 24 |
| Office code digit B | Codel 25 |
| Office code digit C | Codel 26 |
| First terminal digit | Codel 27 |
| Second terminal digit | Codel 28 |
| Third terminal digit | Codel 29 |
| Fourth terminal digit | Codel 30 |

After dialling the tenth digit (fourth terminal digit) of the called number, switch 4SS steps to bank terminal 10. Should the call be an eleven digit call, the eleventh digit (fifth terminal digit) is stored on Codel 31. Switch 4SS will step to normal position after the last digit is completed, and closes ground to relay 1TE. Relay 1TE operates and opens the circuit to relays 14CA, 10S, 10T and magnet 5DS.

SENDING FROM THE TRANSENDER

*Sending for Seven or Eight Digit Calls*

After the Transender has received the ABC office code digits over lead 14WP, it starts the cycle of operation whereby the Transender is supplied with translated information from the Translator. This translated information which is stored on codels in the Transender, is composed of a sending control digit, a translated routing directive, and possibly a hold sending mark. The hold sending mark indicates to the Transender to hold sending until the seventh or tenth digit of the called number has been registered in the Ticketer. If the Transender does not receive a hold sending mark from the Translator, the sending cycle is as follows.

When the translated information has been received, the Transender closes a loop over leads 15SR and 15ST to seize the Ticketer Selector or Trunk Circuit and begins transmitting the sending control digit as a series of ground pulses, occuring at a frequency of ten pulses per second, over lead 15SC to relay 3NS and magnet 4OS. The sending control digit may consist of one, two, three, four, five, six, seven or ten pulses, and its function is to absorb those digits of the called number which are not required for sending. On the first sending control pulse, a circuit is closed to relay 3NS. Relay 3NS, being slow-to-release, operates and remains operated for the duration of the sending control pulses. Magnet 4OS follows the pulses and steps its wipers each time it restores.

For purposes of the explanation, assume that the first two digits were not required for sending. Under these conditions, the Transender closes three pulses over lead 15SC to relay 3NS and magnet 4OS. Switch 4OS follows the pulses and steps its wipers to bank terminal 3. After the last pulse, relay 3NS restores and closes the number two winding of relay 3SM and magnet 4OS, which does not operate at this time, to battery. Relay 3SM operates its "X" contacts 3SM1, locks over its number one winding and operates fully. Relay 3SM, in operating fully, opens its number two winding, opens the circuit to 3NS, transfers lead 14WP from the pulsing contacts of 14AA to the level C wiper of switch 4OS, and closes lead 14XT, 14YT and 14ZT to the level D, E and F wipers of switch 4OS, respectively.

When the Transender has completed the sender control digit, it begins sending the translated routing directive which may contain a maximum of six digits. The Transender sends the routing directive and all subsequent digits, in the form of loop pulses via leads 15SR and 15ST and provides an interdigital pause between each digit. After the Transender has finished sending the translated routing directive, it begins sending the decimal equivalents of the codel grounds appearing on leads 14WP, 14XT, 14YT and 15ZT.

If, as assumed earlier, the sending control digit has been 3, the wipers of switch 4OS would be engaged on bank terminals 3 and Codel 23 would be closed to leads 14WP, 14XT, 14YT and 15ZT. Thus, the first two (AB) digits of the office code have been absorbed and the third (C) digit of the office code will be the first digit of the called number to be sent by the Transender.

During the interdigital pause after the digit stored on Codel 23 has been sent, the Transender closes a ground pulse over lead 15SC to magnet 4OS. Switch 4OS steps to bank terminal 4 and in so doing, closes ground appearing on level A bank terminal 4 to relay 8PS. Relay 8PS operates and opens lead 15SC. The Transender must find resistance battery on lead 15SC as a condition for sending. As long as lead 15SC is open, the Transender will not send any additional digits.

Ground on level A bank terminals 4, 5 and 6 causes switch 4OS to step, self-interrupted, to bank terminal 7, thus skipping Codels 24, 25 and 26 on which no information has been registered. As switch 4OS steps, relay 8PS remains operated from the ground on these bank terminals. After switch 4OS steps to bank terminal 7, relay 8PS restores and closes resistance battery to lead 15SC.

Relay 8PS is now under control of the subscriber's dialling. As long as the subscriber's dialling remains ahead of the sending, relay 8PS will remain unoperated. Should the subscriber hesitate in dialling and switch 4OS catch up to switch 4SS, relay 8PS will operate and prevent any further sending until the subscriber is again one digit ahead of sending.

When resistance battery is closed to lead 15SC, the Transender begins sending the digit stored on Codel 27. During the interdigital pause after the digit has been sent, the Transender again closes a ground pulse over lead 15SC to magnet 4OS. Switch 4OS steps to bank terminal 8 and closes Codel 28 to leads 14WP, 14XT, 14YT and 15ZT. The digits stored on Codels 28, 29 and 30 are sent in the same manner. After the digit stored on Codel 30 has been sent, the Transender again closes a ground pulse to lead 15SC.

If the call is a seven digit call, the wipers of switch 4SS are engaged on bank terminal 10. The ground pulse on lead 15SC energizes magnet 4OS and closes the number one winding of relay 13EN, the level B wipers of switch 4OS engaged on bank terminal 10, the number one winding of relay 13EN, the level B wipers of switch 4SS engaged on bank terminal 10 and 100 ohm resistor 3R2 to exchange battery. Relay 13EN operates its "X" contacts 13EN12, locks through its number two winding and operates fully to start the switch-through cycle of operation as described in the section titled "Switch Through." After the ground pulse on lead 15SC, switch 4OS advances to normal position.

If the call is an eight digit call, switch 4SS should be in normal position by the time the digit stored on Codel 30 has been sent. The succeeding ground pulse on lead 15SC energizes magnet 4OS as on a seven digit call but does not close the number one winding of relay 13EN. After the pulse, switch 4OS advances its wipers to normal position and the digit stored on Codel 31 is then sent by the Transender. After this digit has been sent, the Transender closes a ground pulse over lead 15SC to magnet 4OS and the level B wipers of switch 4OS in normal position and the number two winding of relay 13EN.

Relay 13EN operates its "X" contacts 13EN12, locks through its number two winding and operates fully to start the switch-through cycle of operation as described in the section titled "Switch-Through." After the ground pulse on lead 15SC, switch 4OS advances its wipers to bank terminal 1.

If the Transender received a hold sending mark from the Translator, the Transender will not normally begin sending until the subscriber has dialled the seventh digit of seven or eight digit calls or the tenth digit of ten or eleven digit calls. Provisions are made for starting sending sooner if it is so desired. At that time switch 4SS advances its wipers to bank terminal 10 and closes ground via contacts 13BA7, 14CA3, 3SM7, the level B wipers of switch 4SS, contacts 7KE6, contacts 3SM13, contacts 15GT6 and 14SH9 to lead 14YT. Ground appearing on lead 14YT at this time indicates to the Transender that the seventh or tenth digit has been dialled and sending may begin. The cycle of operations during sending is the same as previously mentioned.

*Sending for Ten or Eleven Digit Calls*

After the Transender has received the three area code digits over lead 14WP, it decides whether or not the ABC office code is also required for a translation. In either case, when it has received the required digits, it starts the cycle of operation whereby the Transender is supplied with translated information from the Translator. When this information is received, the sending cycle is the same as previously described in the preceding section with the following exceptions:

When switch 4OS steps to bank terminal 4, it does not step self-interrupted to bank terminal 7 since relay 4LH has operated and removed the ground from level A bank terminals 4, 5 and 6.

After the tenth digit (fourth terminal digit) has been sent, the Transender closes a ground pulse on lead 15SC. If an eleventh digit (fifth terminal digit) has been dialled by this time, switch 4SS is in normal position. Thus, the pulse on lead 15SC steps switch 4OS to normal position, but does not close relay 13EN at this time, as in a seven or ten digit call. The Transender then sends the eleventh digit (fifth terminal digit) stored on Codel 31. After this digit has been sent, the Transender again closes a ground pulse over lead 15SC to switch 4OS and the number two winding of relay 13EN. Relay 13EN operates its "X" 13EN12 from the ground pulse on lead 15SC, via contacts 14SH3 of relay 14SH, 8PSI, 8KC5, 13EN11, 15BN7, 3NS2, the level B wiper of switch 4OS in normal position, 3SM10 and the number two winding of relay 13EN to exchange battery.

Relay 13EN, in operating its "X" contacts 13EN12, locks through its number two winding and operates fully to start the switch-through cycle of operation as described in the section titled "Switch-Through."

*Stop-Dial and Flashing Signal Supervision*

If stop-dial supervision is encountered during the sending interval, ground is closed via lead 13EC to the number one winding of relay 9AN. Relay 9AN operates and closes ground over lead 15PH to the Transender to hold further sending until the stop-dial supervision is removed.

If a flashing signal is closed to lead 13EC during the sending interval, relay 9AN follows the pulses and repeats them over lead 15PH to the Transender. During the second pulse the Transender opens lead 15HT. Relay 14SF restores, removes the short from resistor 9R9 and closes the number one winding of relay 10FC. Relay 10FC operates its "X" contacts 10FC4, locks through its number two winding, closes busy tone to the calling subscriber via leads 12RL and 12RU, opens 14SH, opens the number one winding of relay 10FC, closes a holding circuit to the number two winding of relay 9AN, closes a holding circuit to the number two winding of relay 12BB and removes the operating ground for magnet 4SS and Codels 21 through 31. Relay 14SH restores. Relay 9AN, which is held operated over its number two winding by relay 10FC, closes lead 60IPM through resistor 9R3 to the SUPY lamp 9SL. The SUPY lamp 9SL flashes dimly at 60 i.p.m. The Ticketer thus remains operated until the calling party disconnects.

*Switch-Through*

Prior to sending, the seized Ticketer Selector or Trunk Circuit closes ground to lead 13C. When relay 13EN operates fully after sending is completed, it opens the number one winding of relay 14AA and relay 14SH, closes the number two winding of relay 13BA to ground on lead 13C, transfers leads 12CL, 12CD and 12CU to ground on lead 13C and switches-through the preceding selector to the Ticketer Selector or Trunk Circuit. Relay 14AA restores and opens the number one winding of relay 13BA and relay 15BN. Relay 13BA remains operated over its number two winding. Relay 14SH restores and opens leads 15HT, 15SR, 15ST, 15SC, 14XT, 14YT and 15ZT to the Transender Hunter. When lead 15HT is opened, the associated Transender is released and relay 14SF is opened. Relay 14SF restores and transfers the holding circuit for the Codels through resistor 9R9.

Relay 15BN restores, closes ground over lead 13CT to the Ticketer Selector or Trunk Circuit to indicate cut-through and opens 14HD, the number one winding of relay 3SM, the number one and two windings of relay 15PB, the number two winding of relay 3ON, 8KC, 15HA and the number two winding of relay 15HB. Relays 14HD, 3SM, 3ON, 15HB, 8KC, 15HA and 15PB (if operated) restore. Relay 3ON restores and opens the circuit to relay 1TE. Relay 1TE restores.

*Called Party Answers*

When the called party answers, "answer" supervision is relayed through the trunk circuits and through the Ticketer Selector or Trunk Circuit to this circuit by ground over lead 13EC to the number one winding of relay 9AN.

Relay 9AN operates, extends relay 8TP to a source of 1 sec. time pulses on lead 3CTP and transfers the SUPY lamp 9SL from direct ground to lead 60IPM through resistor 9R3. This causes the SUPY lamp 9SL to flash dimly at 60 i.p.m. to indicate that the call has been answered. Relay 8TP follows the pulses on lead 3CTP and pulses at the rate of one pulse per second.

*Conversation Timing*

This Ticketer times the length of conversation and provides a maximum 309 minute timing interval. The conversation time is accumulated on rotary switches 7PC, 1MU and 1MT. Although the conversation timing cycle begins when answer supervision is received, a "grace period" (normally 5 seconds) is provided before any conversation time is actually registered. Immediately after this "grace period," the first minute of conversation is registered. At the end of the first minute of conversation, the second minute is registered, etc. until the end of the call or the 309 minute timing interval elapses. The "grace period" is designed to prevent ticketing of calls to wrong numbers and it can be varied by relocating leads 7A and 7B on the level B bank terminals of switch 7PC.

Relay 8TP operates from the first pulse on lead 3CTP following the operation of relay 9AN and closes relay 7TD. Relay 7TD operates and closes its holding circuit through the number two winding of relay 9TC which is shunted for the duration of the pulse. At the end of this pulse, relay 8TP restores and removes the shunt from relay 9TC. Relay 9TC operates in series with relay 7TD and transfers the relay 8TP pulsing circuit through the number one winding of relay 9TC to switch 7PC.

Relay 8TP operates on the second pulse over lead 3CTP and closes magnet 7PC through the number one winding of relay 9TC. Magnet 7PC operates. At the end of this second pulse, magnet 7PC restores and the wipers of switch 7PC are advanced one step.

Relays 9TC and 7TD remain operated and the wipers of switch 7PC are now stepped once each second until they reach bank terminal 4 at the end of the fifth pulse. At this time, switch 2SEND steps, self-interrupted, to bank terminal 1 and closes relay 9BD. The wipers of switch 2SEND remain engaged on bank terminal 1 until the end of conversation, at which time switch 2SEND begins transferring the ticketing information to the Tabulator. Relay 9BD operates, removes the shunt from INT contacts 7PC2, closes relay 9BF and closes ground through resistor 9R2 to the SUPY lamp 9SL. The SUPY lamp 9SL lights dimly to indicate the conversation timing has started. Relay 9BF operates, closes a multiple circuit from relay 8TP to 3SA10 and closes a multiple ground to the number two winding of relay 9TC.

On the sixth pulse relay 8TP operates and closes magnet 7PC through the number one winding of relay 9TC. Magnet 7PC operates and opens its INT contacts 7PC2. The INT springs open the hold circuit of relay 7TD. Relay 7TD restores but relay 9TC remains operated on its number one winding for the duration of this pulse. Relays 8TP and 9TC and magnet 7PC restore at the end of the pulse. The wipers of switch 7PC are advanced to bank terminal 5.

On the seventh pulse relay 8TP operates and closes relay 7TD. Relay 7TD operates and closes its holding circuit through the number two winding of relay 9TC. When relay 8TP restores at the end of this pulse, relay 9TC operates in series with relay 7TD and transfers the relay 8TP pulsing circuit to switch 7PC.

On the eighth pulse relay 8TP and magnet 7PC operate. Relay 7TD restores, but relay 9TC remains operated on its number one winding for the duration of the pulse. At the end of this pulse, relays 8TP and 9TC and magnet 7PC again restore. The wipers of switch 7PC are advanced to bank terminal 6.

In this manner, alternate pulses from 8TP now step switch 7PC at the rate of one step every two seconds.

Switch 7PC is used for counting groups of 30 pulses but is a 33-step switch mechanism. Each time the wipers of level A step to bank terminal 10, ground is closed through these wipers and INT contacts 7PC1 to magnet 7PC. Thus, every time the level A wipers step to bank terminal 10, switch 7PC steps self-interrupted and advances its wipers one step without changing the count.

Level A of switch 7PC is thus scanned at twenty second intervals. Level B has two of its three wipers removed and is, therefore, scanned only once each minute.

At the end of the first and each succeeding minute the level B wiper is engaged on bank terminal 2. Upon the next pulse following the operation of relays 7TD and 9TC, relay 8TP closes magnet 9PC and closes ground on the level B wiper via contacts 9BD8, 9TC4 and 8TP3 to magnet 1MU. Magnet 7PC operates and opens relay 7TD. Magnet 1MU operates. At the end of these pulses switch 7PC advances its wipers to bank terminal 3 and switch 1MU advances its wipers one step. In this manner switch 1MU registers the unit minute digits in codel code on leads W34, X34, Y34 and Z34.

After nine minutes the level B wiper of switch 7PC is again engaged on bank terminal 2 and the wipers of switch 1MU are engaged on bank terminal 8. Upon the next pulse following the opertaion of relays 7TD and 9TC, relay 8TP closes magnet 7PC, 1MU and 1MT. At the end of this pulse, switches 7PC, 1MU and 1MT advance their wipers one step. Switch 1MU steps self-interrupted from ground on level A bank terminal 9 and advances its wipers to bank terminal 10. A ten minute interval will elapse before the wipers of switch 1MU again engage bank terminal 8. After each subsequent ten minute interval when the wipers of switch 1MU engage bank terminal 8, switch 1MT advances its wipers one step. Levels A and B of switch 1MT are scanned at hundred minute intervals and thus mark in codel form the ten minute digits on leads W33, X33, Y33 and Z33. The wipers of level C, E and F have two of their three wipers removed and are spaced one hundred minutes apart. (Switch 1MT also is a 33 step mechanism, but when the level C and E wipers engage bank terminal N, it steps self-interrupted and advances its wipers one step.) Level C is scanned during the first hundred minute interval, level E during the second hundred minute interval and level F during the third hundred minute interval. One wiper of level D is removed to have this level scanned only during the second and third hundred minute intervals. Thus, the hundred minute digits are registered in codel form on leads W32, X32, Y32 and Z32.

Should the conversation timing reach 300 minutes, relay 1TE operates from ground on the level F wiper of switch 1MT engaged on bank terminal 10. Relay 1TE closes ground to lead Z32, prepares a circuit to give a 300 minute alarm and closes lead 60IPM to the SUPY lamp 9SL. The SUPY lamp 9SL flashes brightly at 60 i.p.m. to indicate that 300 minutes of conversation time have elapsed. At this time leads W32, Z32, Z33 and Z34 are grounded and register digits "300" as the conversation time.

The Ticketer is capable of registering the conversation time up to a maximum of 309 minutes. At the start of the 310th minute, the wipers of switch 1MU are advanced to bank terminal 10, to close ground via level C to lead 300MA to give the 300 minute alarm, the wipers of switch 1MT are advanced to normal, relay 1TE restores and the cycle of conversation timing continues as before. Consequently, the 310th minute of conversation is registered as "000," the 311th as "001," etc.

*End of Conversation*

When the called party disconnects, ground is removed from lead 13EC to open the operating path to relay 9AN. Relay 9AN restores and transfers the SUPY lamp 9SL from resistance (9R2) ground to lead 120IPM through resistor 9R2. The SUPY lamp 9SL flashes dimly at 120 i.p.m. until the calling party disconnects and the stored call information has been transferred to a Tabulator. Relay 9BF remains operated until the calling party disconnects.

When the calling party disconnects, the Ticketer Selector or Trunk Circuit releases and removes ground from lead 13C. The preceding equipment releases, but this switch will not release until the stored call information has been transferred to a Tabulator. Relay 13BA restores, closes the number one winding of relay 12BC and opens relay 9BF. Relay 12BC operates, closes relay 5GE, closes ground through the number one winding of relay 9GA to lead 3P and grounds leads 12CL, 12CU and 12CD to guard this switch against seizure.

Relay 5GE operates, removes ground from lead 3H and closes ground over lead 5TST to the Tabulator Allotter. Relay 9BF restores.

If, after the called party disconnects and ground has been removed from lead 13EC, the calling party fails to disconnect immediately, the following circuit operations will happen. Switch 7PC will continue to step as explained in the preceding section to bank terminal 1. The previous operation of 9BF permits this stepping. When the level A wipers of switch 7PC are engaged on bank terminal 1, a circuit is closed to relay 10CF. Relay 10CF operates, locks to contacts 12BC7 and prepares a circuit to the number one winding of relay 15HC. Switch 7PC continues to step. When switch 7PC engages its level A wipers on bank terminal 9, a circuit is closed to the number one winding of relay 15HC. Busy Tone is closed to the calling party via lead 12RL and 12RU as explained in the section titled "Called Party Busy."

The release of this circuit is as explained with the following exceptions: When the calling party disconnects after hearing busy tone, the loop is opened to relay 14AA. Relay 14AA restores and opens the number one winding of relay 13BA. Relay 13BA restores and opens 15BN. When 12BC operates, relay 10CF is opened. Relay 10CF restores. Also, when 15BN restores, holding ground is removed from the number two windings of relays 12BB, 10FC, 15HC, 15HB and relay 14HD. These relays restore.

*Transferring Ticketing Information to a Tabulator*

Absence of ground on lead 3H permits a Tabulator to stop on this switch. When a Tabulator is connected to the switch, a circuit is closed over lead 3P to the number one winding of relay 9GA. Relay 9GA operates its "X" contacts 9GA4, locks on its number two winding and operates fully. Relay 9GA, in operating fully, opens its number one winding from lead 3P, closes lead 3P to magnet 2SEND, closes a short across resistor 9R9 and opens 5GE. Relay 5GE restores, opens lead 5TST and closes ground to lead 3H.

The ticketing and record data stored in this switch are now rapidly transferred to the Tabulator. The 2SEND switch is stepped by pulses from the Tabulator, which also simultaneously step a similar switch in unison in the Tabulator. As the wipers of the 2SEND switch are advanced one step at a time, they close the grounds on the various bank terminals over leads W, X, Y and Z to operate codels in the Tabulator.

The order in which the data is transferred to the Tabulator is as follows.

FOR SEVEN OR EIGHT DIGIT CALLS

Bank terminals 2: Called number, Office Code A digit (Codel 21)
Bank terminals 3: Called number, Office Code B digit (Codel 22)
Bank terminals 4: Called number, Office Code C digit (Codel 23)
Bank terminals 5: No information on seven digit calls
Bank terminals 6: No information on seven digit calls
Bank terminals 7: No information on seven digit calls
Bank terminals 8: Calling number, Office Code A digit (Codel 1)
Bank terminals 9: Calling number, Office Code B digit (Codel 2)
Bank terminals 10: Calling number, Office Code C digit (Codel 3)
Bank terminals 11: Conversation time hundreds digit (minutes)
Bank terminals 12: Conversation time tens digit (minutes)
Bank terminals 13: Conversation time units digit (minutes)
Bank terminals 14:
  Level B absence of ground indicates a seven or eight digit call
  Level C Ticketer identity hundreds digit
  Level D Ground indicates a change of toll rates during call
Bank terminals 15: Ticketer identity tens digit
Bank terminals 16: Ticketer identity units digit
Bank terminals 17: Called number, 1st terminal digit (Codel 27)
Bank terminals 18: Called number, 2nd terminal digit (Codel 28)
Bank terminals 19: Called number, 3rd terminal digit (Codel 29)
Bank terminals 20: Called number, 4th terminal digit (Codel 30)
Bank terminals 21: Called number (eight digit calls only) 5th terminal digit (Codel 31)
Bank terminals 22: Calling number, 1st terminal digit (Codel 4)
Bank terminals 23: Calling number 2nd terminal digit (Codel 5)
Bank terminals 24: Calling number, 3rd terminal digit (Codel 6)
Bank terminals 25: Calling number, 4th terminal digit (Codel 7)

FOR TEN OR ELEVEN DIGIT CALLS

Bank terminals 2: Called number, 1st area code digit (Codel 21)
Bank terminals 3: Called number, 2nd area code digit (Codel 22)
Bank terminals 4: Called number, 3rd area code digit (Codel 23)
Bank terminals 5: Called number, Office Code A digit (Codel 24)
Bank terminals 6: Called number, Office Code B digit (Codel 25)
Bank terminals 7: Called number, Office Code C digit (Codel 26)
Bank terminals 8: Calling number, Office Code A digit (Codel 1)
Bank terminals 9: Calling number, Office Code B digit (Codel 2)
Bank terminals 10: Calling number, Office Code C digit (Codel 3)
Bank terminals 11: Conversation time hundreds digit (minutes)
Bank terminals 12: Conversation time tens digit (minutes)
Bank terminals 13: Conversation time units digit (minutes)
Bank terminals 14:
  Level B Ground indicates a ten or eleven digit call
  Level C Ticketer identity hundreds digit
  Level D Ground indicates a change of toll rates during call
Bank terminals 15: Ticketer identity tens digit
Bank terminals 16: Ticketer identity units digit
Bank terminals 17: Called number, 1st terminal digit (Codel 27)
Bank terminals 18: Called number, 2nd terminal digit (Codel 28)
Bank terminals 19: Called number, 3rd terminal digit (Codel 29)
Bank terminals 20: Called number, 4th terminal digit (Codel 30)
Bank terminals 21: Called number (eleven digit calls only) 5th terminal digit (Codel 31)
Bank terminals 22: Calling number, 1st terminal digit (Codel 4)
Bank terminals 23: Calling number, 2nd terminal digit (Codel 5)
Bank terminals 24: Calling number, 3rd terminal digit (Codel 6)
Bank terminals 25: Calling number, 4th terminal digit (Codel 7)

When all this information has been transferred, switch 2SEND steps to bank terminal N and opens relay 9BD.

*Release From Completed and Timed Call*

Relay 9BD restores, closes ground to the SUPY lamp 9SL, and opens the number one winding of relay 12BB. The SUPY lamp 9SL lights brightly to indicate that all the information has been transferred to the Tabulator. Relay 12BB restores, opens relays 4LH and 2TR (if operated), removes ground from lead 13CT, opens relays 13BS and 13EN and closes low resistance ground through relay 9BE to magnets 11PS and 7PC. Relay 13EN restores. Relay 9BE operates, closes ground over lead RLS. ALM. to a delayed release alarm, closes ground to the number one winding of relay 12BC to hold 12BC operated and replaces ground with 120 i.p.m. ground pulses on the SUPY lamp 9SL. The SUPY lamp 9SL flashes brightly at 120 i.p.m. to indicate that the Ticketer should be restoring to normal condition. Relay 13BS restores and opens the holding ground from all the Codels. These relays restore.

Switch 11PS steps, self-interrupted, to normal position where its 11PS2 contacts operate and open the circuit to its magnet. Switch 7PC steps, self-interrupted, to normal position. The contacts 11PS2 operate, open the circuit to the 7PC magnet and close the relay 9BE ground to switch 1MU. Switch 1MU steps, self-interrupted, to normal position and closes the relay 9BE ground to switch 1MT. In the same manner switches 1MT, 4SS, 4OS and 2SEND step to normal position after each preceding switch has returned to normal position.

During the above "homing," relay 9BE remains operated from battery through the various magnets. When all switches are in normal position, relay 9BE restores, removes the 120 i.p.m. ground pulses from the SUPY lamp 9SL and opens the number one winding of relay 12BC. Relay 12BC restores, opens the number two windings of relay 9GA, opens the SUPY lamp 9SL, removes ground from lead 12HU and replaces ground with resistance battery on leads 12CU, 12CL and 12CD.

The Ticketer is now idle and free to ticket another call.

*Release From Incompleted Call*

If the call is not answered, relay 9AN never operates, hence relay 9BD does not operate. When the calling party disconnects, the Ticketer Selector or Trunk Circuit releases and removes ground from lead 13C. The preceding equipment releases. Relay 13BA restores, closes number one winding of relay 12BC and opens and number one winding of relay 12BB. Relay 12BC operates and grounds leads 12CL, 12CU and 12CD to guard this switch against seizure. Relay 12BB restores, opens relays 13BS and 13EN, opens 4LH (if operated), and closes low resistance ground through relay 9BE to magnets 11PS and 4SS. Relay 13EN restores. Relay 9BE operates, closes ground to lead RLS. ALM closes ground to the number on winding of relay 12BC to hold relay 12BC operated and transfers the SUPY lamp 9SL from ground to lead 120IPM. The SUPY lamp 9SL flashes brightly at 120 i.p.m. to indicate that the Ticketer is restoring to normal condition. Relay 13BS restores and open the holding circuit for all the Codels. These relays restore.

Switches 11PS and 4SS step, self-interrupted, to normal position. In the same manner, switch 4OS and then switch 2SEND step to normal position. Relay 9BE restores, removes the 120 i.p.m. ground pulses from the SUPY lamp 9SL, removes ground from lead 9RLS and opens the number one winding of relay 12BC. Relay 12BC resores, removes ground from lead 12HU and replaces ground with resistance (13R7) battery on leads 12CU, 12CL and 12CD.

The Ticketer is now idle and free to ticket another call.

*Called Party Busy*

If the called line is busy, busy supervision is relayed through the trunk circuits and through the Ticketer Selector to this circuit as ground pulses on lead 13EC. Relay 9AN operates on its number one winding on the first pulse, locks through its number two winding to ground at level A bank terminal N of switch 7PC and closes relay 8TP to lead 3CTP. Relay 8TP follows the first two pulses on lead 3CTP and step switch 7PC to bank terminal 1 as explained in the section titled "Conversation Timing." As switch 7PC advances to bank terminal 1, the holding circuit of 9AN is opend. Relay 9AN restores between pulses on lead 13EC and closes a circuit through the level A wipers engaged on bank terminal 1 of switch 7PC to relay 10CF. Relay 10CF operates, locks to bank terminal 1, level A of switch 7PC, prepares to close magnet 6SD and closes the number one winding of relay 15HC.

Each time lead 13EC is grounded, relay 9AN operates; closes magnet 6SD and shunts the number two winding of relay 9TC. After each pulse on lead 13EC, relay 9AN restores; opens magnet 6SD and removes the shunt from the number two winding of relay 9TC. Switch 6SD advances its wipers to the next bank terminal after each pulse. However, due to the flashing signal on lead 13EC, which relay 9AN will follow, relay 9TC and magnet 7PC are unable to complete a full cycle of operation. Therefore, switch 7PC remains on bank terminal 1.

When the level B wipers of switch 6SD engage on bank terminal #3, a circuit is closed to the number one winding of relay 15HC.

Relay 15HC operates and closes the number one winding of relay 10FC. Relay 10FC operates and opens the number two winding of relay 13EN. Relay 13EN restores, closes 15BN, transfers the calling party's loop from leads 13T and 13R to relays 14AA and 10PA, closes ground to leads 12CD, 12CL and 12CU, closes Busy Tone to the calling party via lead 12RL and 12RU and opens the number two winding of relay 13BA. Relay 14AA operates and closes the number one winding of relay 13BA (13BA remained operated due to its slow-to-release characteristics). Relay 15BN operates, closes a holding path to the number two windings of relays 10FC and 15HC and closes the number two winding of relay 15HB through Resistor 15R10. Relay 15HB operates and locks and closes relay 14HD. Relay 14HR operates and transfers the calling loop to both windings of relay 14AA. The circuit remains thus operated until the calling party disconnects.

*Release From a Called Party Busy Condition*

When the calling party disconnects after receiving busy tone, the loop is opened to relay 14AA. Relay 14AA restores and opens the number one winding of 13BA. Relay 13BA restores, closes the number one winding of relay 12BC, removes ground from leads 12CU, 12CD and 12CL to release the preceding equipment, opens the number one winding of relay 12BB and opens relay 15BN. Relay 12BC operates, closes ground to leads 12CU, 12CD and 12CL and removes ground from bank terminal 2 level A of switch 7PC which opens relay 10CF. Relay 10CF restores. Relay 15BN restores and removes the holding ground from the number two windings of relays 12BB, 10FC, 15HC, 15HB and from relay 14HD. These relays restore. Relay 12BB, in restoring, closes low resistance ground through relay 9BE to switches 11PS and 7PC and opens 13BS. Relay 9BE operates, closes ground to lead 9RLS. ALM., closes an additional ground to the number one winding of relay 12BC and transfers the SUPY lamp 9SL from 60IPM to lead 120IPM. The SUPY lamp 9SL flashes brightly at 120 i.p.m. Relay 9AN restores. Relay 13BS restores and opens all the Codels. The Codels restore.

Switches 11PS and 7PC step, self-interrupted, to normal position. In the same manner, switches 4SS, 4OS and then 2SEND, step to normal position. Relay 9BE restores, removes the 120 i.p.m. ground pulses from the SUPY lamp 9SL, removes ground from lead 9RLS. ALM., and opens the number one winding of relay 12BC. Relay 12BC restores, removes ground from lead 12HU and replaces ground with resistance battery on leads 12CU, 12CL and 12CD.

The Ticketer is now idle and free to ticket another call.

*Release From a Flashing Signal Condition*

When the calling party disconnects after receiving busy tone due to the flashing signal on lead 13EC during sending, the loop circuit is opened to the number one winding of relay 14AA. Relay 14AA restores and opens the number one winding of relay 13BA. Relay 13BA restores, closes the number one winding of relay 12BC, removes ground from leads 12CU, 12CD and 12CL to release the preceding equipment, opens the number one winding of relay 12BB and opens relay 15BN. Relay 12BC operates and closes ground to lead 12CU, 12CD and 12CL. Relay 13EN restores and removes the holding ground from the number two windings of relays 12BB, 10FC, the number one winding of relays 3SM, both windings of relay 15PB (if operated), 15HA, the number two winding of relay 15HB and relay 14HD. These relays restore. Relay 10FC, in restoring, opens the holding circuit to relay 9AN. Relay 12BB, in restoring, completes a circuit at back contacts 12BB7 and 12BB8 forwarding low resistance ground through relay 9BE to switches 11PS and 4SS respectively, opens the number two winding of relay 4LH (if operated), and opens relay 13BS. Relay 9BE operates, closes ground to lead 9RLS. ALM., closes an additional ground to the number one winding of relay 12BC to hold relay 12BC operated and transfers the SUPY lamp 9SL from lead 60IPM to lead 120. The SUPY lamp 9SL flashes brightly at 120 i.p.m. to indicate that the Ticketer is restoring to normal condition. Relay 9AN restores. Relay 4LH (if operated) restores. Relay 13BS restores and opens the holding circuit for all the Codels. The Codels restore.

Switches 11PS and 4SS step, self-interrupted, to normal position. In the same manner, switch 4OS and then switch 2SEND step to normal position. Relay 9BE restores, removes the 120 i.p.m. ground pulses from the SUPY lamp 9SL and lead SL, removes ground from lead 9RLS. ALM. and opens the number one winding of relay 12BC. Relay 12BC restores, removes ground from lead 12HU and replaces ground with resistance 13R7 battery on leads 12CU, 12CL and 12CD.

The Ticketer is now idle and free to ticket another call.

*Ground Fault on Line*

If there is a low resistance ground leak on either the "tip" or "ring" side of the calling line, relay 10PA will operate either as the Ticketer is seized or as the final dial pulse is received. Relay 10PA closes ground on contacts 10CB11 to the number one winding of relay 15GT. Relay 15GT operates, locks through its "X" contacts 15GT3 and prepares to close ground over lead 14YT to the Transender. No further operation occurs until the subscriber dials the party identification digit "0." Operation during the dialling is similar to that described in the section titled "Dialling Party Identification Digit '0,'" with the exception that upon completion of the digit, ground is closed to the number two winding of relay 15HC and relay 7KA will not operate. Relay 15HC operates, locks through its number two winding, closes resistance battery to lead 13SC, opens lead 14WP and closes ground over lead 14YT to the Transender. When ground is closed to lead 14YT, either of two alternative procedures is provided by the Transender as described in the succeeding section.

*Failure to Dial Party Identification Digit "0"*

In order for relay 15HA to operate upon the completion of the first digit, it is necessary that relay 10T be restored and switch 5DS be engaged on bank terminal 1 or 6. Should the subscriber fail to dial the party identification digit "0," either one or both of these conditions will not be met and relay 15HA will not operate.

As relay 14CA restores after the last dial pulse of the first digit, it opens relay 10CB. Relay 10CB restores and closes ground on contacts 12BB9 to the number two winding of relay 15HC. Relay 15HC operates and locks, closes ground over lead 14XT to the Transender, closes the number two winding of relay 15HB through resistor 15R10, closes resistance battery to lead 15SC and opens lead 14WP. Relay 15HB operates and locks on its number two winding, closes relay 14HD, opens the pulsing circuit to switch 11PS and prevents relay 15HA from later operating, should the digit "0" be dialled in the succeeding digits. Relay 14HD operates, momentarily closes the number two winding of relay 14AA while transferring the "tip" side of the line (lead 12TL) from relay 10PA to ground and the "ring" side of the line (lead 12RL) from Spotter Battery to exchange battery and opens the number two winding of relay 15HC. Relays 10PA and 15PB may have operated during this digit, but since the digit "0" was not dialled, an incorrect party identification is registered on leads P1 through P0.

When ground is closed to lead 14XT, either of two alternative procedures is provided by the Transender as described in the succeeding section.

*Special Routing Directives or Busy Tone*

Should ground be closed over leads 14XT or 14YT to the Transender before a translation has been provided, the Transender will follow either of two alternatives. Depending on its strap wiring, the Transender will either send a special routing directive to route the call to an operator, or it will release itself and cause the Ticketer to send busy tone to the calling party.

*Transender Strapped for Sending Special Routing Directive*

When the Transender receives ground on leads 14XT or 14YT, it begins transmitting the sending control digit "0" over lead 15SC to relay 3NS and magnet 4OS. Relay 3NS, being slow-to-release, operates on the first pulse and remains operated for the duration of the sending control pulses. Magnet 4OS follows the pulses and steps to bank terminal 10. After the last pulse relay 3NS restores.

After the Transender has completed the sender control digit, it begins sending a special routing directive, usually consisting of one or two digits. The Transender sends this special routing directive in the form of loop pulses on leads 15SR and 15ST.

After the special routing directive has been sent, the Transender closes a ground pulse over lead 15SC to magnet 4OS and the number one winding of relay 13EN. During the pulse, relay 13EN operates its "X" contacts 13EN12, locks over its number two winding and operates fully. After the pulse, switch 4OS steps to normal position.

When relay 13EN operates fully, it starts a cycle of operation similar to that described in the section titled "Switch-Through," except that relays 15HC and 15GT also restore when relay 15BN restores. The calling party is now switched-through to an operator for special handling of the call.

*Transender Strapped for Providing Busy Tone to Calling Party*

When the Transender receives ground on either lead 14XT or 14YT, it starts the cycle of operations whereby lead 15HT is opened. When lead 15HT is opened, relay 14SF restores and closes the number one winding of relay 10FC. Relay 10FC operates its "X" contacts 10FC4, locks over its number two winding, closes Busy Tone through 10C4 to leads 12RU and 12RL, opens relay 14SH opens its number one winding, closes ground to lead FC SUPY 1003 and closes a holding circut to the number two winding of relay 12BB. Relay 14SH restores. The Ticketer remains thus operated until the calling party disconnects.

In case there is no response to the attempt to get calling party identity, relay 10FC will operate and since relays 8KC, 7KE or 15HC did not operate, relay 10FC is locked over its number two winding through the RLS key 1004 to ground at contacts of 12BB. When the calling party restores, relay 12BC operates and all the other relays restore, except relays 10FC, 12BB, 15PB (if operated), 12BC, 15HC, 13BS, 15HA, 15HB, 14HD and all the operated Codels. The Ticketer will thus remain operated until the RLS key 1004 is operated. Operation of the release key 1004 causes the Ticketer to release completely.

If the Transender sends a digit consisting of more than 10 pulses while sending the called number, it stops all further sending. After a delay interval designed to allow the subscriber time to finish dialling, the Transender opens lead 15HT. Relay 14SF restores and closes the number one winding of relay 10FC. Relay 10FC operates and locks over its number two winding from ground on the level A wiper of switch 4SS engaged on bank terminal 10. All relays restore with the exception of relays 10FC, 12BB, 3SM, 15PB (if operated), 12BC, 13BS, 4LH (if operated), 15HA, 15HB, 14HD and all the operated Codels. The Ticketer will thus remain operated until the RLS key 1004 is operated at which time it will release completely.

*Incomplete Detection*

If an incomplete or double detection occurs in the Detector, ground is closed to lead 11INC. Relay 7KE operates, locks to ground at relay 15BN, closes ground to lead 15ZT of the Transender, opens relay 7KA, opens lead HOLD from relay 12KB, and opens the locking ground to Codels 1 through 7. Relay 7KA restores, closes ground to lead GUARD and opens lead START. Relay 12KB restores, opens bar magnet 11BR, opens relay 12KD, relay 11KF via lead 11KF, and removes ground from lead TCA1201. Bar relay 11BR restores. Relay 12KD restores and replaces the +80 v.d.c. detector battery with ground on leads 12CU, 12CD and 12CL. Relay 11KF restores and opens ground from lead 11GC.

In spite of the fact that a fault occurred, the subscriber continues dialling the remaining digits. After the seventh or tenth digit has been dialled, switch 4SS advances its wipers to bank terminal 10 and closes ground on contacts 13BA7, 14CA3, contacts 3SM7, level B wiper of switch 4SS, contacts 7KE5, 10CB6, the number one winding of relay 8DD and contacts 8DD2 to the Transender via lead 14YT. If there is no possibility of an eighth or eleventh digit, relay 8DD will operate immediately from resistance battery encountered on the Transender lead 14YT. If there is a possibility of an eighth or eleventh digit, a time-delay circuit is encountered on lead 14YT and relay 8DD will operate on a time-delay basis unless an eighth or eleventh digit is dialled.

If an eighth or eleventh digit is dialled, relay 8DD will operate upon completion of the digit during the interval when relay 14CA is restored and relay 10CB remains operated. The operating path is as follows: ground on contacts 13BA7, 14CA3, 3SM7, the level B wipers of switch 4SS engaged on bank terminal 10, contacts 7KE5, 10CB9 and the number two winding of relay 8DD to battery.

When relay 8DD operates, it locks through its number two winding to ground at contacts of relay 15BN, opens its number one winding, closes the number one winding of relay 7DB to lead 6DH, removes ground from lead 6DG, closes ground to lead 6DST and replaces ground on lead 12TL with resistance ground through the number two winding of relay 14AA.

The call is now handled by a "BD" Operator as a type "D" call and further operation is the same as explained in the section titled "Calling for "BD" Operator."

CALL ORIGINATING FROM A BRANCH OFFICE (TYPE "D" SERVICE)

Figure 1:
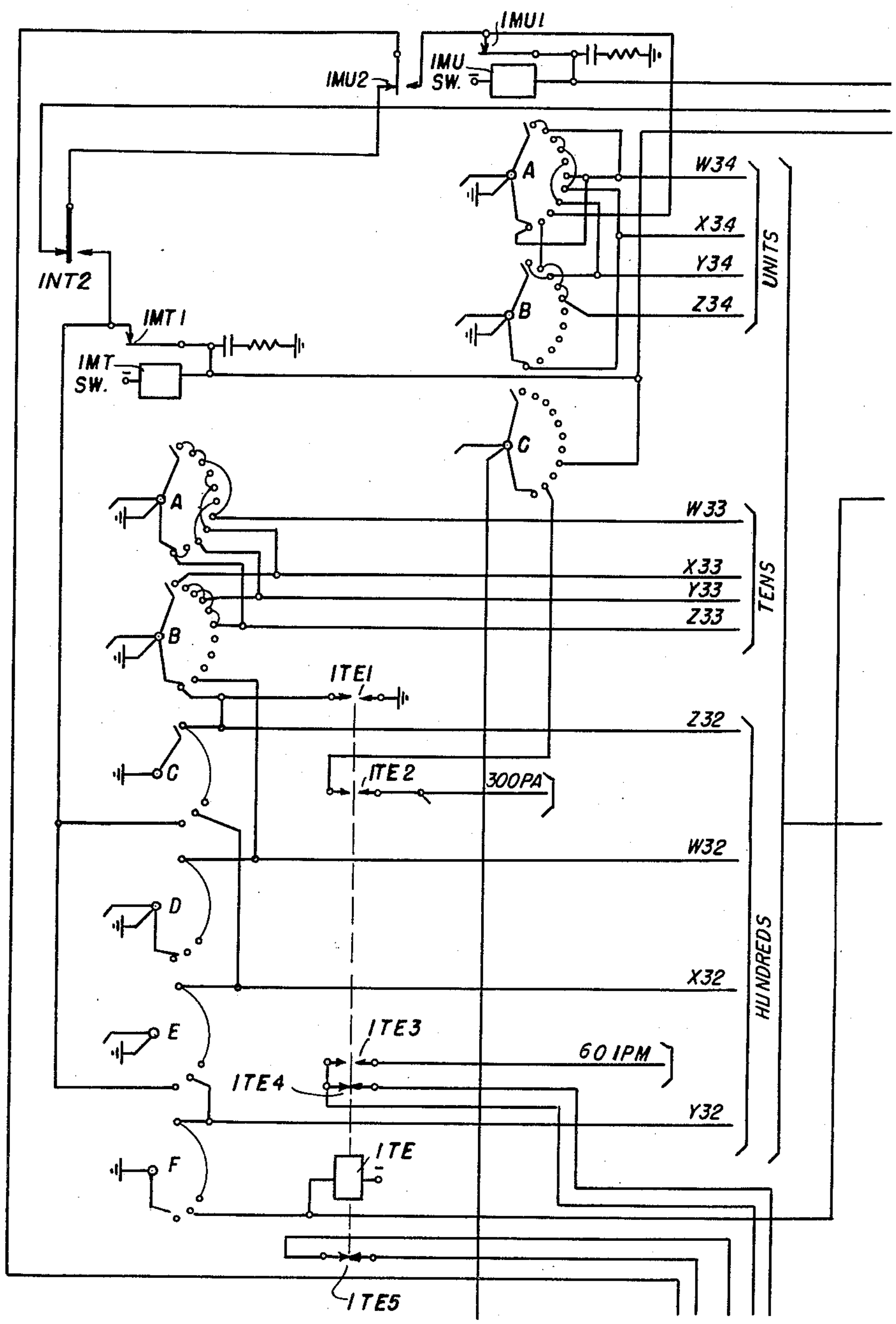
Figure 2:
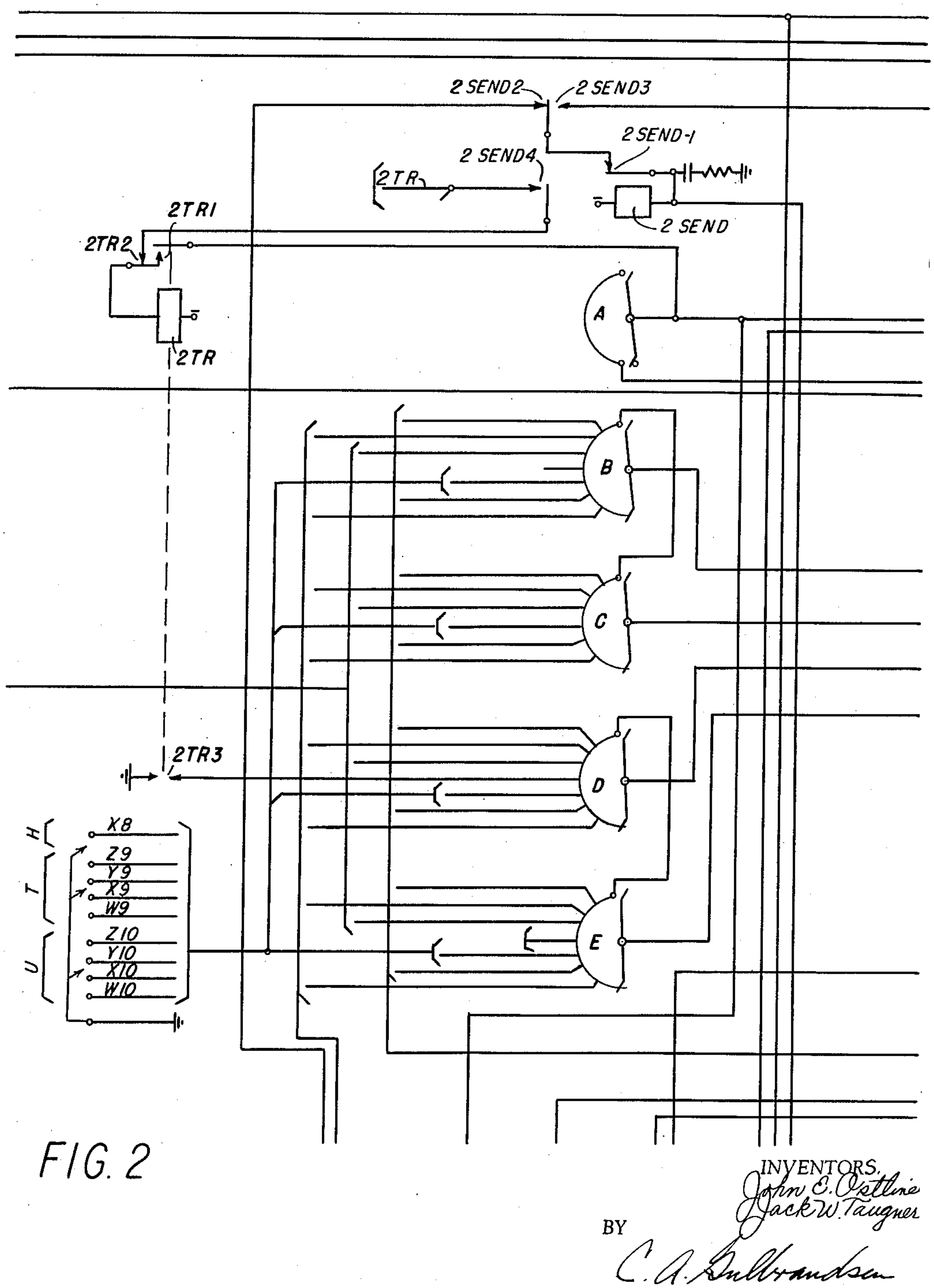
Figure 3:
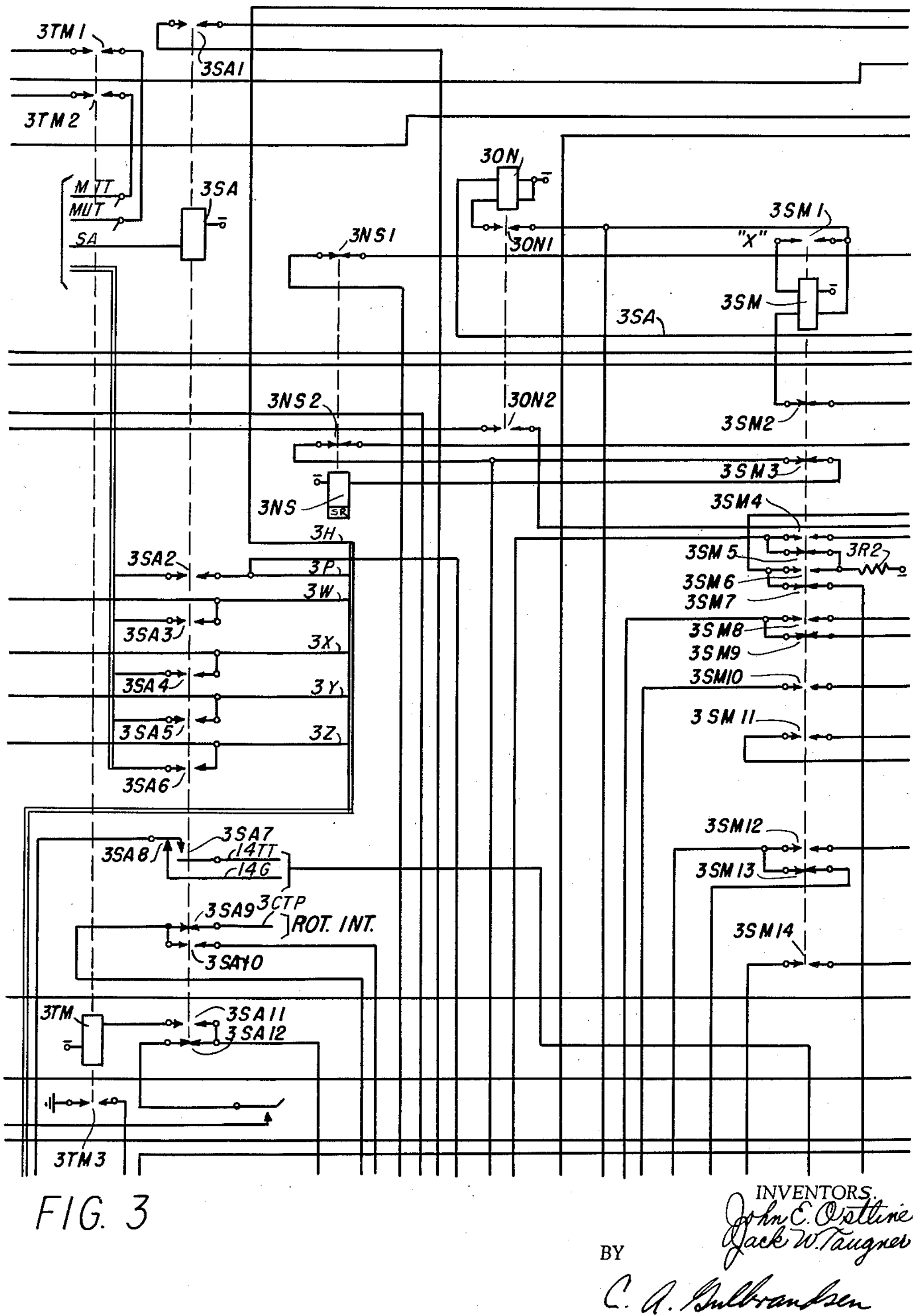
Figure 4:
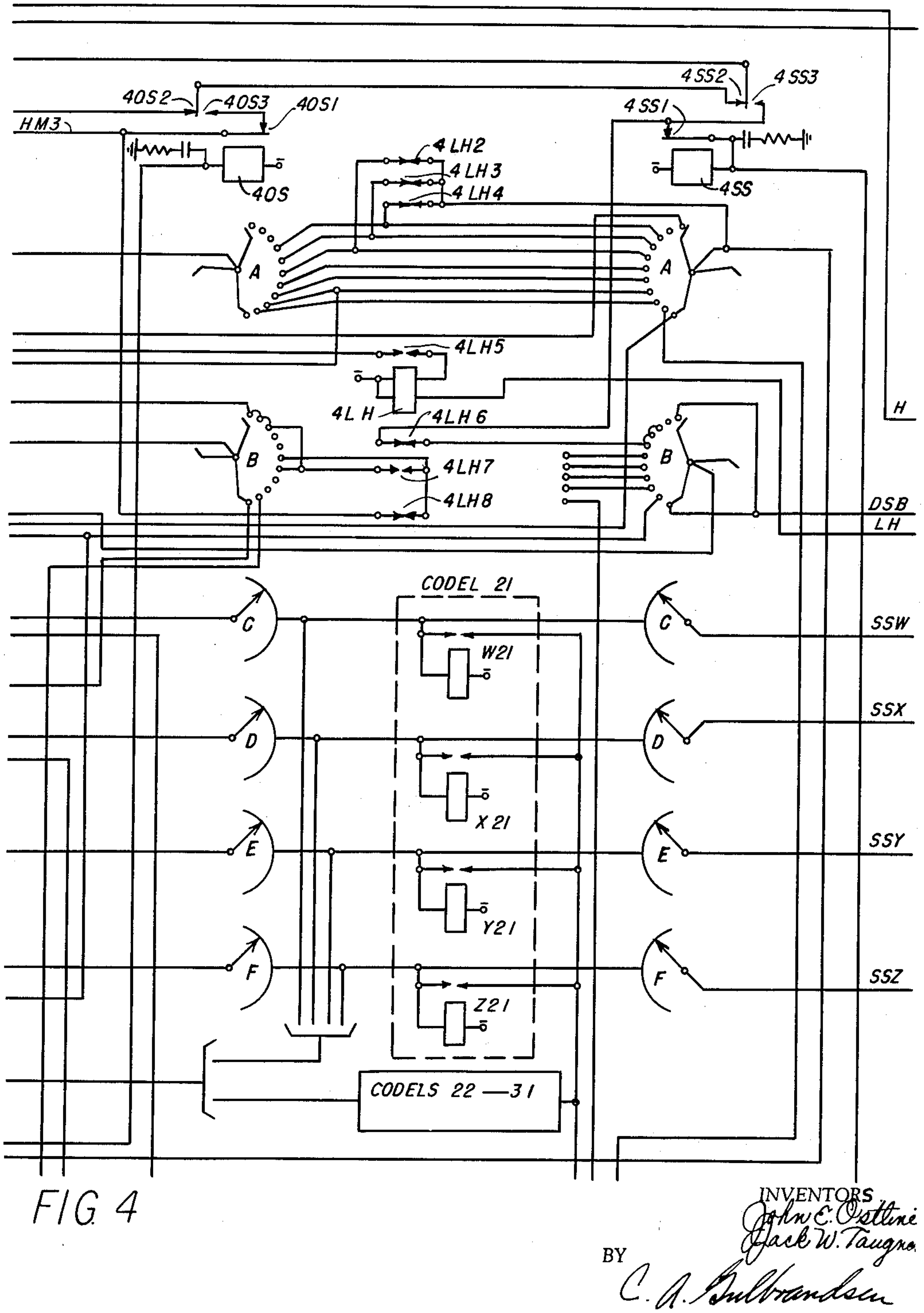
Figure 5:
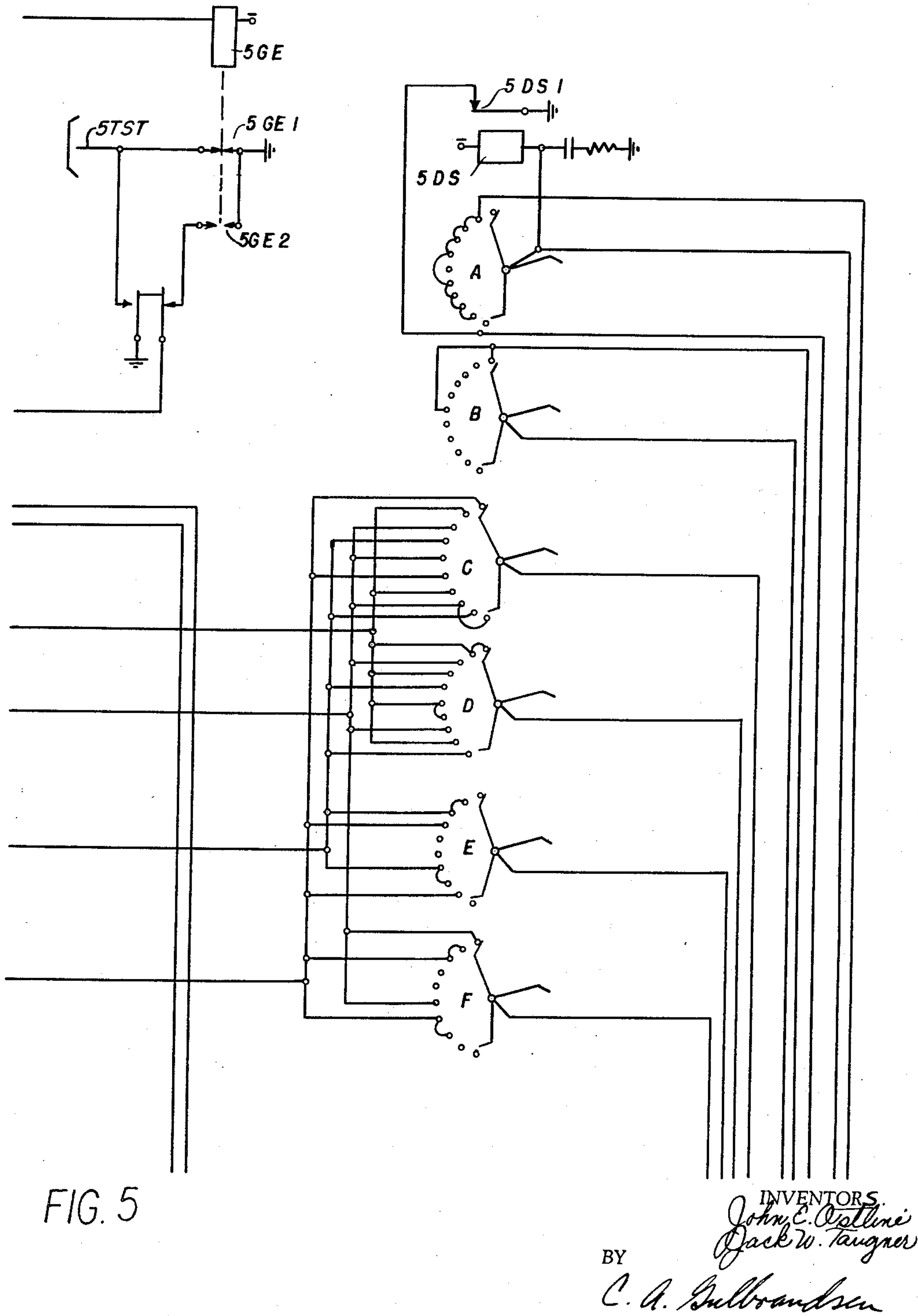
Figure 6:
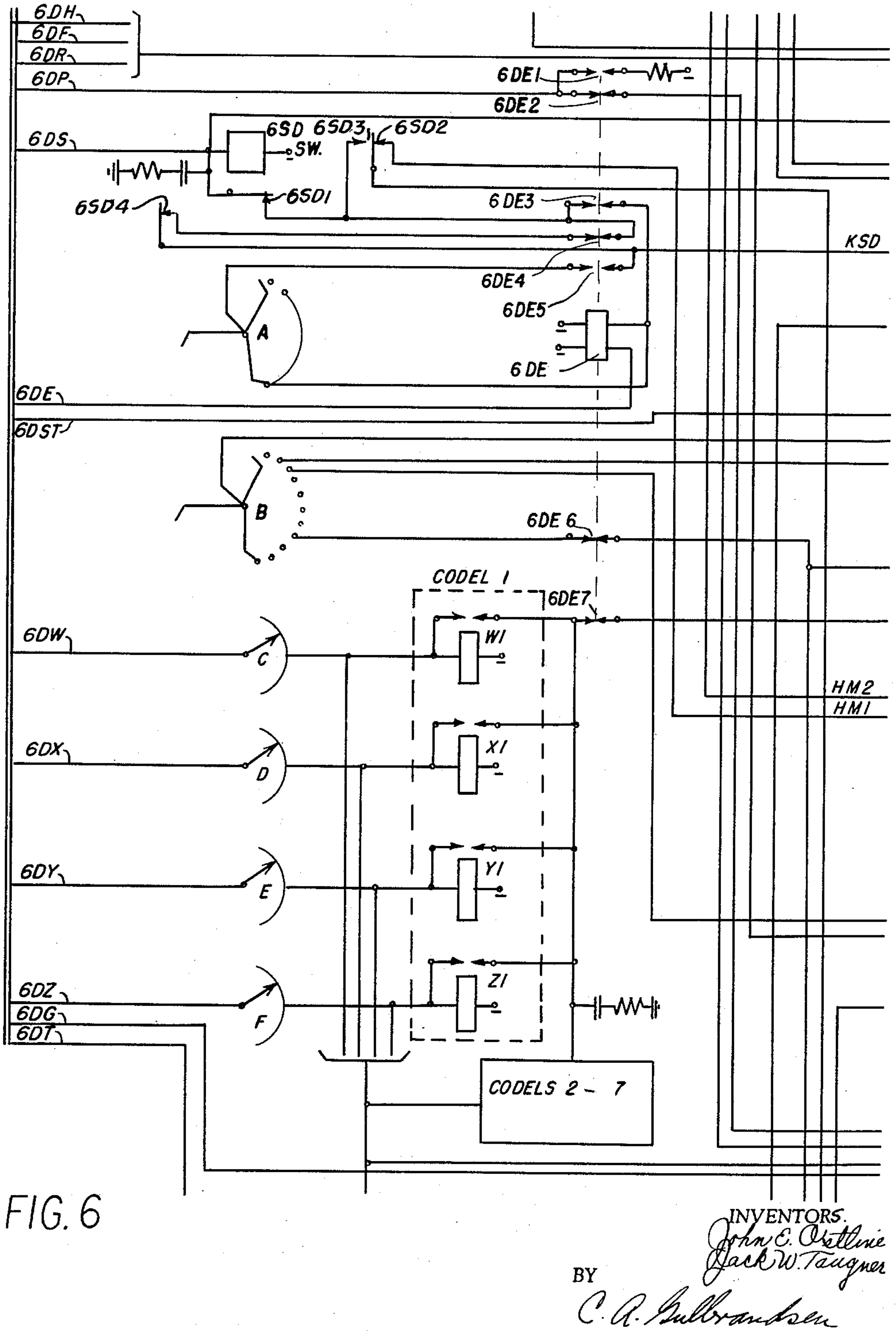
Figure 7:
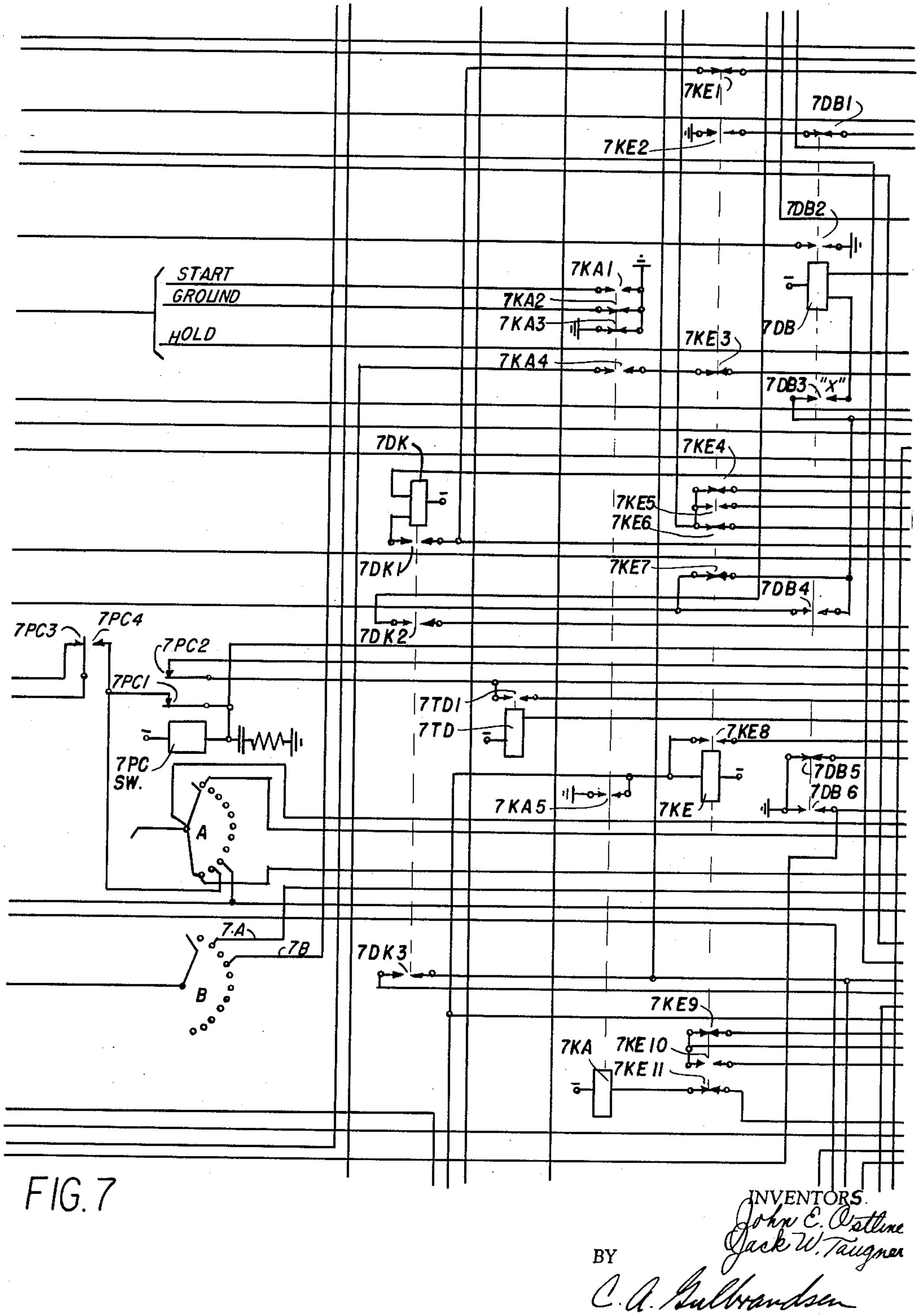
Figure 8:
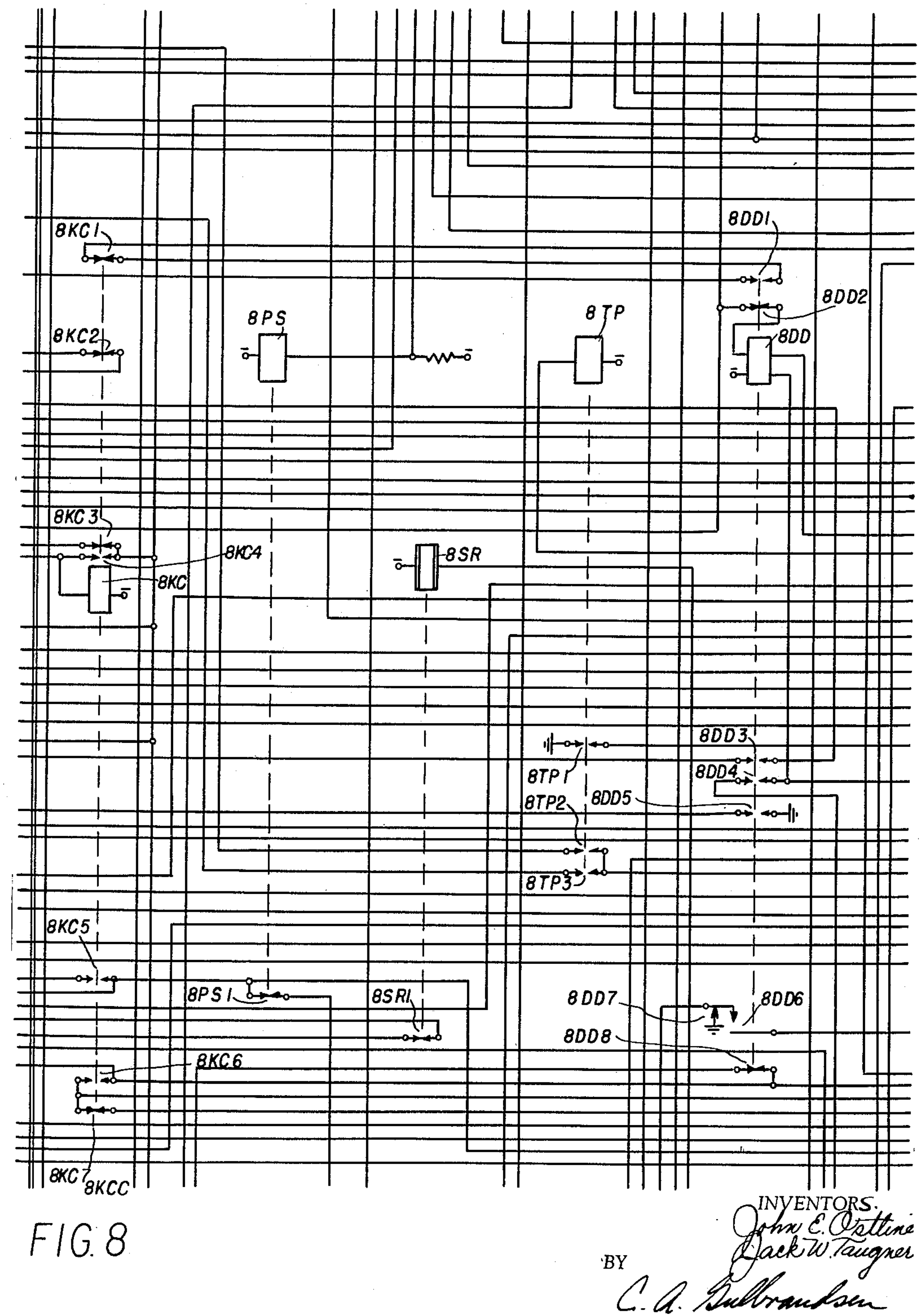
Figure 9:
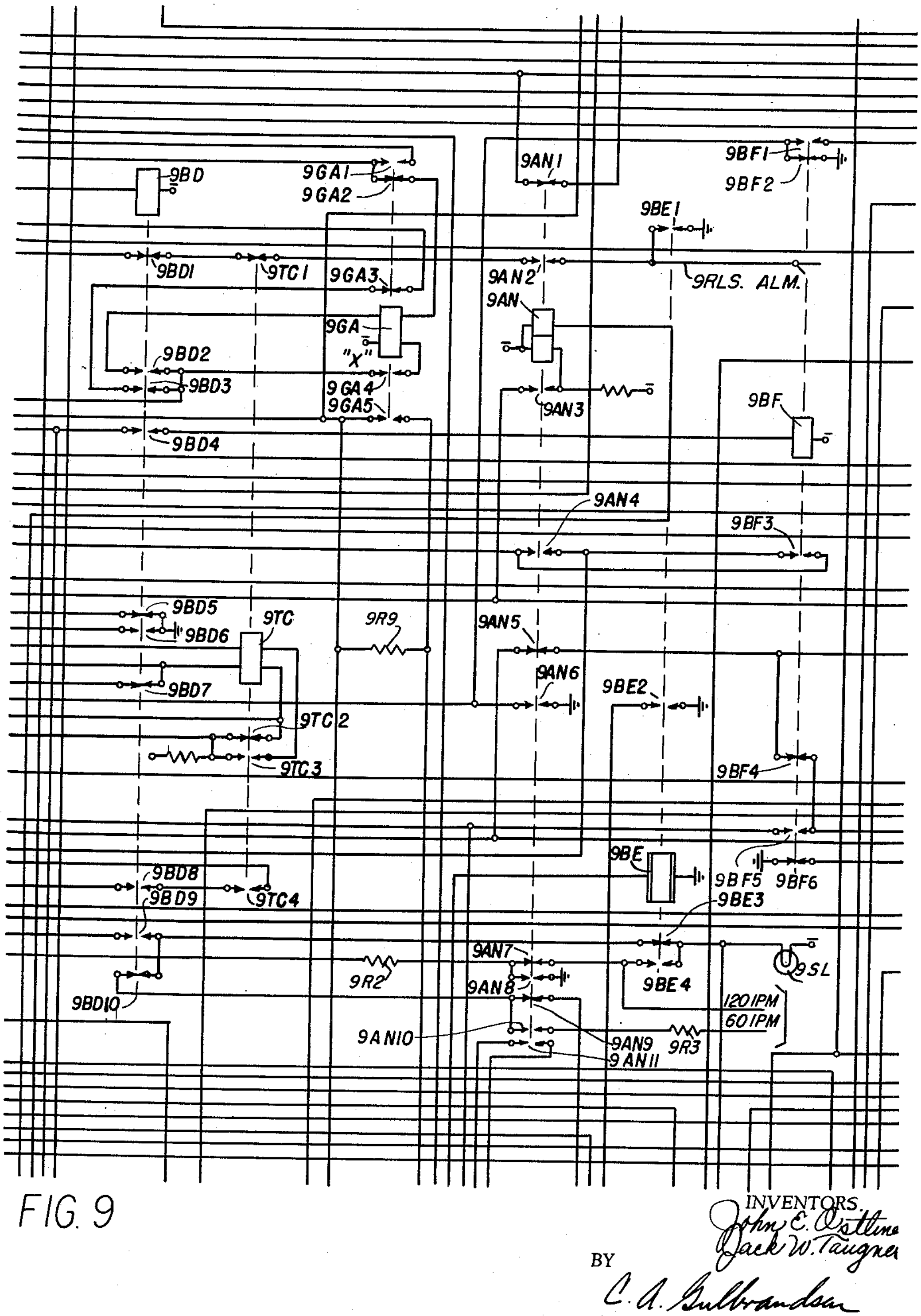
Figure 10:
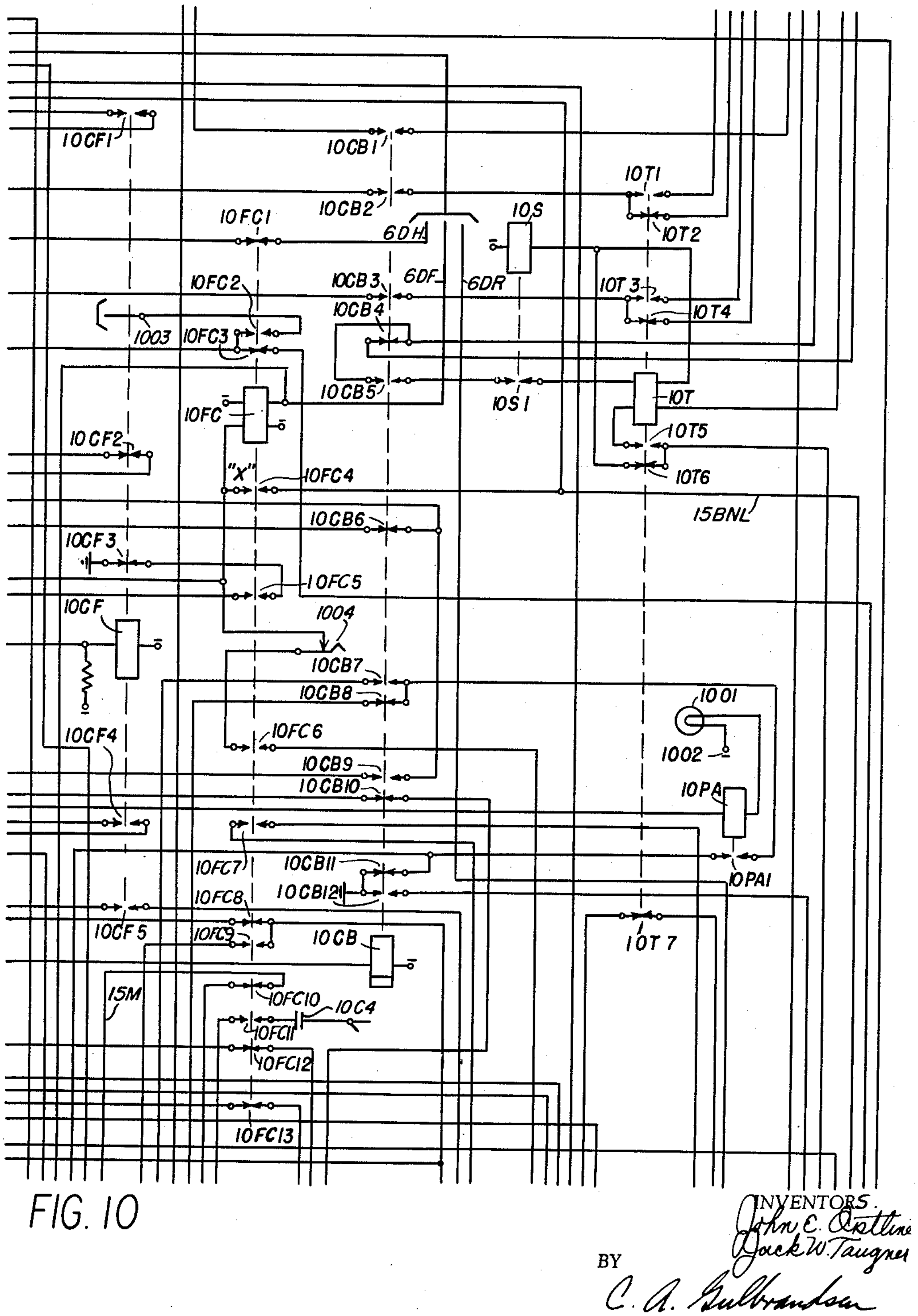
Figure 11:
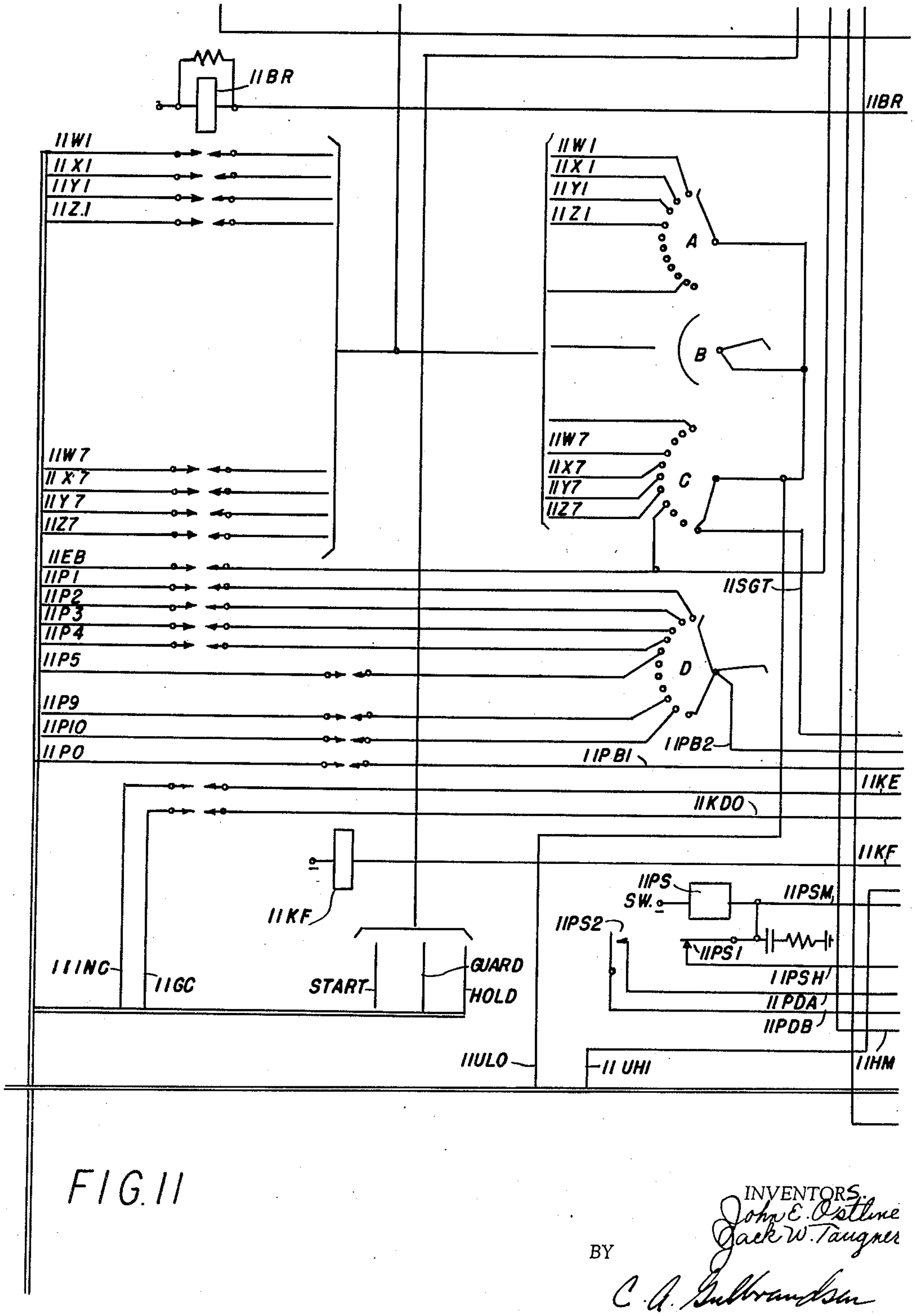
Figure 12:
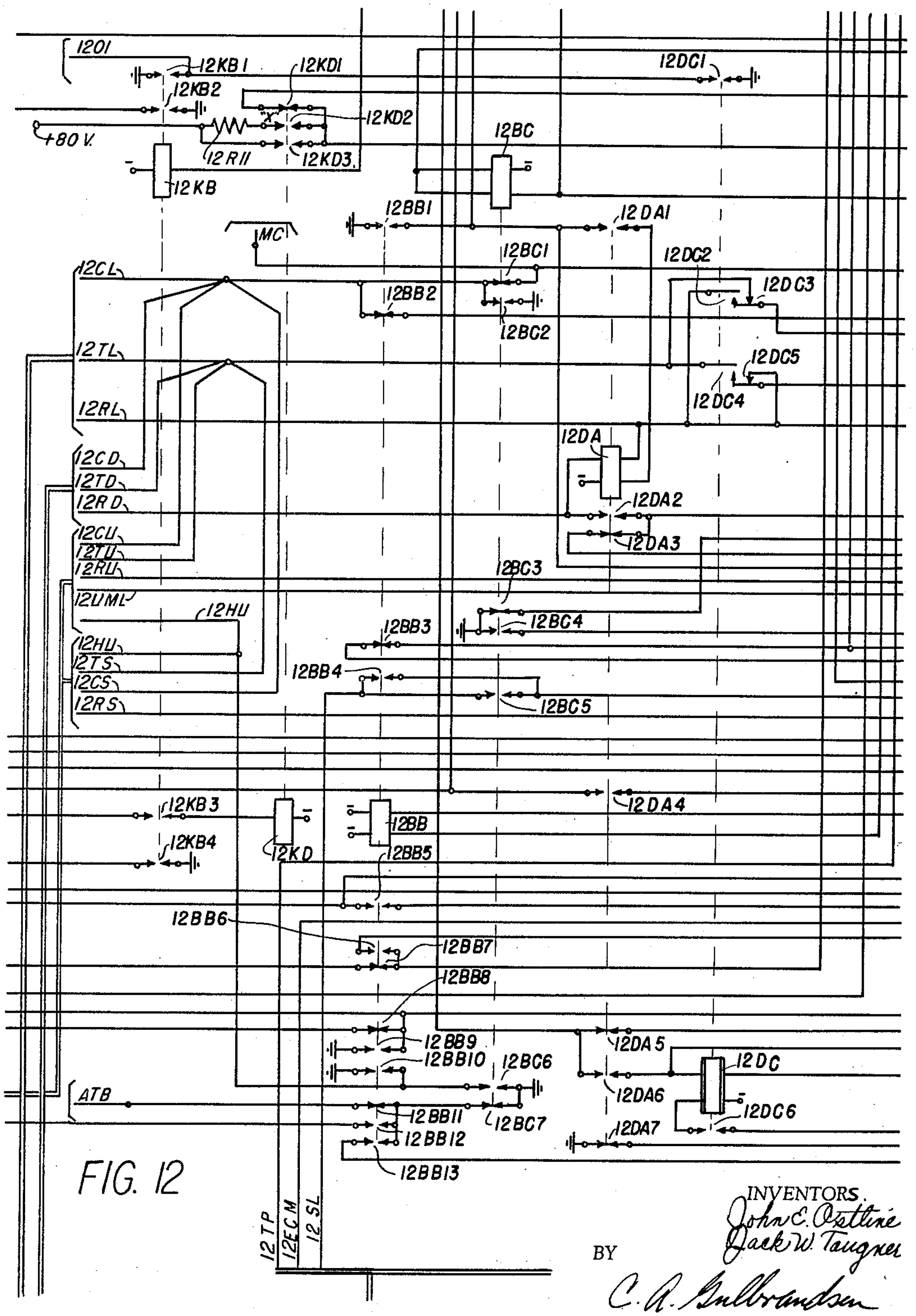
Figure 13:
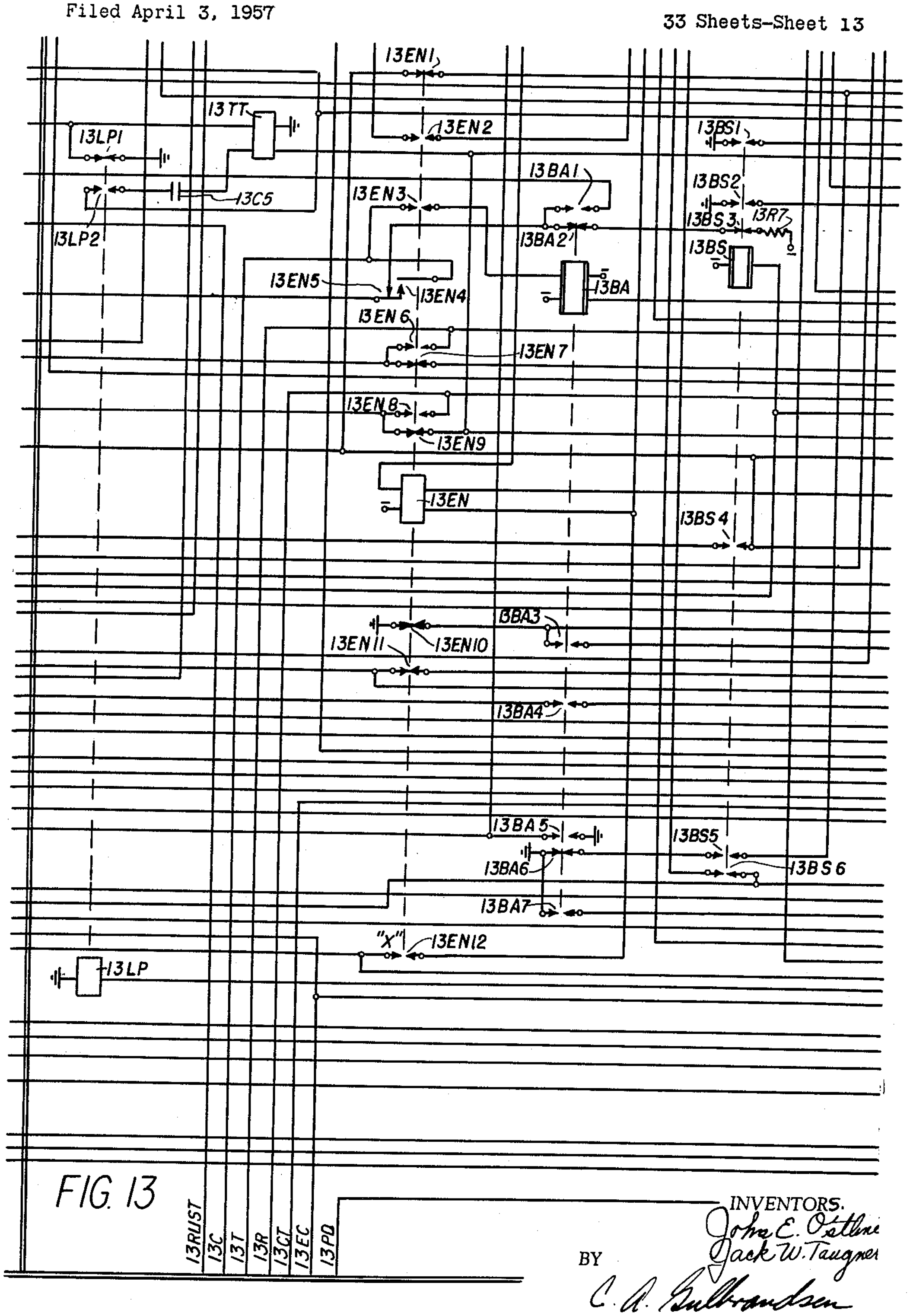
Figure 14:
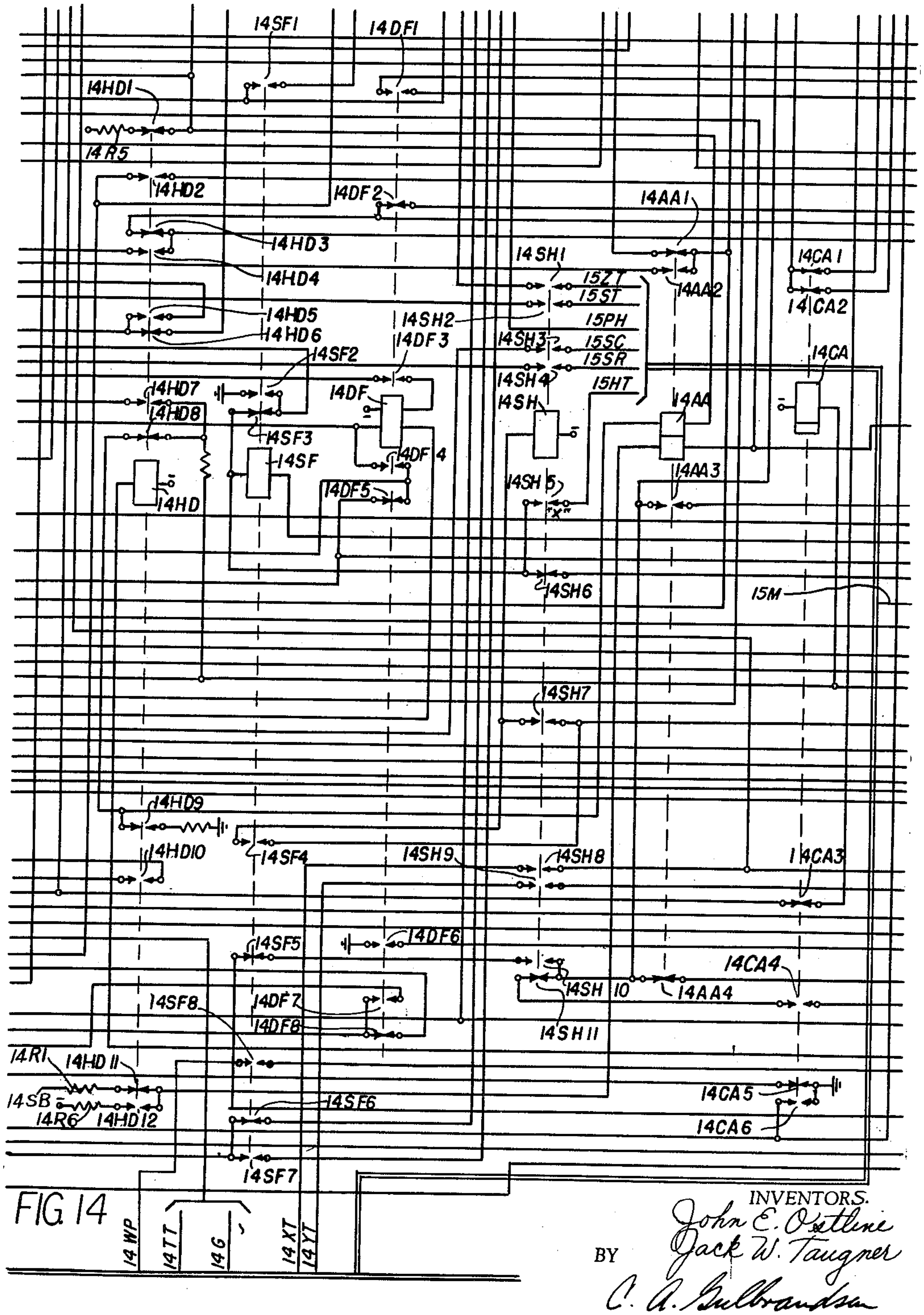
Figure 15:
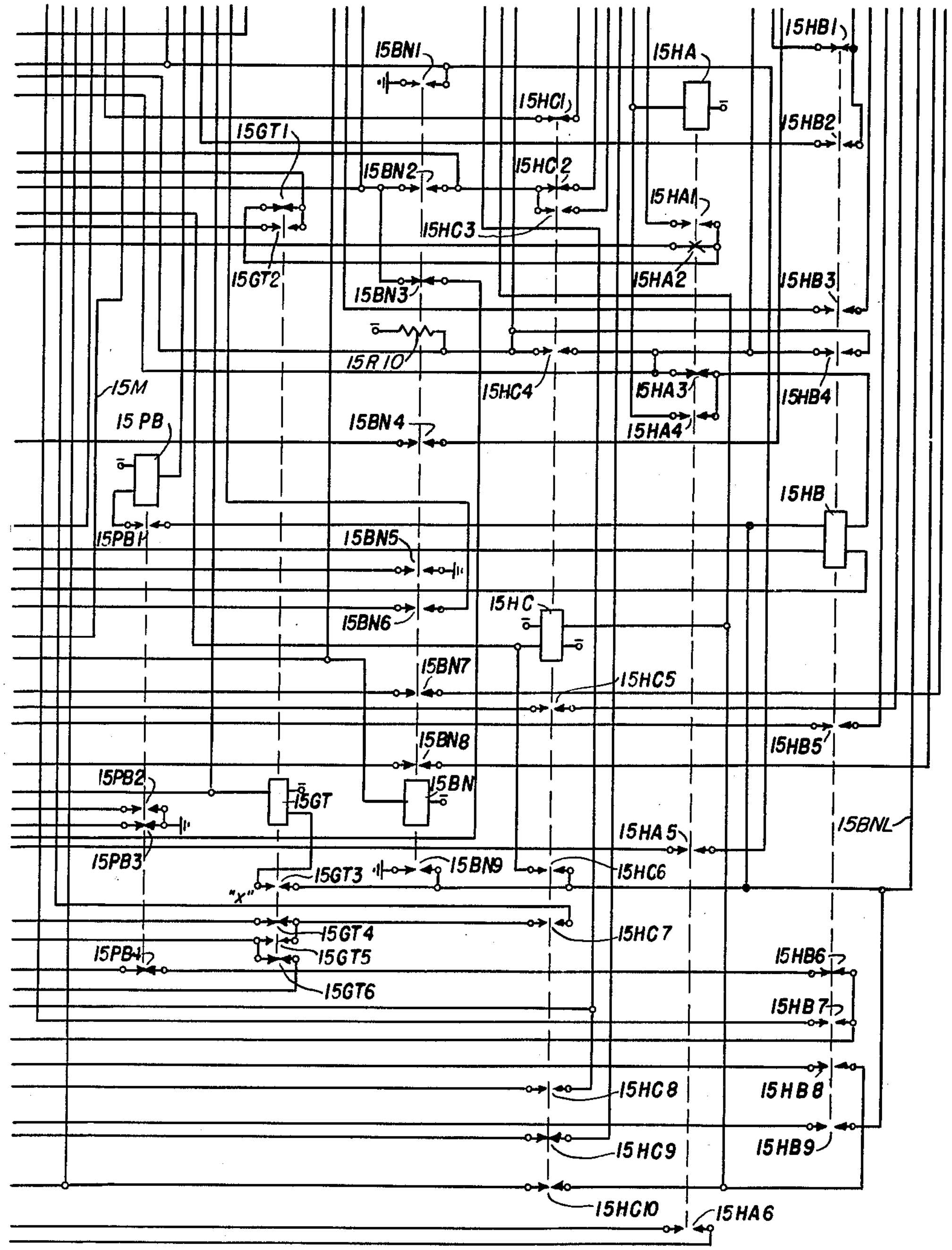
Figure 16:
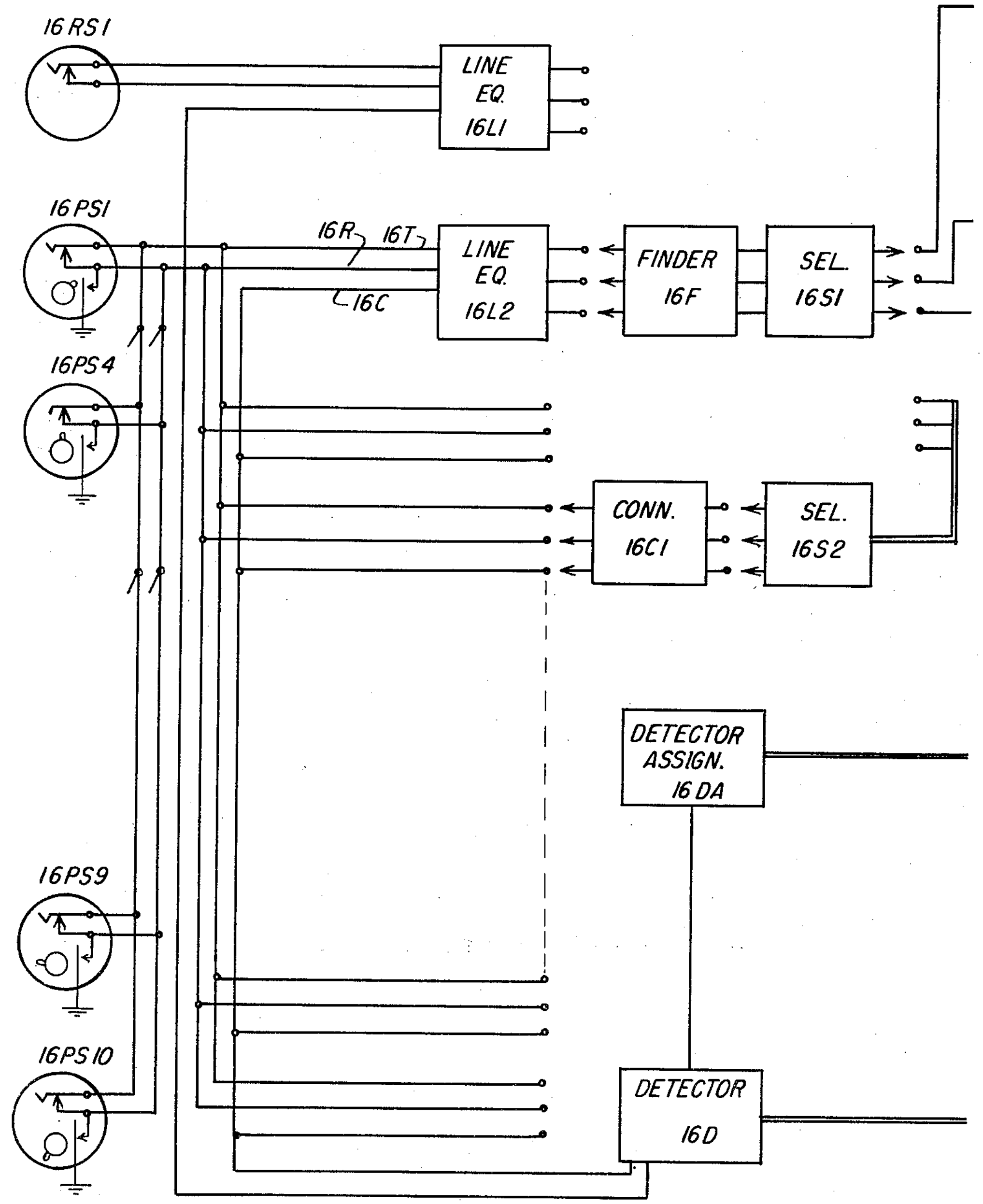
Figure 17:
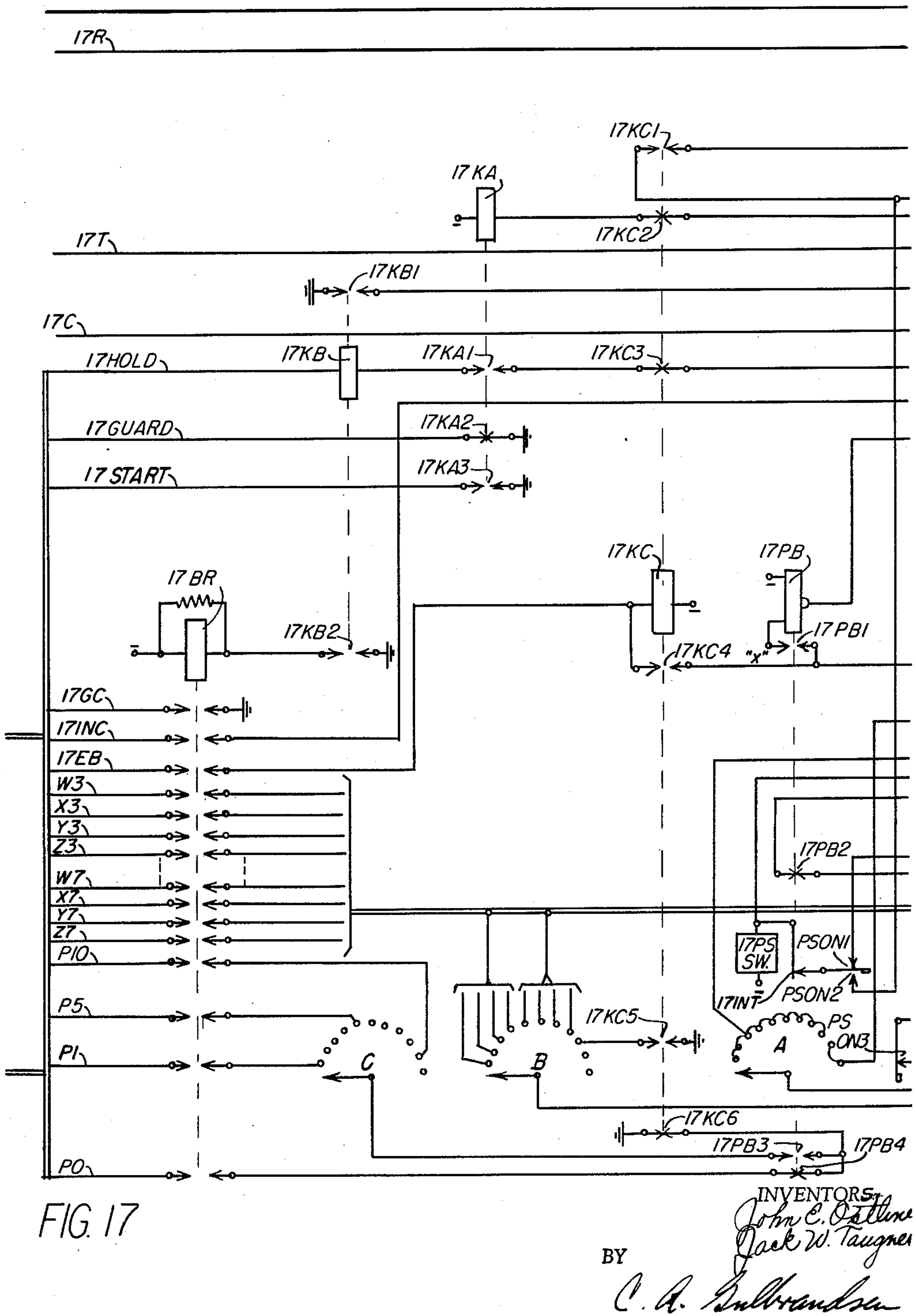
Figure 18:
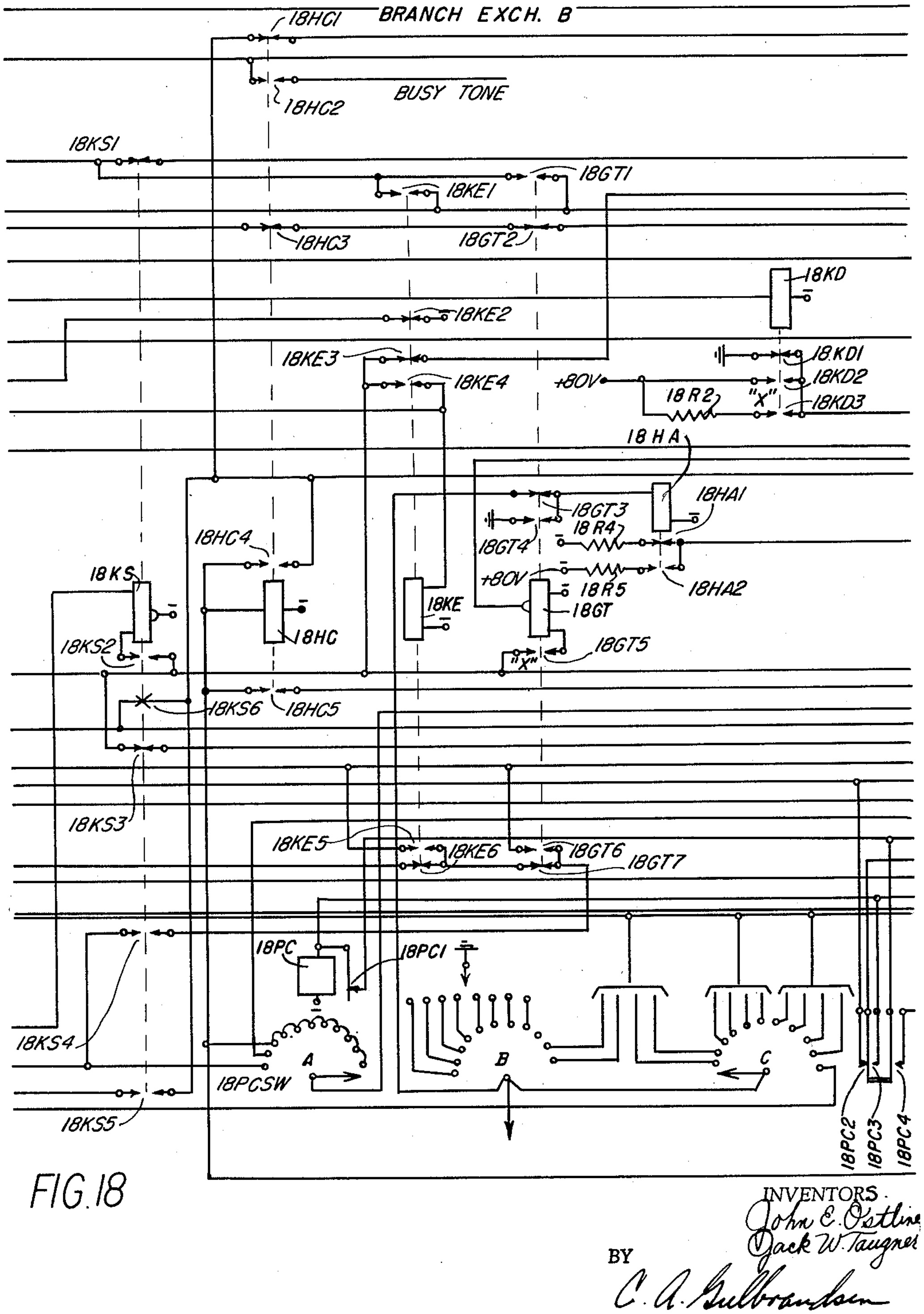
Figure 19:
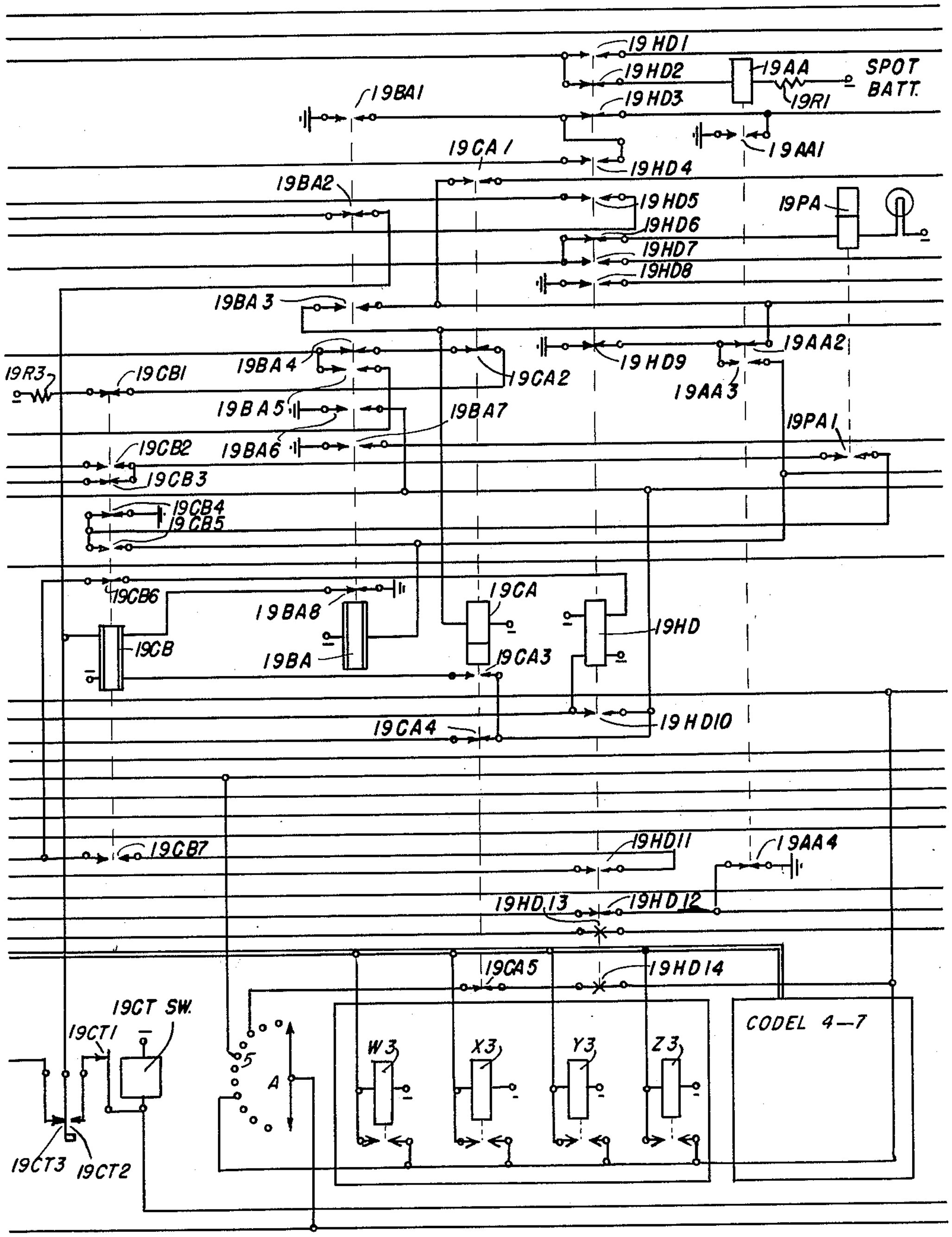
Figure 20:
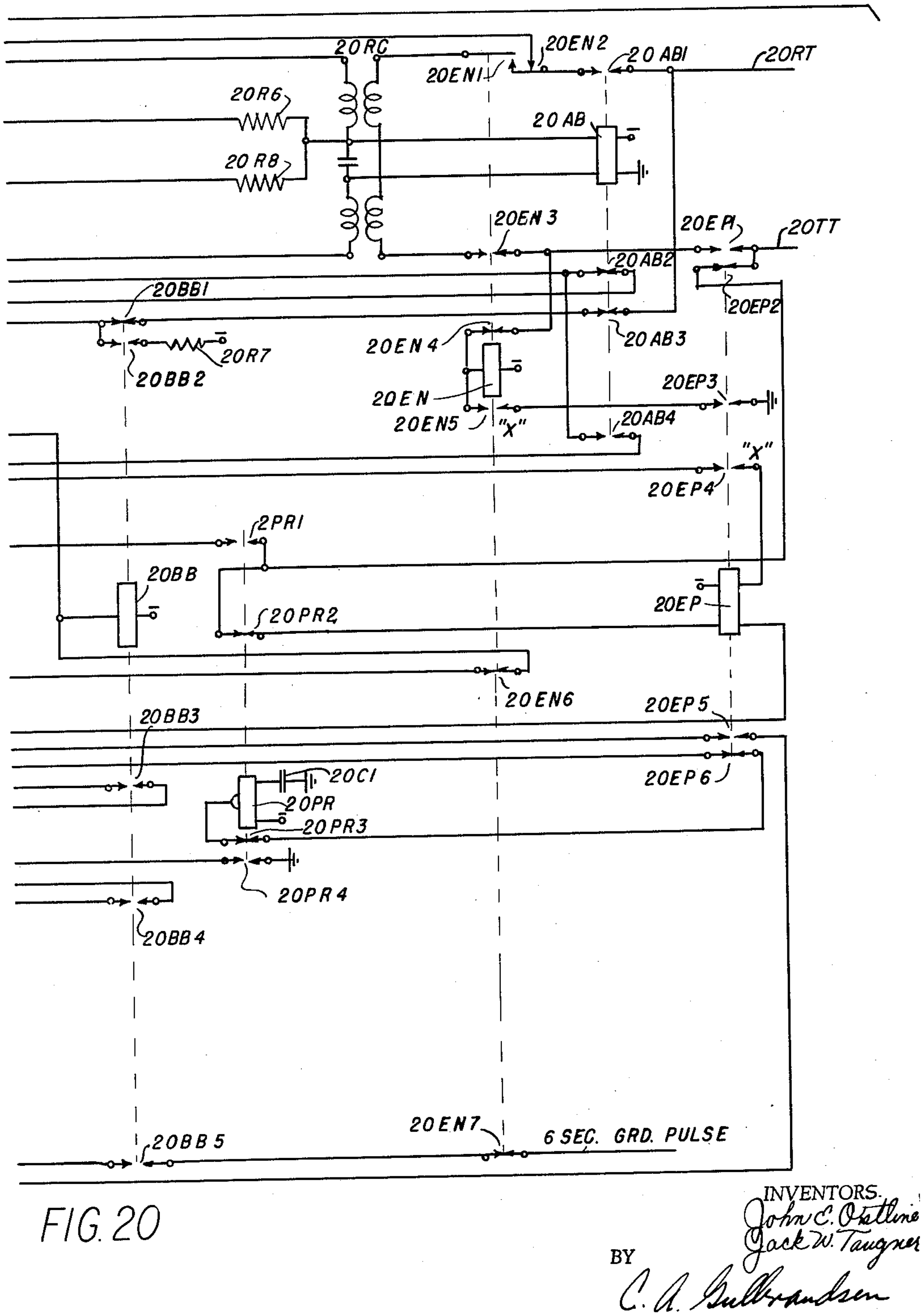
Figure 21:
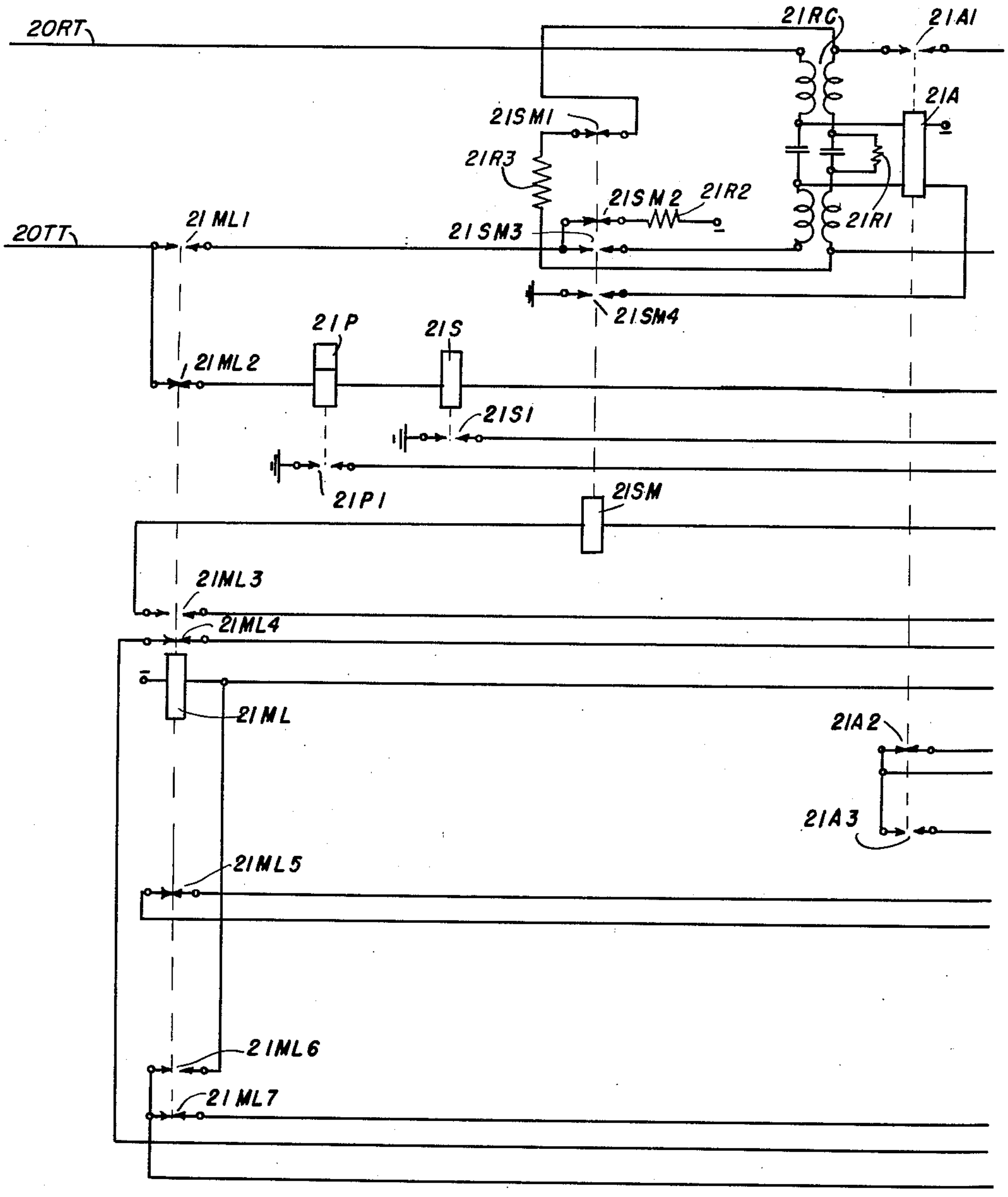
Figure 22:
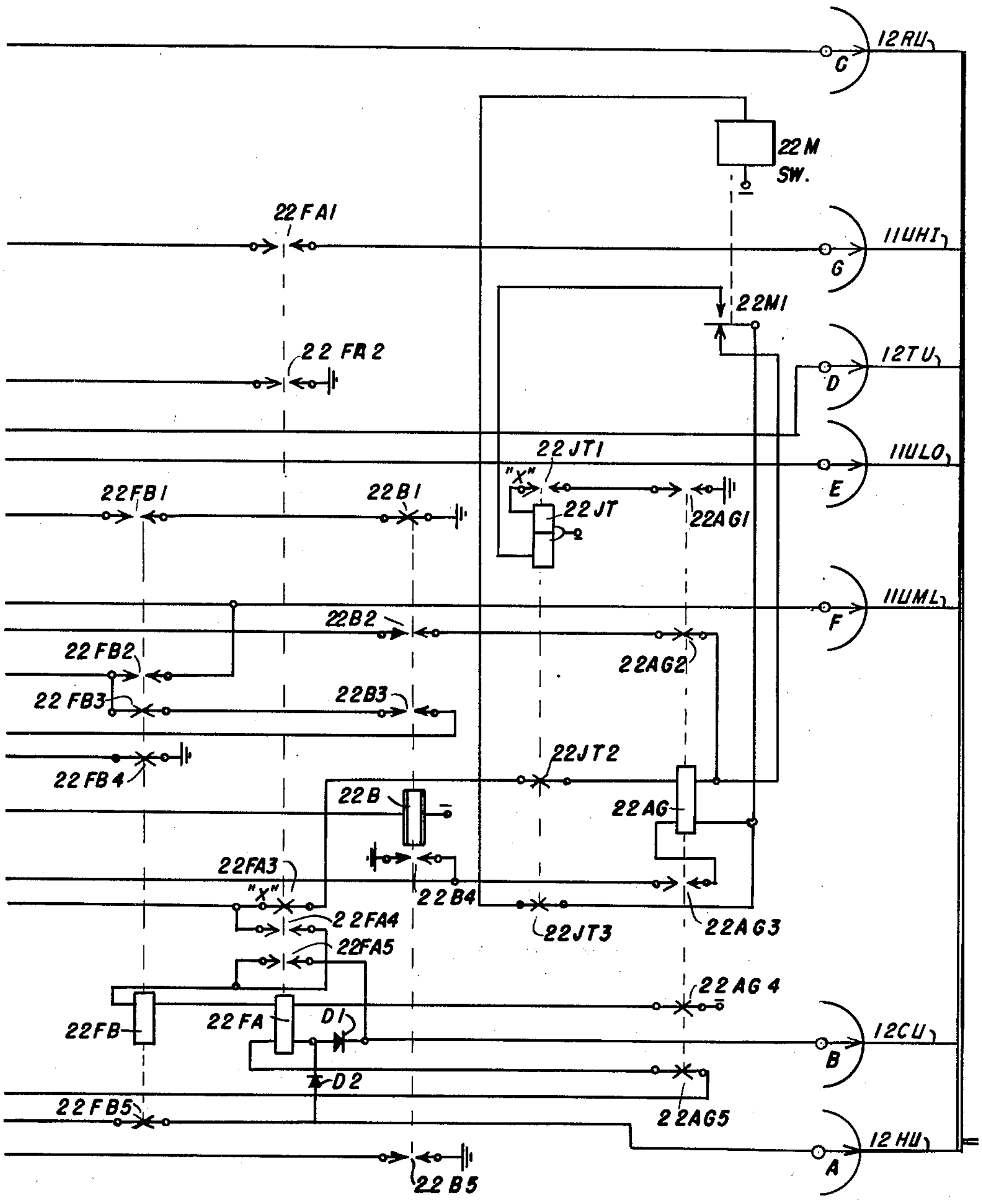
Figure 23:
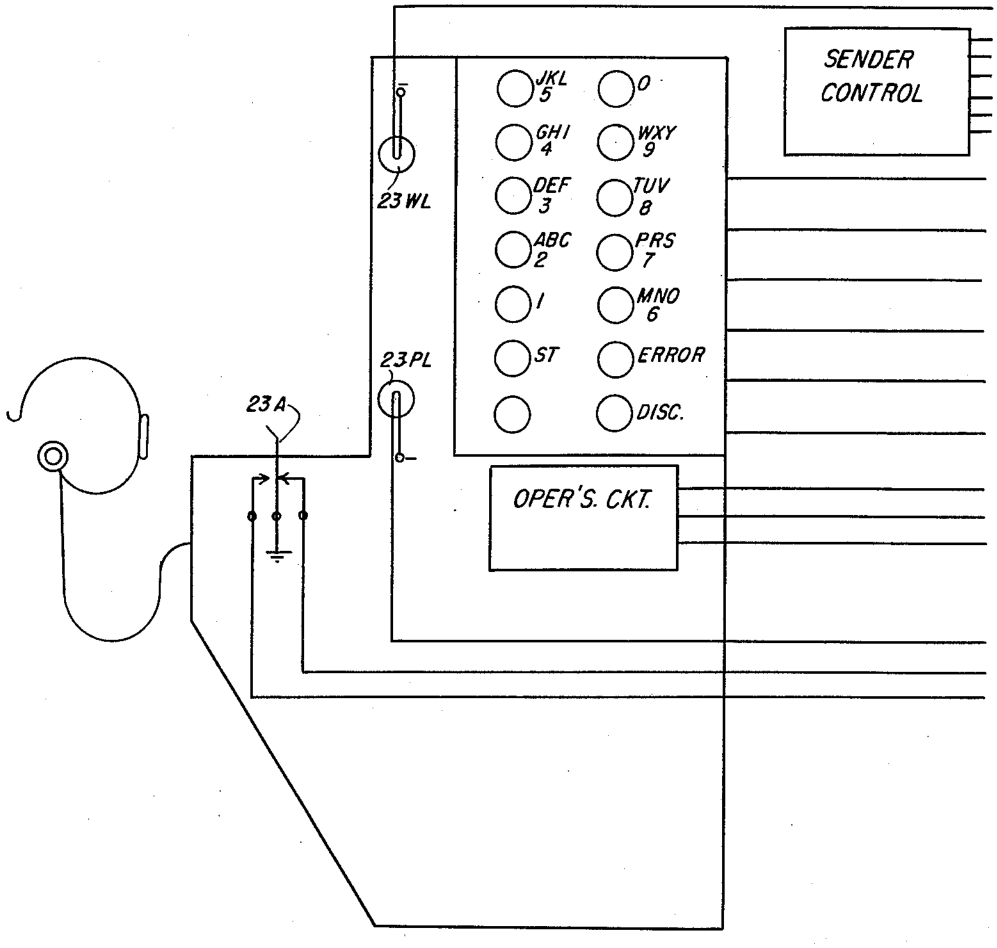
Figure 24:
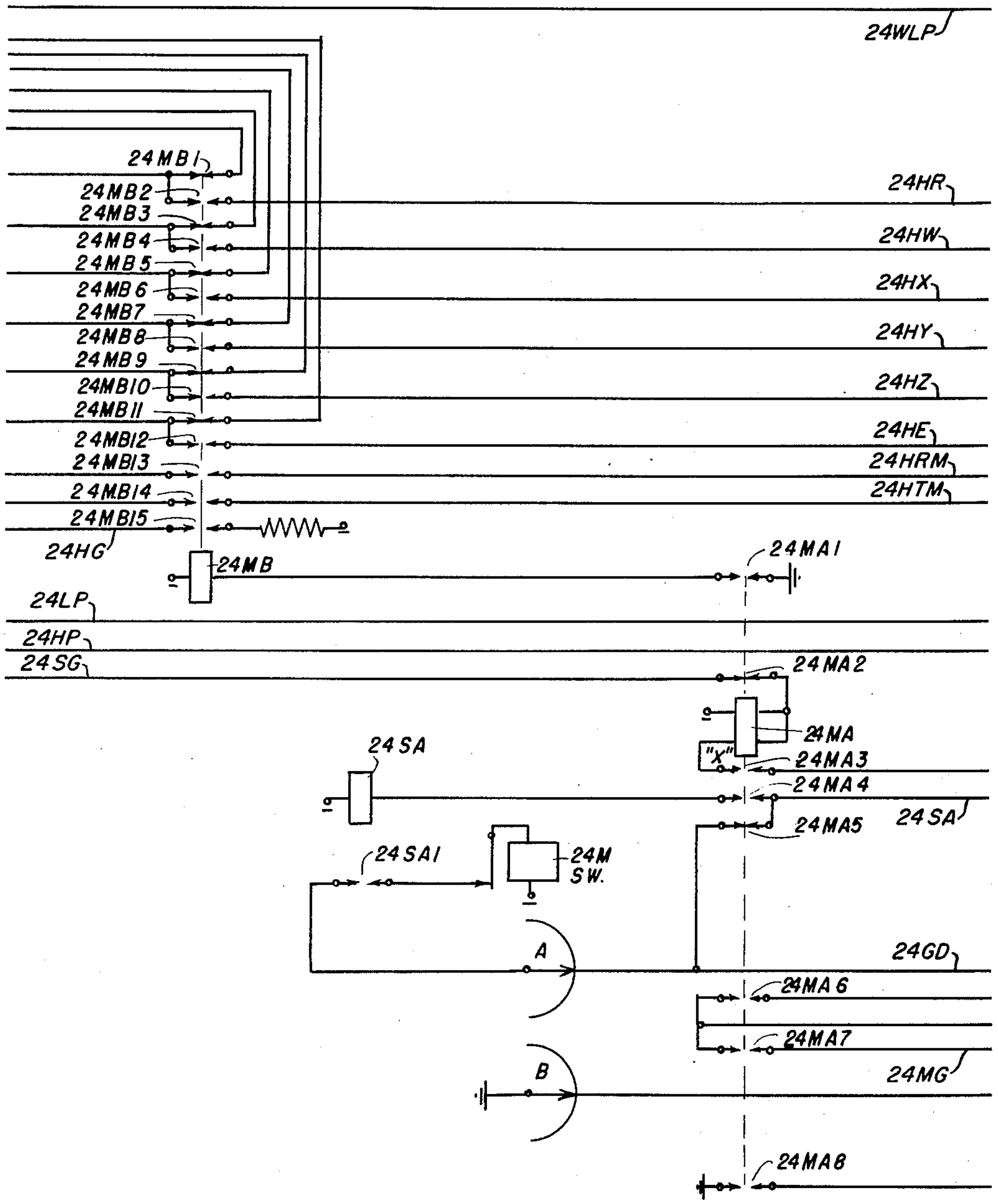
Figure 25:
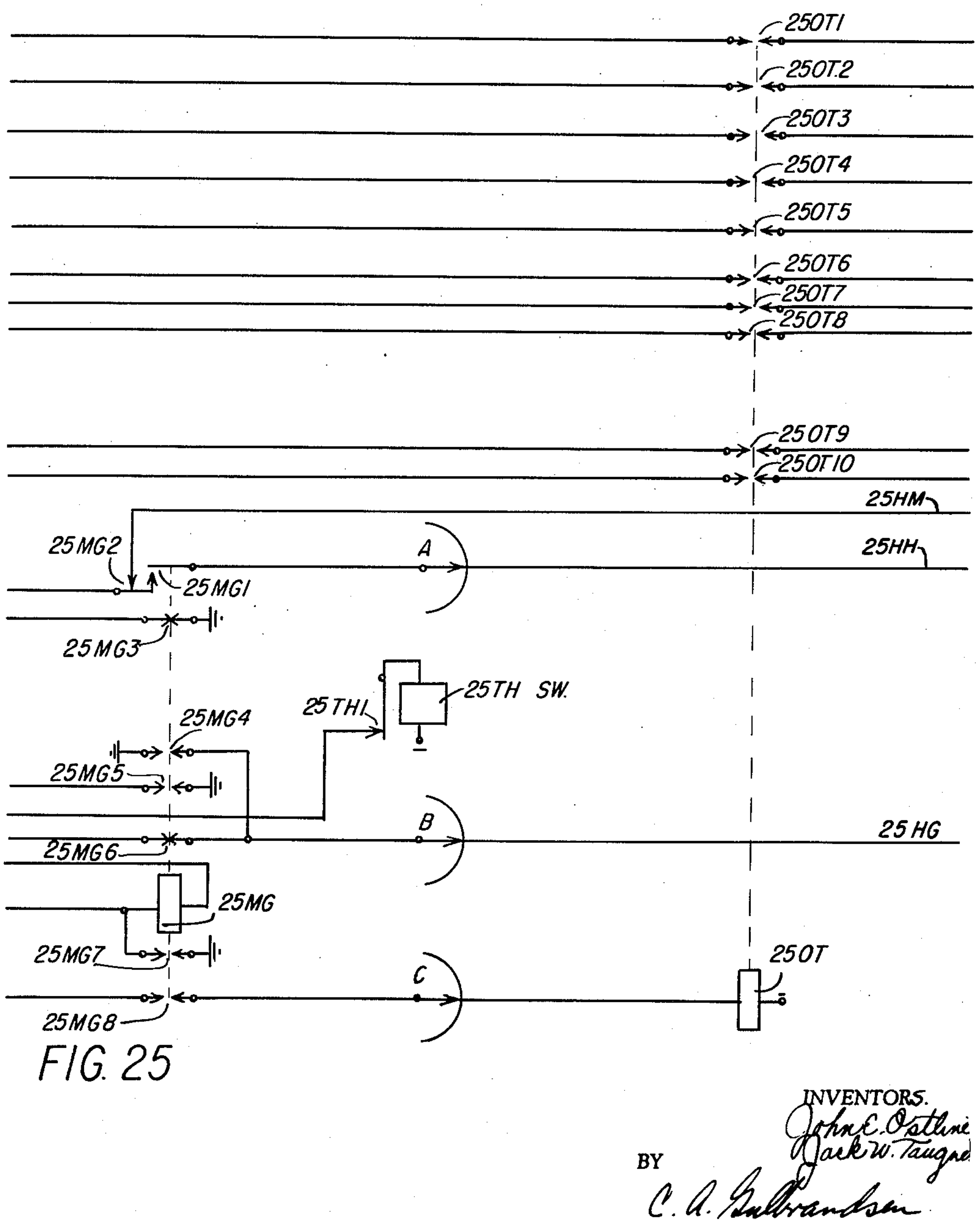
Figure 26:
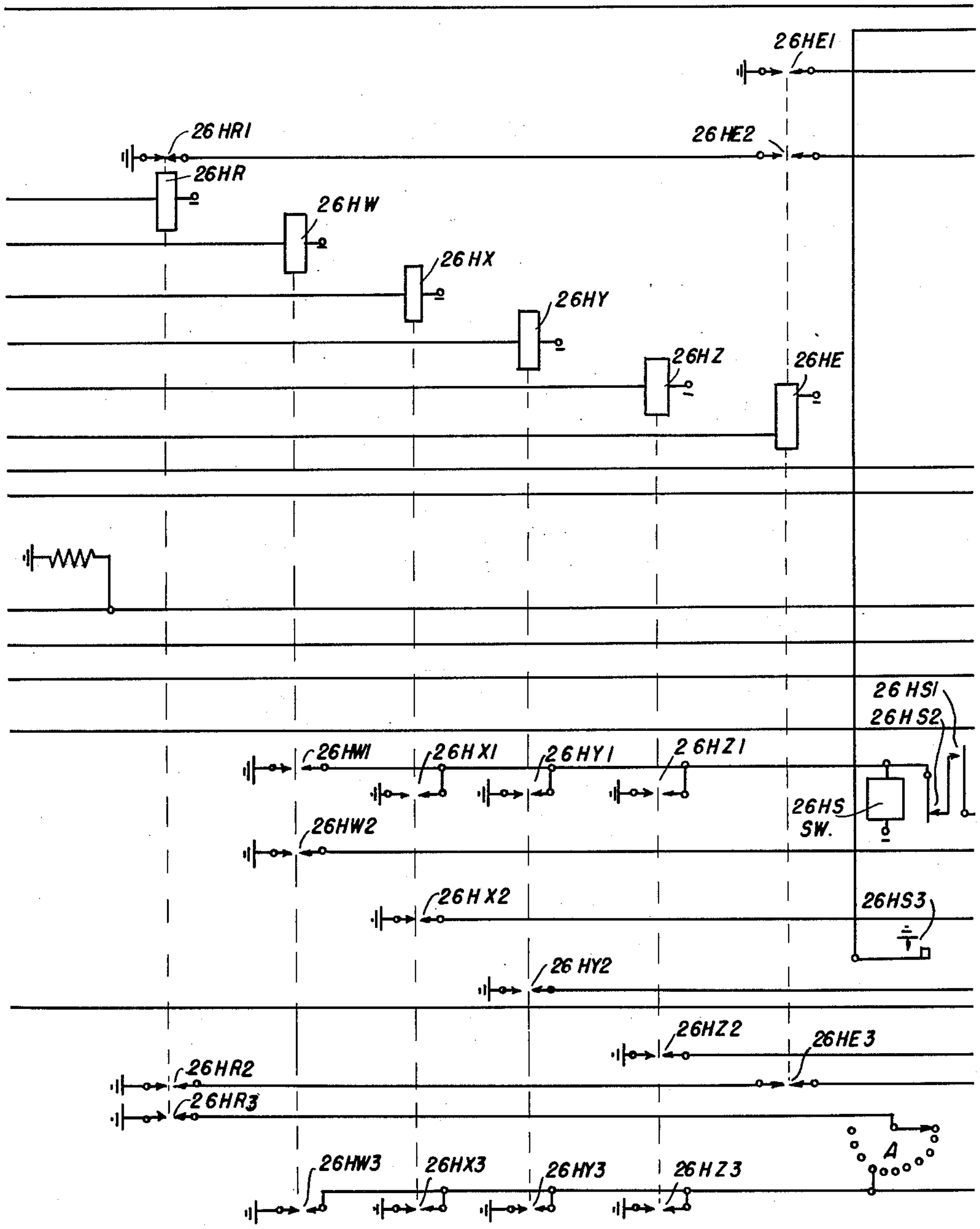
Figure 27:
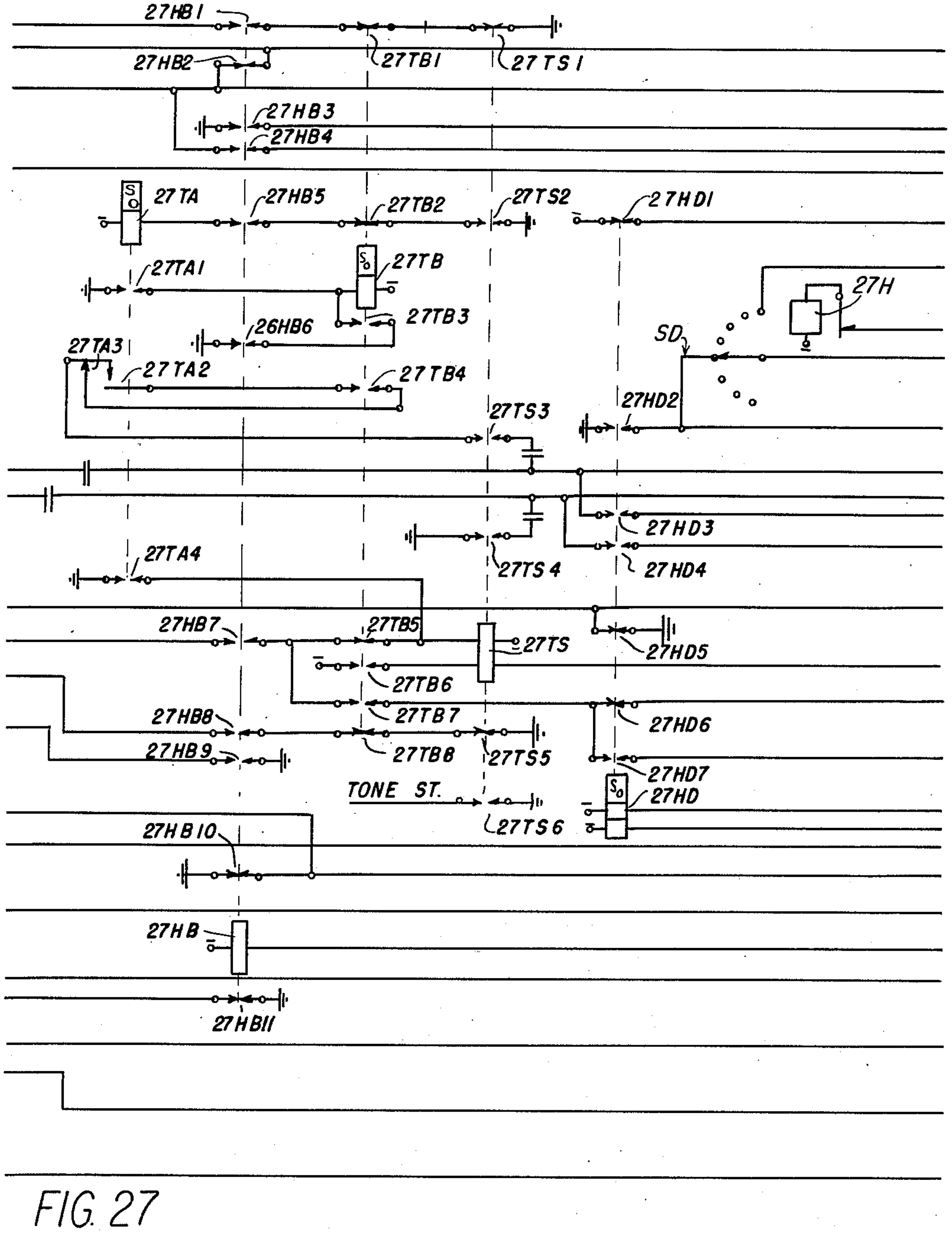
Figure 28:
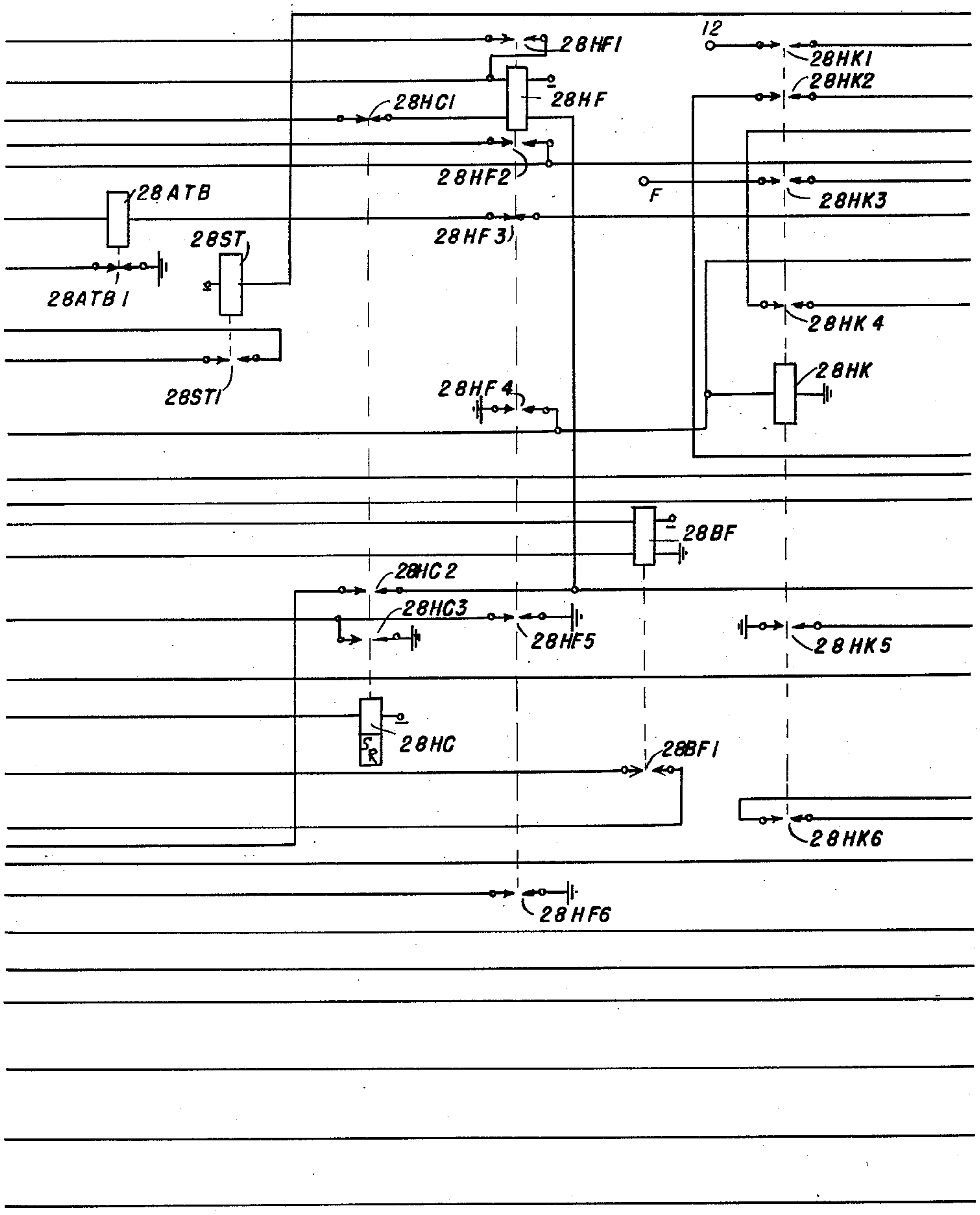
Figure 29:
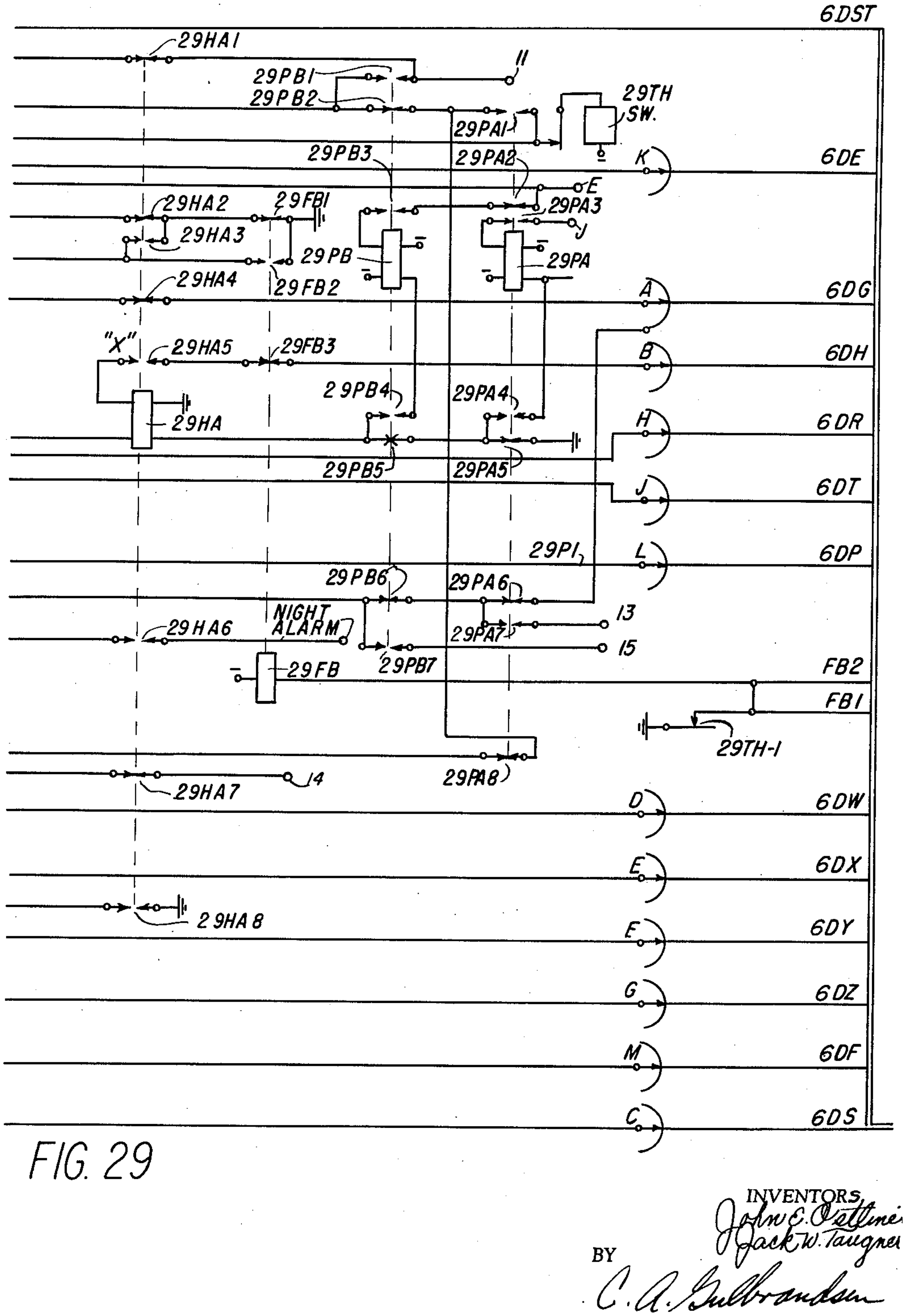
Figure 30:
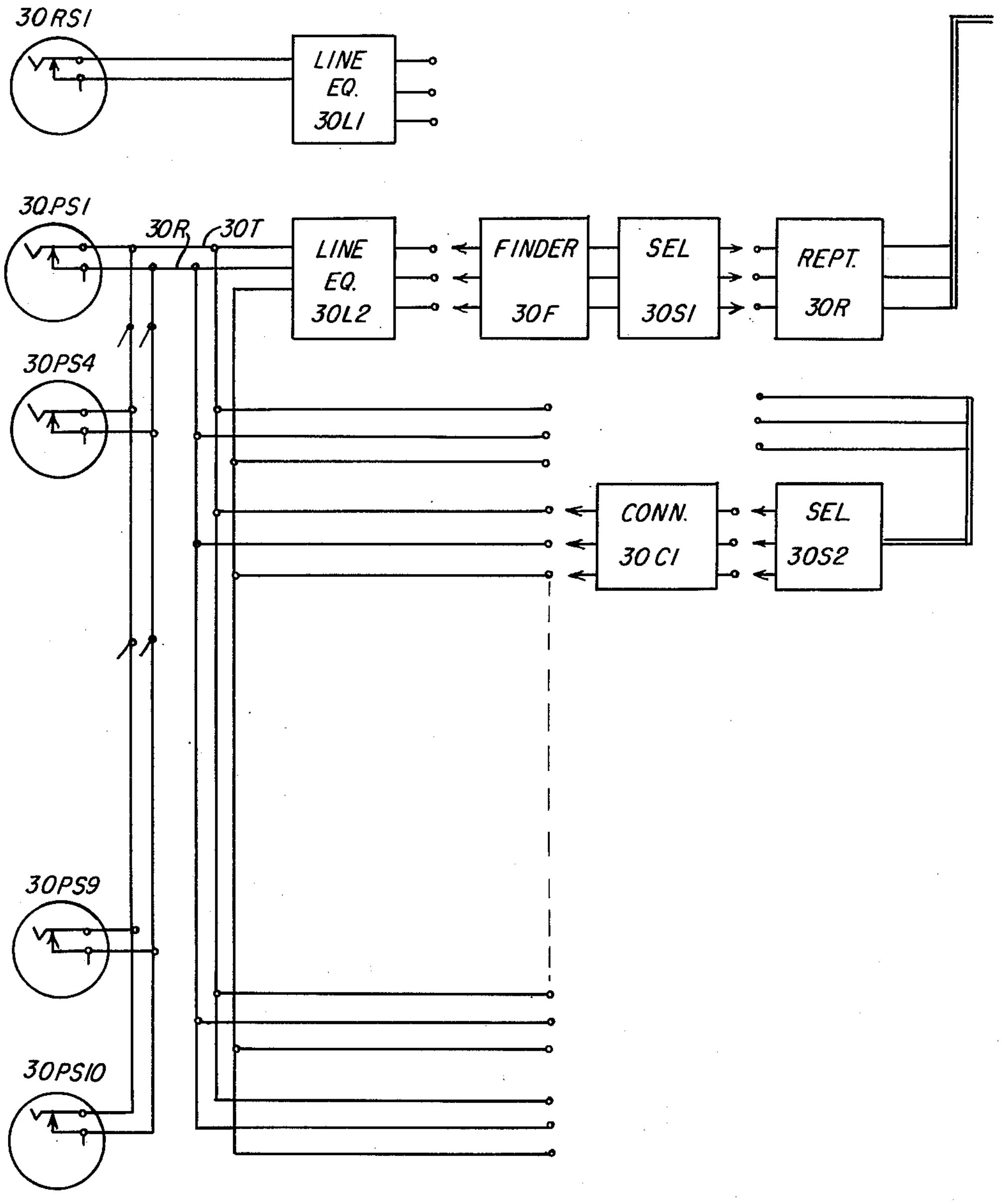
FIG. 30 illustrates in schematic block diagram form the switching equipment of a branch exchange that does not include any detector equipment and also shows two subscriber lines connected to the switching equipment.
Figure 31:
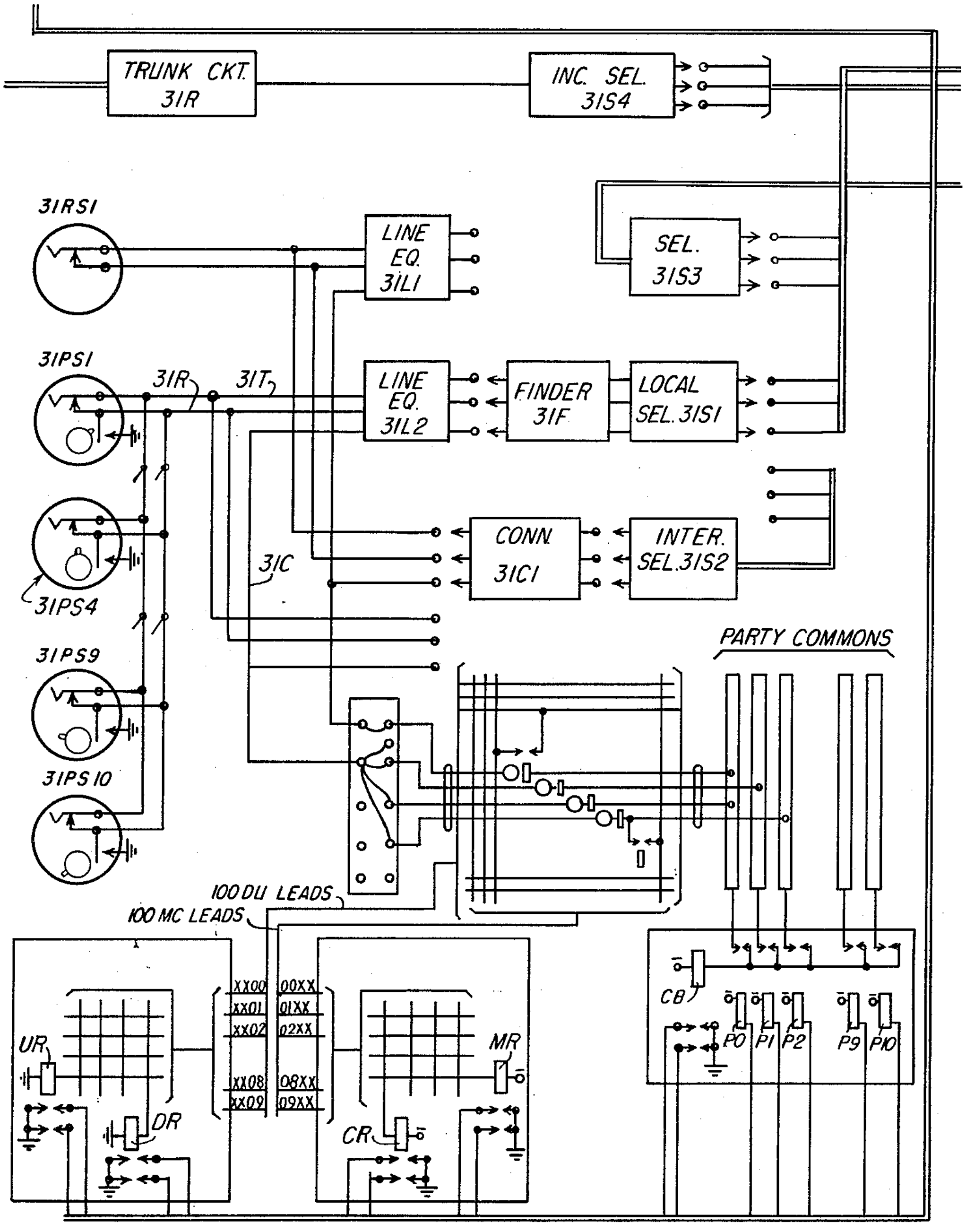
FIG. 31 illustrates in schematic block diagram form the switching equipment of the main exchange, two subscriber lines, a detector allotter in block form and the detector in a simplified schematic form.

The ticketer shown in FIGURES 1 to 15, inclusive, can also be utilized to process calls originating in a branch office such as that illustrated in FIGURE 30.

When the calling subscriber at station 3ORS–1 removes his receiver, the usual loop circuit, including the line conductors 3OT and 3OR is completed for operating the line circuit 3OL2. In response to the completion of the above mentioned loop circuit, the line circuit 3OL2 initiates operation of the distributor and marks the terminals of the calling subscriber line in the bank contacts of a group of line finders, including the line finder 3OF, having access to the calling subscriber line. For the purpose of this description it will be assumed that the distributor selects the line finder 3OF and that the latter finder operates its wiper in a vertical and then in a rotary direction in the well-known manner to select the terminals in the associated bank terminating of the calling line. When the calling line is found by the line finder 3OF, it extends the calling line to the individually associated first selector 3OS1 and the latter selector transmits the usual dial tone signal to the calling subscriber to indicate that the dialling may be started. The above noted switching apparatus, including the line circuit 3OL2, the distributor, the line finder 3OF and the first selector 3OS1 may be of conventional construction and arrangement.

Since the calling subscriber at station 3OPS4 intends to extend the connection to a called subscriber in a remote exchanger it is necessary to prefix the three digit directory number of the called subscriber with the digits "90." Consequently, when the calling subscriber receives the dialling tone signal the dial is actuated in accordance with the digit 9 to transmit nine loop impulses to the first selector 3OS1. This selector then raises its wipers in a vertical direction to the ninth level and then rotates its wipers over the selected level to search for an idle trunk circuit, such as the circuit 3OR. It will be assumed for the purpose of this description that the first selector 3OS1 now extends the connection from the calling subscriber line by way of the — conductor, the + conductor and the control conductor. If the trunk circuit is busy, the control conductor will be grounded in order to indicate the busy condition to the first selector 3OS1. Thus, as the selector rotates its wipers over the ninth level it will pass over contacts terminating trunk circuits having grounded control conductors corresponding to the C conductor.

When the first selector S1 seizes the trunk circuit 3OR it extends the loop circuit, including the — and + conductors of the calling line to the — and + conductors of the trunk circuit. The trunk circuit 3OR then extends the — and + conductors to an incoming trunk circuit 31R in the main exchange. The incoming trunk circuit 31R is directly connected to an incoming ticketer hunter 31S4. The ticketer hunter hunts for an available ticketer and extends the calling loop conductors and the repeaters control conductor to the 12TD, 12RD and 12CD conductors respectively.

*Remote Access Calls for Type "D" Service*

Type "D" SATT stations are not arranged for individual identification by detection equipment. The calling number is verbally obtained from the calling party by a "BD" Operator who keys the number into the Ticketer. When seized from an Incoming Selector, most operations are identical to those previously described with the following exceptions: no automatic detection is made of the calling number. Relays 10PA, 15PB, 7KA, 12KD and 8SR do not operate at any time. Relay 12DA, on the other hand, will operate only when seized by the Incoming Selector. The party identification digit is still included in the access code and provides a time interval for connection of an idle Transender to the Ticketer. Those operations which are materially different for remote access calls from an Incoming Selector are described below.

*Seizure From Incoming Selector or Ticketer Hunter*

Resistance (13R7) battery on lead 12CD marks this switch idle to preceding incoming selectors. When seized, the "tip" side of the subscriber's loop is closed via lead 12DT through polar relay 10PA and lamp to exchange battery the "ring" side of the subscriber's loop is closed via lead 12RD, through the number one windings of relays 12DA and 14AA and resistor 14R6 to Spotter Battery. Relay 12DA operates in series with relay 14AA, prepares its holding circuit and prepares the circuit to relay 7KE. Relay 14AA operates and closes the number one winding of relay 13BA and relay 15BN. Relay 13BA operates, closes the number one winding of relay 12BB and closes ground to lead 12CD to hold the preceding equipment and mark this circuit busy. Relay 15BN operates, closes relay 14SF and lead 14G to lead 15M of the Transender Hunter. Relay 12BB operates, closes a holding path to the number two winding of relay 12DA, closes relay 13BS ground to lead 12HU to provide an additional busy mark to the Incoming Trunk circuit and closes the SUPY lamp 9SL. Relay 13BS operates, shorts the number one winding of relay 12DA and closes direct ground to the SUPY lamp 9SL. The SUPY lamp 9SL lights brightly to indicate that the Ticketer has been seized.

If the associated Transender is busy, ground appears on lead 14G, thus shorting relay 14SF and causing the Transender Hunter to search for an idle Transender. Subsequent operations are as already explained in the section titled "Seizure of Ticketer."

*Dialling the Access Digit "0" and the Called Number for Seven, Eight, Ten or Eleven Digit Calls*

The subscriber dials the digits of the called number and registration takes place as described in the section titled "Dialling Called Number for Seven or Eight Digit Calls" except when relay 15HA operates after the party identification digit "0," the circuit is closed to relay 7KE. Relay 7KE operates, closes ground to lead 15ZT of the Transender, opens the locking ground for Codels 1 thru 7, opens the normal "start after hold everything" path to lead 14YT of the Transender, prepares a path to relay 8DD, opens relay 7KA to the operate path and opens key lock ground to relay 10FC.

After the 7th or 10th digit has been dialled, ground is closed via relay 13BA operated, relay 14CA normal, relay 3SM normal, level B wipers of switch 4SS engaged on bank terminal 10, relay 7KE operated and relay 10CB normal, through the number one winding of relay 8DD and through relays 3SM, 14SH and 15GT normal to Transender lead 14YT. If there is no possibility of an 8th or 11th digit, relay 8DD will operate immediately from resistance battery encountered on the Transender lead 14YT. If there is a possibility of an eighth or eleventh digit, a time-delayed circuit is encountered on lead 14YT and relay 8DD will operate on a time-delay basis unless an eighth or eleventh digit is dialled.

If an eighth or eleventh digit is dialled, relay 8DD will operate upon completion of the digit during the interval when relay 14CA is restored and relay 10CB remains operated. The operating path is as follows: ground on contacts 13BA7, 14CA3, 3SM7, the level B wiper of switch 4SS engaged on bank terminal 10, 7KE5, 10CB9 and the number two winding of relay 8DD to battery. Relay 1TE operates as explained in the section titled "Dialing Called Number for Seven or Eight Digit Calls."

When relay 8DD operates, it locks through its number two winding to ground at contacts of relay 15BN, opens its number one winding, closes the number one winding of relay 7DB to lead 6DH, removes ground from lead 6DG, closes ground to lead 6DST and replaces ground on lead 12TL with resistance ground through the number two winding of relay 14AA.

*Calling for "BD" Operator*

Ground connected to the 6DST lead causes a "BD" Operator Trunk Allotter to hunt for an idle "BD" Operator Trunk. When an idle "BD" Operator Trunk is found, it hunts for the Calling Ticketer on an absence of ground basis over leads 6DG. Absence of ground on lead 6DG indicates to the "BD" Operator Trunk that the calling Ticketer is found. A ground connected holding relay 15HA is connected in series with the Ticketer 9BD relay over lead 6DH.

Relay 7DB of this circuit operates, closes its "X" contacts 7DB3 to lock to ground at relay 13BS, opens lead 15ZT, prepares the holding circuits for Codels 1 through 7, closes ground to magnet 6SD through its ON and INT. springs, grounds lead 6DG to mark this circuit busy to searching "BD" Operator Trunks, and removes ground from lead 6DST. Magnet 5DS operates and steps its wipers self-interrupted to bank terminal 1. The ON springs operate and open the circuit to the magnet.

When the "BD" Operator Trunk is connected with the Calling Ticketer, the call waiting lamps light at the Operator's Position Equipment.

The operator, when she sees this signal, will depress and release her nonlocking accept key and the Operator's Position Equipment circuit will hunt for the "BD" Operator Trunk calling for service. This hunt is made on an absence of ground marking basis over leads 25HG.

When the calling "BD" Operator's Trunk is found, the operator's transmission circuit is extended into the "BD" operator's trunk and into the Ticketer via leads 6DR and 6DT. The Operator's key set leads are extended into "BD" Operator's Trunk relays 26HR, 26HW, 26HX, 26HY and 26HZ which, when operated, extend the operator's keyed signals into the Ticketer over leads 6DW, 6DX, 6DY, 6DZ, 6DS, 6DE and 6DF.

The "BD" Operator Trunk will generate a zip-zip tone upon connection with the "BD" Operator's Position equipment circuit. It will then, for a timed interval, apply the 200-ohm winding of "BD" Operator Trunk relay 14HD to the Ticketer 6DP lead. Thus, if Ticketer relay 14CA is not operated, will cause operation of the Ticketer relay 12DC.

When relay 12DC operates, and reverses battery to check for the origin of the call. (If the call comes from a paystation, the operator will receive a paystation tone via leads 6DR and 6DT.) After the timed interval, relay 12DC restores.

The operator acquires the calling number verbally from the subscriber and keys this number via the Sender Control circuit, the "BD" Operator's Position circuit and the "BD" Operator's Trunk circuit to the Ticketer. Each key operation closes the circuit to various relays 26HW, 26HX, 26HY or 26HZ in the "BD" Operator's Trunk which, in turn, close ground to magnet 6SD via leads 6DS and to the various 6DW, 6DX, 6DY and 6DZ leads.

The various codel relays in Codels 1 through 7 operate and lock to store the calling party's number as the number is keyed by the operator.

After the last digit of the calling number is keyed (codel 7) and ground is removed from lead 6DS, switch 6SD restores and advances its wipers to bank terminal 8. The operator now depresses the START key which again closes the circuit to magnet 6SD. When the key is released, magnet 6SD restores and advances its wipers to bank terminal 9 to close the circuit to relay 8KC, bank terminal 9 of level B, to ground, at relay 8DD. Relay 8KC operates, locks, closes battery through magnet 4OS, to lead 15SC of the Transender to start its sending cycle as previously described and opens the original operate circuit of relay 7DB which is also the holding circuit for the "BD" Operator's Trunk. The "BD" Operator's Trunk circuit releases.

If it is desired that sending start immediately after the operator has keyed in the first digit of the calling number, "K" wiring and apparatus is provided. When switch 6SD steps to bank terminal 2 after the first digit has been keyed, a circuit is closed to relay 7DK. Relay 7DK operates, locks to relay 8KC and closes battery through magnet 4OS, to lead 15SC of the Transender to start its sending cycle as previously described. When switch 6SD steps to bank terminal 9, the circuit is closed to relay 8KC. Relay 8KC operates and opens relay 7DK. Relay 7DK restores.

If, during the regular calling number registration cycle, the operator actuates the ERROR key, a circuit is momentarily closed to the number one winding of relay 6DE. Relay 6DE operates, locks over its number two winding to ground on the level A bank terminals of switch 6SD, opens the holding circuit to Codels 1 through 7 and closes the circuit to magnet 6SD. Switch 6SD steps self-interrupted to position 1 and opens the circuit to the number two winding of relay 6DE. Relay 6DE restores. The operator may now restart the keying operation.

If the operator actuates the START and ERROR key simultaneously, ground is closed to the number one winding of relay 10FC via lead 6DF. Relay 10FC operates, closes its "X" contacts 10FC4 and locks over its number two winding, closes busy tone through 10C4 to leads 12RD and 12RU, opens relay 14SH and opens the number two winding of relay 12BB. Relay 14SH restores and opens relay 14SF. Relay 14SF restores. When the calling party restores, relays 14AA, 13BA and 15BN restore. The Ticketer will remain thus operated until the RLS key is operated. Operation of the key causes the Ticketer to release completely.

*Switch-Through*

Switch-through is the same as previously described in the preceding section titled "Switch-Through" except relay 8DD restores upon the restoration of 15BN.

*Release From Completed and Timed Call*

Release is the same as explained in the preceding section titled "Release From Completed and Timed Call" with the following exceptions: relay 12DA restores when relay 12BB restores and relay 9BD restores when relay 13BS restores.

*Hunting for an Idle Trunk*

When the "D" operator service is required in a type "BD" SATT system, ground on lead 6DST from the Ticketer is closed to relay 28ST in the "BD" Operator's Trunk Allotter Circuit. Relay 28ST operates, closes level A wipers to the rotary magnet of rotary switch 27H. Relay 28ATB is normally operated. If all trunks are busy, relay 28ATB will restore, and the next time relay 28ST operates, it will light the common lamp showing overflow traffic at the operator's positions. Rotary magnet 27H hunts, stepping self-interrupted from direct ground on bank terminal N and the leads wired from each trunk to the bank of switch 27H such as lead SD for resistance ground through relay 28HK which indicates an idle operator's trunk.

*Hunting for the Calling Ticketer*

Relay 28HK operates from resistance battery of the rotary switch (rotary magnet 27H does not operate in series with 28HK), and operation is as follows:

Relay 28HK operates, closes ground to the bank terminal N, level A, of switch 29TH, closes rotary magnet 29TH to level A wipers and closes the number one winding of relay 29HA in series with magnet 29TH. Rotary magnet 29TH hunts, stepping self-interrupted from ground on bank terminal N and lead 6DG for absence-of-ground on a lead 6DG which indicates the calling Ticketer. Absence of ground on lead 6DG removes the shunt from the number one winding of relay 29HA. Relay 29HA operates its "X" contacts 29HA5 (magnet 29TH does not operate in series with relay 29HA), operates completely and locks over the number two winding of relay 29HA from resistance battery returned via lead 6DH and level B wipers of switch 29TH from the calling Ticketer, grounds lead 6SD to mark this trunk busy to the Operator's Trunk Allotter Circuit and shunt relay 28HK, closes ground to relay 27HB, opens leads from switch 29TH to level A wiper, and closes lead NIGHT ALARM to the number two winding of relay 27TS. Relay 28HK restores and opens the number one winding of relay 29HA. The Ticketer removes ground from lead 6DST.

*Signalling the Operator*

When the "BD" Operator's Trunk Circuit found the calling Ticketer in the preceding Section, relay 29HA operated, closed ground to relay 27HB, closed lead NIGHT ALARM to the number two winding of relay 27TS, opened relay 28HK, which in turn opened the number one winding of relay 29HA and released the Operator's Trunk Allotter Circuit. If no other Ticketer requires "D" operator service, the Ticketer removes ground from 6DST. Relay 28ST restores. At the time the trunk circuit was connected through to the calling Ticketer, leads 6DS, 6DW, 6DX, 6DY, 6DZ, 6DR, 6DT, 6DE, 6DP and 6DF were closed through the wipers of the respective rotary switch 29TH levels C, D, E, F, G, H, J, K, L and M to the Operator's Trunk Circuit.

Relay 27HB operates, grounds leads 26HM, 26HH and 26WLP, removes ground from lead 25HG and closes the number one winding of relay 27TS via lead 26HP to the "BD" Operator Control Circuit; and closes ground through the number one winding of relay 28HF and lead 6DP to the calling Ticketer. Ground on lead 26WLP will light the Wait lamps 23WL at the operator's positions indicating there is a "D" call requiring service. The operator, upon observing this signal, will depress and release her Accept key and the Operator's Position Equipment will hunt for the Operator's Trunk Circuit calling for service. This hunt is made on an absence-of-ground searching basis over the 25HG leads.

*Connection With the Operator's Control Circuit*

When the Operator's Control Circuit finds the calling Operator's Trunk Circuit, the Operator's Transmission circuit is extended via leads 24HRM and 24HTM, the operator's keyset is extended via leads 24HR, 24HW, 24HX, 24HY, 24HZ and 24HE and ground is returned from the Operator's Accept key (now released) over lead 24HP to the number one winding of relay 27TS. Ground on lead 24LP will light the Pilot lamp 23PL at the operator's position. Relay 27TS operates, removes ground from lead 25HM and 24WLP, closes ground to lead TONE ST closes ground to relay 27TA and closes a continuous tone over lead 24HRM to the operator's handset (the operator will actually receive a zip-zip tone as we shall see later). Opening lead 24WLP extinguishes the Wait lamp at the operator's position. Relay 27TA operates, closes ground to relay 27TB, closes multiple ground to the number one winding of relay 27TS and removes tone from lead 24HRM (end of first zip). Relay 27TB operates, locks, opens relay 27TA, opens yead NIGHT ALARM to the number two winding of relay 27TS, opens lead 24HP to the number one winding of relay 27TS, closes ground from lead 24HP to relay 28HC and closes tone to the operator's headset. Relay 27TA restores and opens the number one winding of relay 27TS. Relay 27TS restores, opens lead TONE ST and removes tone from the operator's headset (end of second zip).

Relay 28HC operates, places multiple ground on lead 24LP, closes battery through the number one winding of relay 27HD over lead 6DP to the Ticketer. Relay 27HD operates from ground return on lead 6DP from the Ticketer, opens relay 28HC and closes the subscriber's loop to relay 28BF. Battery through the number one winding of relay 27HD on lead 6DP will cause the Ticketer to check for the origin of the call. To check if the call comes from a paystation. If the call comes from a paystation, the operator will receive tone via leads 24HRM and 24HTM. Relay 28BF operates through the subscriber's loop and closes ground to the number two winding of relay 27HD. Relay 28HC restores, opens the number one winding of relay 27HD to remove resistance battery from lead 6DP to the Ticketer and removes ground from lead 24LP to extinguish the Pilot lamp at the operator's position.

*Repeating the Keyset Operation to the Ticketer*

When the operator receives the zip-zip tone and her Pilot lamp is extinguished, she is notified that her headset is connected through to the subscriber. The operator acquires the calling number verbally and will repeat this number from her keyset as grounds on leads 24HW, 24HX, 24HY and 24HZ to the Operator's Trunk Circuit.

As the various relays 26HW, 26HX, 26HY and 26HZ operate, they close a ground in multiple to rotary magnet 26HS (which steps once after each digit) and lead 6DS to the Ticketer and close ground to the respective leads 6DW, 6DX, 6DY and 6DZ to the Ticketer. On the first step, the 26HS3 springs operate. After the seventh and final digit is keyed, rotary switch 26HS advances to bank terminal 7. The operator then depresses and releases the Start key at the keyset to close ground to relay. Relay 26HR momentarily operates and closes ground via switch 26HS wipers and lead 6DS to the Ticketer to signal completion of keying to the Ticketer.

*Release*

The Ticketer will remove resistance battery from lead 6DH to open the number two winding of relay 29HA. Relay 27HB restores, removes ground from lead 25HH to release the Operator Control Circuit, grounds lead 25HG, opens relay 27TB, opens lead 24HP from the number two winding of relay 27HD, removes ground through the number one winding of relay 28HF via lead 6DP to the Ticketer and grounds rotary magnet 26HS through its 26HS1 and 26HS2 contacts. The rotary switch 26HS steps self-interrupted to normal. The 26HS1 contacts restore. Relay 27TB restores. Relay 27HD restores, opens relay 28BF, closes ground to relay 28ATB and removes direct ground from lead SD to mark this operator's trunk idle to the Operator's Trunk Allotter Circuit. The circuit is now at normal.

*Error in Keying*

If the operator depresses the Error key during keying, ground is closed to lead 24HE. Relay 26HE operates, closes ground to lead 6DE and closes ground to the number two winding of relay 28HF. Relay 28HF operates, locks to 26HS3 contacts of switch 26HS, closes ground over lead 6DE to the Ticketer, closes ground through the 26HS1 and 26HS2 contacts to rotary magnet 26HS, grounds lead 24LP to light the Pilot lamp at the operator's position. The rotary switch 26HS will return to normal. The 26HS3 contacts restore and open the number two winding of relay 28HF. When the Ticketer is ready to accept the new keying operation resistance battery is removed from lead 6DP. Relay 28HF restores to extinguish the Pilot lamp at the operator's position and signal her to begin keying.

*Release by Operator*

Should the operator experience difficulty and wish to be released from the connection, the Start and Error keys are depressed simultaneously to close ground to relays 26HR and 26HE. Relays 26HR and 26HE operate to close ground over lead 6DF to the Ticketer. The Ticketer opens lead 6DH to release this circuit.

*Busy Key and Fuses*

Operation of the Busy key in Remote Operator's Set (if used), will remove ground from relay 29FB. Relay 29FB restores, shunts relay 28HK and places direct ground on lead SD to mark this circuit busy to the Operator's Trunk Allotter Circuit.

*Repetition of Class-of-Service Tone*

Should the operator want to repeat the class-of-service check before she starts sending, she momentarily reoperates her Accept Key. Ground is momentarily closed to lead 24HP. Relay 28HC operates and the Ticketer checks for the origin of the call as explained.

*Signalling a "D" Call*

When the "BD" Operator Trunk Circuit is connected with the calling "BD" Ticketer, the Wait lamps light at the operator's position equipment to signal a "D" call.

*Accepting the Call*

The Operator, upon seeing this signal, will depress and release her non-locking Accept key. When the key is depressed, ground from the Accept key over lead 24SG will operate relay 24MA over its number two winding. Relay 24MA will operate only its "X" contacts 24MA3, whereby the number one winding of relay 24MA is shunted by ground on leads 24SG and 25HM. Releasing the Accept key closes ground from all "BD" Operator's Trunk Circuits over leads 25HM through the number one and two windings of relay 24MA in series. Relay 24MA operates completely, closes ground to relay 24MB, closes ground to relay 24SA, removes ground from lead 24GD and closes lead 24MG through relay 25MG to the rotary magnet 25TH.

Relay 24MB operates to open the operator's keyset from the Sender Control Circuit and prepares its path to the Operator's Trunk Circuit, closes resistance battery over lead 24HG to the Operator's Position Circuit, and prepares a transmission path over leads 24HTM and 24HRM to the operator's headset.

When ground is closed to relay 24SA in the "BD" Operator's Control Position Allotter Circuit it will operate and close lead 24GD through level A wiper to rotary magnet 24M. The rotary switch 24M will hunt, stepping self-interrupted from ground on leads such as 24GD on all idle or busy Operator's Control Circuits (FIG. 1), for absence of ground on lead 24GD which indicates the hunting for calling ticketer. When absence of ground appears on lead 24GD, rotary switch 24M can no longer step and ground is closed through Level B wiper to lead 24MG.

When 24MA operates, rotary switch 25TH will hunt, stepping self-interrupted from ground on leads 24HG or position N, until absence of ground on lead 24HG indicates the Operator's Trunk calling for service. When ground has been closed to lead 24MG and absence of ground appears on lead 24HG, relay 25MG operates in series with rotary magnet 25TH (if switch 24M is still hunting, no ground appears on lead 24MG; if switch 25TH is still hunting, ground on lead 24HG shunts relay 25 MG). Relay 25MG operates (switch 25TH does not operate in series with relay 25MG), closes ground through Level C wiper of rotary switch 25TH to relay 25OT, opens the lead circuit to relay 24SA, grounds leads 25HG and 24GD and transfers holding ground of relay 24MA1 from lead 26HM to ground returned from the operator's trunk over lead 25HH.

Relay 24SA in the common equipment will restore if no other position requires service. Ground on lead 24GD marks the position busy and steps the Allotter when hunting. Ground on lead 25HG steps the trunk hunting rotary switch in other operator's control circuits when hunting for their respective calling operator's trunk circuits.

Relay 25OT operates from the ground, extends leads 24HR, 24HW, 24HX, 24HY, 24HZ and 24HE from the operator's keyset, leads 24HRM and 24HTM from the operator's headset and leads 24HP and 24LP from the operator's position equipment into the Operator's Trunk Circuit.

*Processing the Call*

When the operator's headset is connected through to the Ticketer, ground returned over lead 24LP lights the Pilot lamp at the Operator's Position Equipment and a zip-zip tone is received via leads 24HRM and 24HTM. The Ticketer will then check for the origin of the call. If the call comes from a paystation, the operator will receive a paystation tone via leads 24HRM and 24HTM. The operator acquires the calling number verbally and keys this number from the operator's keyset via the Operator's Control Circuit and the Operator's Trunk Circuit to the Ticketer.

*Release*

After the operator notifies the Ticketer from the operator's keyset that the last digit has been completed, the Ticketer begins the release of the Operator's Trunk Circuit which in turn removes ground from lead 25HH.

Relay 24MA restores, opens relay 24MB, opens the operating path to switch 25TH, opens relay 25MG and relay 25OT and closes the number two winding of relay 24MA to lead 24SG to place the circuit under control of the Accept key 23A.

Relay 24MB and 25OT restore, open the Operator's Position Circuit, transfer the Operator's Key Set from the Operator's Trunk Circuit to the Sender Control Circuit, open lead 24LP to the Pilot lamp 23PL and open lead 24HP to the Accept key. Relay 25MG restores and removes ground from lead 25HG. The circuit is now at normal and the operator may accept another call.

*Forced Release*

Should the operator experience difficulties and wish to be released from the connection, the Start and Error keys are depressed simultaneously. The circuit will then be released as explained above.

*Call Originating From a Branch Office (Type "B" Service)*

The Ticketer shown in FIGURES 1 to 15 inclusive, can also be utilized to process calls originating in a branch office such as that illustrated in FIGURES 16 to 22.

When the calling subscriber at station 16PS-4 removes his receiver, the usual loop circuit, including the line conductors 16T and 16R is completed for operating the line circuit 16L2. In response to the completion of the above mentioned loop circuit, the line circuit 16L2 initiates operation of the distributor and marks the terminals of the calling subscriber line in the bank contacts of a group of line finders, including the line finder 16F, having access to the calling subscriber line. For the purpose of this description it will be assumed that the distributor selects the line finder 16F and that the latter finder operates its wiper in a vertical and then in a rotary direction in the well-known manner to select the terminals in the associated bank terminating the calling line. When the calling line is found by the line finder 16F, it extends the calling line to the individually associated first selector 16S1 and the latter selector transmits the usual dial tone signal to the calling subscriber to indicate that the dialling may be started. The above noted switching apparatus, including the line circuit 16L2, the distributor, the line finder 16F and the first selector 16S1 may be of conventional construction and arrangement.

Since the calling subscriber at station 16PS4 intends to extend the connection to a called subscriber in a remote exchange it is necessary to prefix the three digit directory number of the called subscriber with the digits "90." Consequently, when the calling subscriber receives the dialling tone signal the dial is actuated in accordance with the digit 9 to transmit nine loop impulses to the first selector 16S1. This selector then raises its wiper in a vertical direction to the ninth level and then rotates its wipers over the selected level to search for an idle SATT trunk circuit, such as the circuit of FIGS. 17 to 20. It will be assumed for the purpose of this description that the first selector 16S1 now extends the connection from the calling subscriber line by way of the — conductor, the + conductor and the control conductor. If the trunk circuit is busy, the control conductor will be grounded in order to indicate the busy condition to the first selector 16S1. Thus, as the selector rotates its wiper over the ninth level it will pass over contacts terminating trunk circuits having grounded control conductors corresponding to the C conductor.

When the first selector 16S1 seizes the trunk circuit of FIGS. 17 to 20 it extends the loop circuit, including the — and + conductors of the calling line to the — and + conductors of the trunk circuit.

*Outgoing Trunk*

SEIZURE

Resistance battery on lead 17C marks this circuit idle to preceding selectors. When seized, the "tip" side of the subscriber's loop is closed through polar relay 19PA and its associated Lamp to exchange battery and the "ring" side of the subscriber's loop is closed through relay 19AA and resistor 19R1 to Spotter Battery. Relay 19AA operates, but relay 19PA does not operate at this time. Relay 19AA closes relays 20AB and 19BA. Relay 20AB operates, closes part of the pulsing circuit on lead 20RT, blocks digit-0 from being repeated to the Incoming Trunk circuit and prepares a holding circuit to relay 19BA. Relay 19BA operates, connects a multiple ground to relay 20AB, prepares the circuit to relay 19CA, closes ground to lead 20RT and in turn to relay 21A in the succeeding circuit, closes relay 20BB, prepares the holding circuit for relay 20EP and connects ground to lead 17C to hold the preceding equipment and mark this circuit busy. Relay 20BB operates, closes spark suppression shunt, prepares the circuit to the magnets 17PS and 18PC, prevents the operation of the release alarm equipment and closes 6 second ground pulses to magnet 19CT.

*Dialling Party Identification Digit "0"*

As the subscriber dials the party identification digit "0," relay 19AA follows the dial pulses. Relay 19BA, being slow-to-release, remains operated during pulsing. When relay 19AA restores on the first dial pulse, the circuit is closed to relay 19CA and magnets 17PS and 18PC. Magnets 17PS and 18PC operate. Relay 19CA operates, closes relay 19CB and prepares a circuit to relay 17PB. At the end of the first pulse, relay 19AA reoperates, opens the circuit to magnets 17PS and 18PC and recloses the circuit to relay 19BA. Relay 19CA, being slow-to-release, remains operated during pulsing. Magnet 17PS may or may not advance its wipers on the remaining dial pulses depending on the SATT "spotter pulse" of the calling party. Further operation of magnet 17PS is described in the succeeding section.

When relay 19AA restores on the second dial pulse, the circuit is closed to relay 19CA and magnet 18PC. At the end of the second dial pulse, relay 19AA reoperates and opens magnet 18PC. Magnet 18PC restores and advances its wipers one step. After the tenth dial pulse, the wipers of switch 18PC are engaged on bank terminal 10.

When the digit "0" is completed, relay 19CA restores, opens relay 19CB which is slow-to-release and prepares the circuit to relay 19HD via level A bank terminal 10. Relay 19CB restores and closes relay 19HD. Relay 19HD operates, locks at relay 19BA, transfers the "ring" side of the line from Spotter Battery to exchange battery through the number one winding of relay 20AB and the "tip" side of the line from relay 19PA to ground through the number two winding of relay 20AB, opens relay 19AA, prepares a new circuit to magnet 18PC and closes relay 17KA. Relay 19AA restores. Relay 17KA operates, connects ground to the 17 START lead and closes relay 17KB to the 17 HOLD lead.

*Identification of Calling Party*

Type B SATT installations are capable of serving both single party lines and party lines of as many as ten stations. All stations on party lines must be equipped with special "spotter" dials. Stations on single party lines are equipped with regular dials.

The spotter dial differs from the regular dial in that it provides an additional set of spotter springs which can be closed by a special cam during the return of the dial. The spotter springs closed interval is positioned to occur only during the period when the regular pulsing springs are closed. The spotter springs, when closed by the special cam, close a spotter ground pulse on the "tip" side of the line. The spotter cam can be arranged to close the spotter ground pulse on the line after any one of the individual pulses. For the first station, the spotter dials are adjusted to send a spotter pulse after the first dial pulse of the digit "0." For the second station, the spotter dials are adjusted to send a spotter pulse after the second dial pulse of the digit "0." The third, fourth, fifth, sixth, seventh, eighth, ninth and tenth stations on a party line are arranged accordingly.

For purposes of this explanation, assume the calling station to be the fourth station on a party line. Thus, no spotter pulse will be closed via "tip" side of the line to lead 17T until after the fourth dial pulse.

Now consider what happened to switch 17PS as the digit "0" was being dialled. Switch 17PS stepped to bank terminal 1 after the first dial pulse. As relay 19AA follows the second, the third, and fourth dial pulses, the wipers of switch 17PS are advanced to bank terminals 2, 3 and 4. Immediately after the fourth dial pulse, the spotter dial closes a spotter pulse via the "tip" side of the line to lead 17T.

Relay 19PA is a high speed polarized relay which will not operate from Spotter Battery over the normal dialling loop, but will operate from exchanged battery when a "spotter" ground pulse appears on lead 17T. Relay 19PA operates during interdigital pause between the 4th and 5th dial pulse and closes ground via contacts 19HD9, 19AA3, 19CB5, 19PA1 and 19CB2 to the number one winding of 17PB. Relay 17PB operates and locks through its "X" contacts 17PB1, opens the pulsing circuit to switch 17PS which engages on bank terminal 4, and transfers ground from lead P0 to terminal 4. When bar relay 17BR operates later, this ground will be closed to lead P4 to the Detector to indicate the party identity of the calling station. Further dial pulses do not affect switch 17PS.

If the calling station has a single party line, no spotter pulses are closed to lead 17T. Switch 17PS follows the 10 dial pulses of digit "0" and steps to bank terminal 10. Since relays 19PA and 17PB do not operate, ground remains on lead P0 to indicate a single party line. Although the spotter pulses may appear on the "tip" side of the line during the dialling of subsequent digits, they are ineffective to relay 19PA.

*Initiating Detection Cycle*

Ordinarily the detection cycle is so rapid it will occur shortly after the digit "0" is completed. Ground on lead 17 START and absence of ground on lead 17 GUARD indicate to the detector Assigner that a detection of a calling number is desired by an Outgoing Trunk Circuit. When the Detector Assigner steps to this circuit, relay 17KB operates over lead 17 HOLD in series with a relay in the Detector Assigner. Relay 17KB closes bar relay 17BR and relay 18KD. Bar relay 17BR operates and closes leads W3 through Z7, P1 through P0, 17EB, 17INC and 17GC to the Detector. Relay 18KD operates and closes +80 v. D.C. detector battery to the preceding equipment via lead 17C. In the course of the detection cycle, the Detector closes ground to the various W3 through Z7 leads. These grounds represent, in codel code, the "C" digit of the office code and terminal number of the calling station. (The AB office code digits are strapped on the terminal pile up.) Various codel relays in Codel 3 through 7 operate from these grounds and lock to store the calling number.

When the detection is completed, the Detector closes ground to lead 17EB. Relay 17KC operates, locks, opens relay 17KA, opens relay 17KB and closes the circuit to magnet 17PS. Relay 17KA restores, removes ground from lead 17 START and closes ground to lead 17 GUARD. Relay 17KB restores, opens relay 18KD and the bar relay 17BR. Bar relay 17BR restores. Magnet 17PS operates and steps its wipers self-interruptedly to normal. The 17RSON3 contacts restore, open the circuit to the magnet and prepare a circuit to relay 18KS. Relay 18KD restores and replaces +80 v. D.C. detector battery with ground on lead 17C. Resistor 18R2 is used in conjunction with "X" contacts 18KD3 to facilitate application of Detector battery to the "C" lead without dropping the switch train and without burning springs when ground is connected to the +80 v. detector battery.

*Dialling Called Number*

As the subscriber dials the first number, relay 20AB follows the dial pulses and repeats them over lead 20RT to the incoming trunk in the main ticketing office. When relay 20AB restores on the first dial pulse, the circuit is closed to relay 19CA. Relay 19CA operates, disconnects ground from level A of switch 18PC and closes relay 19CB. Relay 19CB operates and prepares the circuit to magnet 17PS. Relay 19CA, being slow-to-release, remains operated during plusing.

After the first digit of the called number is completed, relay 19CA restores, opens relay 19CB which is slow-to-release and closes ground to level A bank terminal 10 of switch 18PC to close the circuit to magnet 18PC. Magnet 18PC operates, operates its 18INT1 contacts which open the circuit to the magnet. The magnet restores and advances its wipers one step (bank terminal N) to close the circuit to relay 18KS. Relay 19CB restores. Relay 18KS operates, locks at relay 19BA, closes ground on bank terminal N of switch 18PC to switch 17PS and closes ground also to level A wiper of switch 17PS. Switch 17PS operates, operates its 17INT1 contacts which open the circuit to the magnet. Magnet 17PS restores and advances its wipers to the 1st bank terminal, closing ground from the level A wiper to contacts 20PR3 of relay 20PR.

*Transferring Calling Party's Number to Ticketer*

Ground closed to contacts 20PR3 energizes the number two winding of relay 20PR and causes capacitor 20C1 to discharge through the number one winding of relay 20PR.

The two windings of relay 20PR, being energized in opposition, delays the operation of the relay until the capacitor has almost completely discharged. When relay 20PR operates, it opens the ground at contacts 20PR3, thus opening the discharging circuit of the capacitor. The capacitor immediately begins recharging from battery through the number one and two windings of relay 20PR. This capacitor charging current flows through both windings in series-aiding and holds relay 20PR operated until the capacitor becomes charged. When relay 20PR releases, the cycle repeats itself. The cycling rate is very stable and depends upon the residual adjustment and margining of relay 20PR and the capacitance of 20C1. For this circuit the pulsing rate is approximately 12 pulses per second. Each time relay 20PR operates, ground is closed to either magnet 18PC or, after switch 18PC has advanced to normal, magnet 17PS. Switch 18PC, in advancing its level B and C wipers, scans first codel leads W1 through X3 and then coded leads Y3 through Z5. When switch 18PC has advanced to normal, its 18PC2 contacts transfer the pulsing circuit to magnet 17PS. As switch 17PS advances, its level C wipers scan leads W6 through Z7.

Each time a grounded codel lead is encountered, the circuit is closed to relay 18HA. Relay 18HA operates and prepares a path from the +80 v. D.C. source. As relay 20PR operates on the succeeding pulse, it closes a +80 v. D.C. pulse through resistor 18R5 to lead 20TT. When an underground codel lead is encountered, relay 18HA does not operate and a −48 v. D.C. pulse is closed through resistor 18R4 to lead 20TT.

*Transfer Completed*

After codel lead Z7 has been scanned, switch 17PS advances its wipers to bank terminal 9. Ground appearing on bank terminal 9 of level C from contacts of relay 17KC causes relay 18HA to operate. On the next pulse of relay 20 PR, a +80 v. D.C. pulse is closed to lead 20TT and ground is again closed to switch 17PS. Switch 17PS advances its wipers to bank terminal 10 and removes the ground from contact 20PR3 of relay 20PR. Relay 20PR ceases pulsing.

The last +80 v. D.C. pulse closed to lead 20TT starts action in the associated circuits to close resistance battery to the number one winding of relay 20EP via lead 20TT. Relay 20EP operates its "X" contacts 20EP4, locks through its number two winding and operates fully, closes relay 20EN to lead 20TT and opens the number one winding of relay 20EP. Relay 20EN does not operate at this time since resistance battery appears on lead 20TT from the Incoming Trunk.

*Switch-Through*

Switch-through, after sending is completed, is performed by disconnecting ground from lead 12UML in the Ticketer to cause the Incoming Trunk to switch-through the transmission path and replaces 500 ohm resistance battery with ground on lead 20TT which in turn energizes relay 20EN. Relay 20EN operates, closes first its "X" contacts 20EN5 which close the holding circuit, closes the transmission circuit, opens the holding circuits to relay 17PB, relay 18KS and the codel relays and opens the pulsing circuit to magnet 19CT. Relays 17PB, 18KS and 17KC and the codel relays restore.

*Premature Dialling*

If the subscriber dials the first digit of the called number before an idle Ticketer or Transender is found, 500 ohm resistance battery is encountered on lead 20TT. Relay 20EP operates, locks at relay 19BA and closes ground to relay 18HC. Relay 18HC operates, removes ground from lead 20RT, locks to ground at relay 19BA and connects busy tone to lead 17R.

After the subscriber restores the handset, the loop is opened to relay 20AB. Subsequent operations are as explained in the section for "Release" with the following exceptions: relay 18HC restores after relay 19BA restores. Relay 20EN is not operated at this time.

*Incomplete Detection*

If an incomplete or double detection occurs in the Detector, ground is closed to lead 17INC. Relay 18KE operates, opens relay 17KA, opens relay 17KB, closes the circuit to magnet 17PS and prepares a circuit for relay 18KS. Relay 17KA restores, removes ground from lead 17 START and closes ground to lead 17 GUARD. Relay 17KB restores opens the bar magnet 17BR and opens relay 18KD. Bar relay 17BR restores. Relay 18KD restores and replaces +80 v. D.C. detector battery with ground on lead 17C. Magnet 17PS operates and steps its wipers self-interrupted to normal. Its 17PSON3 contacts restore and close part of the circuit to relay 18KS via contacts 17POS3 and 17INT1.

After the first digit of the called number is completed, relay 19CA restores, closes ground to level A bank terminal 10 to switch 18PC to close the circuit to magnet 18PC and opens relay 19CB which is slow-to-release. Magnet 18PC operates the 18PC1 contacts which opens the circuit to the switch. Magnet 18PC restores and advances its wipers one step (bank terminal N) to close the circuit to relay 18KS. Relay 19CB restores. Relay 18KS operates, locks and closes the circuit to relay 20PR. Relay 20PR operates, opens the circuit to itself, sends a −48 v. D.C. pulse to the Ticketer via the Incoming Trunk circuit and closes ground to magnet 18PC. Relay 20PR restores and removes −48 v. D.C. from lead 20TT. Magnet 18PC restores and advances its wipers to open the original circuit to relay 20PR.

Action is now taken in the associated Incoming Trunk circuit to close resistance battery to the number one winding of relay 20EP via lead 20TT. Relay 20EP operates its "X" contacts 20EP4, locks to ground and closes relay 20EN to lead 20TT.

After the Ticketer has called for and been connected to a "D" operator, the Incoming Trunk closes resistance ground to relay 20EN via lead 20TT. Relay 20EN operates its "X" contacts 20EN5 which close the holding circuit, opens the holding circuits to relays 17PB, 18KE, 18KS and the codel relays, opens the pulsing circuit to magnet 19CT and closes the transmission path. Relays 17PB, 18KS, 18KE and the codel relays restore.

*Ground Fault on Line*

If there is a low resistance ground leak on either the "tip" or "ring" side of the calling line, relay 19PA will operate either upon seizure, or as the first dial pulse is received. Relay 19PA closes ground to the number one winding of relay 18GT. Relay 18GT operates, locks through its "X" contacts 18GT5, closes relay 18HA and prepares the circuit for magnet 17PS. Relay 18HA operates.

After digit "0" has been sent and relay 19HD operates as described previously, the circuit is closed again from ground at relay contacts 19BA1 via contacts 19HD4, 18KS1, 18GT1 and contacts 18PSON2 and 17INT1 of switch 17PS to magnet 17PS. Magnet 17PS steps self-interruptedly to its normal position. The 18PSON2 and 17INT1 contacts restore and close part of the circuit to relay 18KS.

After the first digit of the called number is completed, relay 19CA restores, closes ground to level A bank terminal 10 of switch 18PC to close the circuit to magnet 18PC and opens relay 19CB which is slow-to-release. Magnet 18PC operates the 18PC1 contacts which open the circuit to the magnet. Magnet 18PC restores and advances its wipers one step (bank terminal N) to close the circuit to relay 18KS. Relay 19CB restores. Relay 18KS operates, locks and closes the circuit to relay 20PR. Relay 20PR operates, opens the circuit to itself, sends a +80 v. D.C. pulse to lead 20TT and closes ground to magnet 18PC. Relay 20PR restores, opens magnet 18PC and removes the +80 v. D.C. from lead 20TT. Switch 18PC advances its wipers. Resistance battery is now encountered on lead 20TT and closes the circuit to relay 20EP. Relay 20EP operates its "X" contacts 20EP4.

After the Ticketer has called for and been connected to a "D" operator, the Incoming Trunk closes resistance ground to relay 20EN via lead 20TT. Relay 20EN operates, closes its "X" contacts 20EN5 first which close the holding circuit, opens the holding circuits to relays 17PB, 18GT, 18KS and the codel relays, opens the pulsing circuit to magnet 19CT and closes the transmission path. Relays 17PB, 18GT, 18KS and the codel relays restore.

*Failure To Dial Party Identification Digit "0"*

Should the subscriber fail to dial the party identification digit "0," relay 19HD will not operate. As relay 19CA restores after the last pulse of the first digit, it opens relay 19CB and closes the circuit via level A of switch 18PC to relay 18HC. Relay 19CB restores. Relay 18HC operates, locks at relay 19BA, closes ground to relay 19HD and closes busy tone to lead 17R. Subsequent operations are as explained or as covered in the section on "Premature Dialling."

*Release*

When the calling party disconnects, the loop is opened to relay 20AB. Relay 20AB restores, opens the circuit of relay 19BA and closes relay 19CA. Relay 19CA operates and closes relay 19CB. Relay 19BA restores, opens relays 20BB, 20EP and 19HD, closes ground via the low resistance winding of relay 19CB to magnets 19CT and 17PS. Relay 20EP restores, opens the transmission circuit and opens relay 20EN. Relay 19HD restores, transfers lead 17R from the number one winding of relay 20AB via the repeat coil to relay 19AA and lead 17T from the number two winding of relay 20AB via the repeat coil to relay 19PA. Relay 20EN restores. Relay 19CA restores after its slow-to-release interval.

In the meantime, switches 19CT and 17PS step their wipers self-interrupted to normal. The 19CT3 contacts of switch 19CT restore and close the homing circuit to magnet 18PC. Magnet 18PC steps its wipers self-interrupted to normal. Contacts 17PSON3 of switch 17PS and 18PC1 of switch 18PC restore and open relay 19CB. Relay 19CB restores and closes 500 ohm resistance battery to lead 17C to mark the switch idle. The circuit is now at normal.

*Time-Out Feature*

If the calling party has not dialled the party identification digit "0" within 18 seconds from seizure of this switch ground appearing on bank terminal 3 of switch 19CT is closed to relay 18HC via the multipled level A bank terminals 1 to 9 of switch 19PC. Relay 18HC operates, locks, removes ground from lead 20RT, closes relay 19HD and closes busy tone to lead 17R. Relay 19HD operates, locks to ground at relay 19BA and transfers leads 17R and 17T from relays 19AA and 19PA to relay 20AB. Relay 19AA restores.

If no detection indication (Complete, Incomplete or Ground Fault) has been received, or the calling party has not dialled the first digit of the called number within 30 seconds from seizure, ground appearing on bank terminal 5 of switch 19CT is closed to relay 18HC. Relay 18HC operates, locks, closes busy tone to lead 17R and removes ground from lead 20RT. (If relays 17KA and 17KB and bar relay 17BR are still operated, they will restore at this time.) If switch-through has not occurred within 48 seconds after seizure, relay 18HC operates, locks, removes ground from lead 20RT and closes busy tone to lead 17R.

*Incoming Trunk*

SEIZURE

When seized, ground is closed on lead 20RT to the number one winding of relay 21A. Relay 21A operates and closes relay 22B. Relay 22B operates, closes ground to the "in" terminal of the number two winding of relay 22AG and closes lead 12HU to lead M2 and the "out" terminal of the number two winding of relay 22AG.

*Hunting for Idle Ticketer*

If the associated Ticketer is busy, ground appears on leads 12HU and 12CU. Ground on lead 12HU shorts relay 22AG and operates magnet 22M in the Ticketer Hunter. The 22INT contacts operate and open the circuit to magnet 22M. Magnet 22M restores and steps the rotary switch to another Ticketer. The 22INT contacts restore. This self-interrupted stepping continues until an idle Ticketer is found or the subscriber dials.

*Seizing a Ticketer*

When an idle Ticketer is found, 500 ohm resistance battery appears on lead 12CU and absence of ground appears on lead 12HU. Relay 22FA operates its "X" contacts 22FA3 which prevents relay 22AG from operating and closes the number two winding of relay 22FA in series with relay 22FB. Relay 22FA operates fully over its number two winding, shorts its number one winding, prepares the pulsing path for relays 21P and 21S, closes the number two winding of relay 22FA and relay 22FB in series to lead 12CU and closes leads 12TU and 12RU through resistor 21R3 to seize the Ticketer. Relay 22FB operates, closes relay 21ML to lead 12UML, opens leads 12HU to prevent stepping of the Ticketer Hunter as the Ticketer is seized and opens relay 22B. However, before relay 22B restores, the seized Ticketer closes ground to lead 12CU to hold relays 22FA and 22FB and to lead 12HU to mark itself busy to other Ticketer Hunters and Selectors. Relay 22B restores and removes the short from the number one winding of relay 22FA.

The Incoming Trunk Circuit is now ready to receive the subscriber's dial pulses.

*Repeating Dial Pulses*

The subscriber's dial pulses appear on lead 20RT. Relay 21A follows the dial pulses on lead 20RT and opens leads 12RU and 12TU each time it restores. In this manner, the dial pulses on lead 20RT are repeated as loop pulses to the Ticketer over leads 12RU and 12TU.

*Forwarding Calling Party's Number*

After the subscriber has dialled the first digit of the called number, the Outgoing Trunk in the branch office begins transmitting the detected calling party's number in codel form, as a series of battery pulses (either +80 v. D.C. or −48 v. D.C.) on lead 20TT. Relay 21S operates on every pulse, whether +80 v. D.C. or −48 v. D.C. However, relay 21P is a polar relay and only operates on the +80 v. D.C. pulses. Thus, on every pulse, ground is forwarded over lead 11UHI to the Ticketer, but only on the +80 v. D.C. pulses when both relay 21P and relay 21S operate, is ground forwarded over both leads 11UHI and 11ULO to the Ticketer.

When the Ticketer has received completely the calling party's number, it closes ground to lead 12UML. Relay 21ML operates, closes 500 ohm resistance battery to lead 20TT, opens the pulsing circuit to relay 21P and relay 21S and closes ground on lead 12UML to the "out" terminal of relay 21SM. Relay 21SM is shorted at this time and does not operate.

*Switching Through*

When the Transender has completed sending and released, ground is removed from lead 12UML. Relay 21SM operates in series with relay 21ML, removes the 300 ohm resistance 21R3 shunt from the repeat coil, removes 500 ohm resistance 21R2 battery from lead 20TT, transfers the holding path of relay 21A to the subscriber's loop and completes the voice transmission path through repeat coil 21RC.

*Premature Dialling*

If the subscriber dials before an idle Ticketer is found, relay 21A follows the dial pulses and closes relay 21ML. Relay 21ML operates, locks, closes 500 ohm resistance battery to lead 20TT, opens the circuit to magnet 22M to stop hunting in the Ticketer Hunter and opens the number two winding of relay 22AG to prevent its operation. The circuit thus remains operated until released.

*Double Seizure of Ticketer*

If the Ticketer Hunter seizes a Ticketer simultaneously with another Ticketer Hunter or Selector, relay 22FA will not operate over lead 12CU due to its marginal adjustment. Since absence of ground appears on lead 12HU, relay 22AG is not shorted and operates over its number two winding in series with magnet 22M, locks over its number one winding and closes ground through the number one winding of relay 22AG to magnet 22M. Magnet 22M operates. The 22INT springs operate and close the number one winding of relay 22JT through the number one winding of relay 22AG. Relay 22JT closes its "X" contacts 22JT1 locks and operates completely to open magnet 22M and to open the number two winding of relay 22AG. Magnet 22M restores and steps the rotary switch to the next Ticketer. The 22INT contacts restore and open the number one windings of relay 22JT and relay 22AG. Relay 22AG restores and opens the number two winding of relay 22JT. Relay 22JT restores. Hunting continues as before.

*Release After Switch-Through*

When the calling party restores his handset, the loop to relay 21A is opened. Relay 21A restores and opens the loop to the Ticketer. When the Ticketer removes ground from lead 12CU, 22FA and 22FB restore. Relay 22FB, in restoring, opens relays 21ML and 22SM. Relays 21ML and 22SM restore.

*Release After Premature Dialling*

When the calling party restores his handset, the loop to relay 21A is opened. Relay 21A restores and opens relay 22B. Relay 22B restores and opens relay 21ML. Relay 21ML restores.

*Remote Access Calls For Type "B" Service*

When seized from an Incoming Trunk circuit, most operations are identical to those previously described with the following exceptions: relays 15HA, 7KA, 12KB, 12KD, 10PA and 15PB do not operate at any time. Relay 8SR, on the other hand, will operate only when seized by the Incoming Trunk circuit.

The party identification digit "0" of the access code is not repeated to this circuit since party identification and detection of the calling number is performed in the branch office. Only the called number is repeated to this circuit as loop pulses on leads 12RU and 12TU. Those operations which are materially different for a call originated from the branch office are described below.

*Seizure From Incoming Trunk Circuit*

Resistance (13R7) battery on lead 12CU and absence of ground on lead 12HU marks this switch idle to the Incoming Trunk circuit. When seized by the Incoming Trunk circuit, a 300 ohm loop is closed over leads 12RU and 12TU to relay 10PA and the number one windings of relays 14AA and 15HB. The cycle of operations for seizure from the Incoming Trunk circuit is identical to seizure from a local selector as described in the section titled "Seizure From Local Selector," except that in addition, relay 15HB operates over its number one winding in series with the number one winding of relay 14AA upon seizure.

Relay 15HB prevents relay 15HA from operating and prepares a path for relay 14HD and the number two winding of relay 15HB. When relay 15BN operates, it closes relay 14HD and closes a holding path to the number two winding of relay 15HB. When relay 13BS operates, it shorts the number one winding of relay 15HB.

Relay 14HD operates, closes magnet 11PS, momentarily closes the number two winding of relay 14AA while transferring the "tip" side of the line (lead 12TU) from relay 10PA to ground and the "ring" side of the line (lead 12RU) from Spotter Battery to exchange battery.

*Transferring Calling Party's Number to Ticketer*

The calling party's number is detected by a Detector in the branch office and stored on codel relays in the Outgoing Trunk circuit. After the first digit of the called number is completed, the Outgoing Trunk circuit begins transferring the calling party's number over the "tip" side of the trunk to the Incoming Trunk circuit which repeats the information to the Ticketer, over leads 11ULO and 11UHI. This transfer is performed in the following manner.

A rotary switch in the Outgoing Trunk circuit steps, and scans one lead at a time, across the stored information. When a grounded code lead is encountered, the Outgoing Trunk circuit closes a +80 v. D.C. pulse over the "tip" side of the trunk to the Incoming Trunk circuit which in turn closes a ground pulse simultaneously to leads 11UHI and 11ULO. When an ungrounded (open) lead is encountered, the Outgoing Trunk closes a −48 v. D.C. pulse over the "tip" side of the trunk to the Incoming Trunk circuit which in turn closes a ground pulse to only lead 11UHI.

Each pulse on lead 11UHI operates magnet 11PS and thus keeps switch 11PS in unison with the transmitting switch in the Outgoing Trunk Circuit. When a pulse is closed to lead 11ULO, the relay to which the level A, B or C wipers of switch 11PS are at that time connected, will operate and lock. This enables the stored calling party's number in the Outgoing Trunk Circuit to be transferred and stored in the Ticketer. Level D of switch 11PS serves no function for calls originated in a branch office.

*Complete Detection*

If a complete detection has been registered in the Outgoing Trunk circuit in the Branch office, a series of thirty-one ground pulses is closed to lead 11UHI. As the first pulse is closed to lead 11UHI, a pulse will not be closed to lead 11ULO. The first pulse on lead 11UHI energizes magnet 11PS and relay 8SR. Relay 8SR, being slow-to-release, operates and remains operated for the duration of the pulse.

After the first pulse, switch 11PS advances its level A wipers to bank terminal 1 and closes its 11PS2 contacts. As the next twenty-nine pulses are closed to lead 11UHI, first the level A then the level B and level C wipers of switch 11PS scan Codels 1 through 7. Each time a pulse is closed simultaneously to lead 11ULO and 11UHI, the respective codel relay to which the level A, B or C wiper is at that time connected will operate and lock.

After the thirtieth pulse the level C wiper of switch 11PS advances to bank terminal 8. As the thirty-first pulse is closed to lead 11UHI, a pulse is simultaneously closed to lead 11ULO. Relay 8KC operates on this pulse, locks, closes ground to lead 12UML and closes resistance battery to lead 15SC. After the thirty-first pulse, switch 11PS advances its wipers one step and relay 8SR restores.

*Incomplete Detection*

If an incomplete detection is registered in the Outgoing Trunk, only one pulse is closed to lead 11UHI. Magnet 11PS and relay 8SR operate from this pulse. After the pulse, switch 11PS advances its wipers one step and closes its RSON contacts. Relay 8SR, being slow-to-release, remains operated for a short period. As no more pulses are closed to lead 11UHI, relay 8SR restores and closes ground over contacts 12BB9 to relay 7KE. Relay 7KE operates, locks, closes ground to leads 15ZT and 12UML. Subsequent action is the same as explained in the preceding section titled "Incomplete Detection" except lead 12UML is opened when relay 8DD operates.

If any irregularity occurs and the full complement of thirty-one pulses is not closed to lead 11UHI or if the thirty-first pulse is not closed simultaneously to leads 11UHI and 11ULO, operation is the same as for an incomplete detection.

*Ground Fault on Line*

If a ground fault condition is registered in the Outgoing Trunk, leads 11UHI and 11ULO are simultaneously grounded on the first pulse. Relay 15GT operates from the pulse on lead 11ULO, locks through its "X" contacts 15GT3 and closes ground to lead 14YT. Magnet 11PS and relay 8SR operate from the pulse on lead 11UHI. After the pulse, switch 11PS advances its wipers to the next bank terminal. Further operation of this circuit is the same as explained in the preceding section titled "Ground Fault on Line."

*Switch-Through*

Switch-through after sending is completed is performed in the same manner as described in the first section titled "Switch-Through" for calls originated from the main office except that when relay 15BN restores, ground is removed from lead 12UML to cause the Incoming Trunk to switch-through the transmission path.

*Idle Transender Not Available*

If a Transender has not been seized by the time the first digit of the called number is dialled, relays 14SF and 14SH will not have operated and operation occurs in the following manner. As 14AA restores on the first dial pulse of the called number, it closes relay 14CA. Relay 14CA operates and closes the number one winding of relay 15HC. Relay 15HC operates and locks over its number two winding, closes the number one winding of relay 10FC and closes ground to lead 12UML. If the call is from the branch office, this ground condition on lead 12UML starts action in the Outgoing Trunk in the branch office to provide busy tone to the calling party. Relay 10FC operates its "X" contacts 10FC4, locks over its number two winding, closes busy tone through 10C4 to leads 12RU and 12RL, open its number one winding, opens lead 12UML, closes a holding circuit to the number two winding of relay 12BB and removes the operating ground for magnet 4SS and Codels 21 through 31. The circuit remains thus operated until the calling party disconnects.

When the calling party disconnects, release is similar to that of the Section titled "Release From a Flashing Signal Condition."

*Change of Toll Rates During Call*

Each time the Dater Timer changes the toll rates from day to night rates or night to day rates, it closes a ground pulse to lead 2TR. If a conversation is in progress in this circuit, the 2SEND4 contacts of switch 2SEND are operated and the pulse on lead 2TR closes relay 2TR. Relay 2TR operates, locks and closes ground to the level D bank terminal of switch 2SEND. Relay 2TR remains operated until relay 12BB restores on release.

*Call Supervision*

As long as the Ticketer is in use, the SUPY lamp 9SL is lighted or flashing to indicate the following conditions:

Bright steady lamp: Ticketer seized. Dim flashing lamp (60 i.p.m.): Call answered, "grace" period preceding conversation timing or a stop dial condition. Dim steady lamp: Call answered, Ticketer timing the conversation. Dim flashing lamp (120 i.p.m.): Call completed, Ticketer calling for a Tabulator and transferring ticket data to it. Bright flashing lamp (120 i.p.m.): Ticket data transferred, Ticketer in process of releasing. Bright flashing lamp (60 i.p.m.): Conversation interval 300 minutes or longer.

*Paystation Tone Check*

If a call originates from a paystation and the subscriber dials the SATT access code and the called number, the Ticketer will function as explained in the section on "Ticketer Seizure." However, since the call is from a paystation, a detection cannot be made of the calling party. The call is then routed to an operator, who may check for paystation tone by closing resistance battery on lead 6DP. Relay 13LP operates, removes the short from the number one winding of relay 13TT and closes the number two winding of relay 13TT and Capacitor 13C5 in series across leads 6DT and 6DR. Paystation tone extended over the C lead from the calling party's line circuit to the number one winding of relay 13TT is induced into the number two winding of relay 13TT and thus extended to the operator. If the call is from a paystation, the subscriber is then asked to disconnect.

While one embodiment of the invention has been disclosed, it will be understood that various modifications may be made therein which are within the true spirit and scope of the invention.

What is claimed is:

1. In an automatic toll ticketing telephone system, a first exchange provided with first switching apparatus and toll ticketing equipment accessible from said switching apparatus, said toll ticketing equipment including sending means and tabulating means, an incoming repeater including a plurality of registers, a first subscriber station identified by a plural digit directory number, a second exchange provided with second switching apparatus, a second subscriber station identified by a plural digit directory number, a repeater in said second exchange, a trunk line tying said repeater from said second exchange to said first exchange, the repeater in said second exchange accessible from said second switching equipment, a calling device at said first station for operating said first switching apparatus to extend a connection from said first station to said toll ticketing equipment, and means in said ticketing equipment controlled by said first stations calling device for registering therein the directory number of the calling party station and to further extend said connection from the toll ticketing equipment to said called station and to time the duration of said call, said toll ticketing equipment having means for disabling said detecting means controlled by said first stations calling device and for arranging its circuits to receive the calling party identification information from said branch exchange through said repeaters and trunk line in a one or two marking four element code form simultaneously with the dialing of the called party directory number into the toll ticketing equipment, circuit means operated in said repeater after obtaining said calling subscriber's directory number and the called subscriber's number to start said sending means to complete the call, circuit supervisory means in said repeater operated upon termination of a call to access said tabulating means and records all pertinent data relative thereto automatically.

2. In an automatic telephone system, a first exchange including first switching apparatus, an operator position and a first station identified by a plural digit directory number, a second exchange including second switching apparatus and a second station identified by a plural digit directory number, a third exchange including third switching apparatus and a third station identified by a plural digit directory number, a repeater and toll ticketing equipment in said first exchange, said repeater comprising three incoming channels, said toll ticketing equipment including sending means and tabulating means, first means controlled over said first incoming channel in said repeater for accepting calls from said local exchange to cause the identity of a first calling subscriber to be detected when a toll call is originated therefrom and thereafter to automatically complete the call, on calls from said second station identified by said plural digit directory number incoming from said second exchange to said repeater in said first exchange through said second channel, said repeater disabling its own detecting means and arranging its circuit to receive the party identification information from said second exchange in a one or two marking four element code form simultaneously with the dialling of the called party's directory number, on calls from said third station through said third exchange switching apparatus, said repeater accepting the calls and registering the called party's number, switch means operated upon not receiving the identity of the calling station to signal said operator position for the services of an operator for obtaining the calling party's directory number verbally before completing the call, key pulsing means at said operator position operated by an operator to key the directory number of the calling subscriber into said repeater, circuit means in said repeater operated upon receipt of the calling party number to start said sending means to extend the call, circuit supervisory means in said repeater operated upon termination of a call to access said tabulating means whereby all of the data pertinent to the call is recorded therein.

3. In an automatic toll ticketing telephone system, a first exchange provided with first switching apparatus, toll ticketing equipment accessible from said switching apparatus and an operator position operatively associated with said toll ticketing equipment, a first incoming repeater, a second incoming repeater, a first subscriber's station identified by a plural digit directory number, a second exchange provided with second switching apparatus, a second subscriber station identified by a plural digit directory number, a third repeater in said second exchange, a first trunk line tying said third repeater from said second exchange to said first exchange through said first repeater to said toll ticketing equipment, the repeater in said second exchange accessible from said second switching equipment, a third exchange provided with third switching apparatus, a third subscriber station identified by plural digit directory number, a fourth repeater in said third exchange, a second trunk line tying said fourth repeater in said third exchange to said first exchange through said second repeater to said toll ticketing equipment, the fourth repeater in said third exchange acessible from said third switching equipment, a calling device at said first station for operating said first switching apparatus to extend the connection from said first station to said toll ticketing equipment, and means in said ticketing equipment controlled by said first station calling device for registering therein the directory number of the calling party station and the called party directory number, other means operated responsive to the registration to further extend said connection from the toll ticketing equipment to said called station and including timing means to time the duration of said call, relay means in said toll ticketing equipment operated to disable its own detecting means and to operate other circuit means to receive the calling party identification information from said second branch exchange through said first repeater and first trunk line in a one or two marking four element code form simultaneously with the dialling of called party directory number into the toll ticketing equipment, and to thereafter operate the timing means to time the duration of said call, said toll ticketing equipment having means for receiving calls from said third exchange through said fourth repeater, said second trunk line and said second repeater to only register the called party's number from said third exchange, said toll ticketing equipment having a calling circuit means operated thereafter to signal said operator position to obtain the calling subscriber's directory number prior to completing the call, impulse sending means at said operator position and transfer means at said toll ticketing equipment operated upon signalling said operator position to operatively connect said impulse sending means to operate said toll ticketing equipment to register the calling party identity as pulsed in said third exchange and to thereafter extend said call and recording means operated upon termination of a call to make a record of all pertinent data relative to said call automatically.

4. In an automatic telephone system, a first exchange and a second exchange, toll ticketing equipment in said first exchange comprising a calling station identification detector and a toll ticketing repeater, an operator position operatively connected to said repeater, said toll ticketing repeater in said first exchange including a calling and called station directory number register and arranged to process toll calls from said second exchange and from its own exchange, first relay means operated upon seizure of said repeater to signal said detector to initiate the detection of the station identity of a calling subscriber in its own exchange when a toll call is originated therefrom, second means comprising a relay and rotary switch in said repeater operated in response to the first series of impulses received to count said pulses, said second means further operated upon counting ten pulses to condition said called station register means to register subsequent pulses, third means in said repeater operated upon access of said repeater from said second exchange to disable said second means and to condition said called station register means to register the called party's number and including first circuit means operated upon registration of the called number to signal said operator position, that the operator must orally obtain the calling party directory number, second circuit means in said repeater directly operated from said operator position to operate said calling station register, other means operated in response to the receipt of the calling party identity in said register to complete the call.

5. In an automatic telephone system, a first exchange, a second exchange and a third exchange including a repeater and a calling station detector, toll ticketing equipment in said first exchange comprising a calling station identification detector, a toll ticketing repeater, a second exchange incoming repeater and a third exchange incoming repeater operatively connected to said toll ticketing repeater and to said respective exchanges, an operator position operatively connected to said repeater, said toll ticketing repeater in said first exchange including a calling and called station directory number register and arranged to process toll calls from said second and third exchanges and from its own exchange, first relay means operated upon seizure of said repeater to signal said detector to initiate the detection of the station identity of a calling subscriber in its own exchange when a toll call is originated therefrom, second means comprising a relay and rotary switch in said repeater operated in response to the first series of impulses received to count said pulses, said second means further operated upon counting ten pulses to condition said called station register to register subsequent pulses, third means in said repeater operated upon access via said second exchange incoming repeater and upon access via said third exchange incoming repeater to disable said second means and condition said called station register to register the called party's number including first circuit means operated upon registration of the called number when accessed via said second exchange incoming repeater to signal said operator position, that the operator must orally obtain the calling party directory number, second circuit means in said toll ticketing repeater directly operated from said operator position to operate said calling station register, fourth means in said toll ticketing repeater operated upon seizure from said third exchange incoming repeater to record the calling subscriber's number as received in code from said third exchange incoming repeater, other means operated in response to the receipt of the calling party identity in said register to complete the call.

6. In an automatic telephone system, a first exchange, a second exchange and a third exchange including a repeater and a calling station detector, toll ticketing equipment in said first exchange comprising a calling station identification detector, call timing means, a toll ticketing repeater, a second exchange incoming repeater and a third exchange incoming repeater operatively connected to said toll ticketing repeater and to said respective exchanges, an operator position operatively connected to said repeater, said toll ticketing repeater in said first exchange including a calling and called station directory number register and arranged to process toll calls from said second and third exchanges and from its own exchange, first relay means operated upon seizure of said repeater to signal said detector to initiate the detection of the station identity of a calling subscriber in its own exchange when a toll call is originated therefrom, second means comprising a relay and rotary switch in said repeater operated in response to the first series of impulses received to count said pulses, said second means further operated upon counting ten pulses to condition said called station register means to register subsequent pulses, third means in said repeater operated upon seizure from said second exchange incoming repeater and upon seizure from said third exchange incoming repeater to disable said second means and condition said called station register to accept and register the called party's number and including first circuit means operated upon registration of the called number when seized from said second exchange incoming repeater to signal said operator position that the operator must orally obtain the calling party directory number, second circuit means in said toll ticketing repeater directly operated from said operator position to operate said calling station register, fourth means in said toll ticketing repeater operated upon seizure from said third exchange incoming repeater and simultaneously with said third means to record the calling subscriber's number as received in code from said repeater and detector in said third exchange, other means operated in response to the receipt of the calling party identity in said register to extend the call, said timing means operated upon extension of a call to time its duration, recording means operated upon termination of a call to make a record including the called and calling numbers and the time duration of the call.

7. In an automatic toll ticketing telephone system, a first exchange, a second exchange and a third exchange including a repeater and a calling station detector, toll ticketing equipment in said first exchange comprising a calling station identification detector, call timing means, a toll ticketing repeater, a second exchange incoming repeater and a third exchange incoming repeater operatively connected to said toll ticketing repeater and to said respective exchanges, a plurality of operator positions, an allotter operable to connect said repeater to an available operator position, said toll ticketing repeater in said first exchange including a calling and called station directory number register and arranged to process toll calls from said second and third exchanges and from its own exchange, first relay means operated upon seizure of said repeater to signal said detector to initiate the detection of the station identity of a calling subscriber in its own exchange when a toll call is originated therefrom, second means comprising a relay and rotary switch in said repeater operated in response to the first series of impulses received to count said pulses, said second means further operated upon counting ten pulses to condition said called station register means to register subsequent pulses, third means in said repeater operated upon seizure from said second exchange incoming repeater and upon seizure from said third exchange incoming repeater to disable said second means and condition said called station register to accept and register the called party's number and including first circuit means operated upon registration of the called number when seized from said second exchange incoming repeater to operate said allotter means to select an available one of said plurality of operator positions and thereafter further operated to signal said operator position that the operator must verbally obtain the calling party directory number, second circuit means in said toll ticketing repeater directly operated from said operator position through said allotter means to operate said calling station register, fourth means in said toll ticketing repeater operated upon seizure from said third exchange incoming repeater and simultaneously with said third means to record the calling subscriber's number as received in code from said repeater and detector in said third exchange, other means operated in response to the receipt of the calling party identity in said register to extend the call, said timing means operated upon extension of a call to time its duration, recording means operated upon termination of a call to make a record including the called and calling numbers and the time duration of the call.

8. In an automatic toll ticketing telephone system, a first exchange provided with first switching apparatus, a plurality of toll ticketing equipment units accessible from said switching apparatus and an operator position accessible to each of said toll ticketing equipment units, a first incoming repeater, a second incoming repeater, a first subscriber's station identified by a plural digit directory number, a second exchange provided with second switching apparatus, a second subscriber station identified by a plural digit directory number, a third repeater in said second exchange, a first trunk line tying said third repeater from said second exchange to said first exchange through said first repeater, first allotter means operable to connect said first repeater to an available one of said toll ticketing equipment units, the repeater in said second exchange accessible from said second switching equipment, a third exchange provided with third switching apparatus, a third subscriber station identified by plural digit directory number, a fourth repeater in said third exchange, a second trunk line tying said fourth repeater in said third exchange to said first exchange through said second repeater, a second allotter means operable to connect said second repeater to an available one of said toll ticketing equipment units, the fourth repeater in said third exchange accessible from said third switching equipment, a calling device at said first station for operating said first switching apparatus to extend the connection from said first station to said toll ticketing equipment, and means in said ticketing equipment controlled by said first station calling device for registering therein the directory number of the calling party station and the called party directory number, other means operated responsive to the registration to further extend said connection from the toll ticketing equipment to said called station and including timing means to time the duration of said call, first relay means responsive to the operation of said first repeater to operate said first allotter means to operably seize an available one of said toll ticketing equipment units, means in said toll ticketing equipment unit when seized through said first allotter means operated to disable its own detecting means and to operate other circuit means to receive the calling party identification information from said second branch exchange through said first repeater and first trunk line in a one or two marking four element code form simultaneously with the dialling of called party directory number into the toll ticketing equipment, and to thereafter operate the timing means to time the duration of said call, second relay means responsive to the operation of said second repeater to operate said second allotter means to operably seize an available one of said toll ticketing equipment units, said toll ticketing equipment unit when seized through said second allotter means operated from said third exchange through said fourth repeater, said second trunk line and said second repeater to only register the called party's number from said third exchange, said toll ticketing equipment having a calling circuit means operated thereafter to signal said operator position to obtain the calling subscriber's directory number verbally prior to completing the call, impulse sending means at said operator position and transfer means at said seized toll ticketing equipment unit operated upon signalling said operator position to operatively connect said impulse sending means to said toll ticketing equipment, said impulse sending means operated at said operator position to operate said register means to register the calling party identity, other means operated in response to the receipt of the calling party identity in said register to extend the call, and recording means operated upon termination of the call to make a record of all pertinent data relative to the call automatically.

9. In an automatic toll ticketing telephone system, a first exchange provided with first switching apparatus, a plurality of toll ticketing equipment units accessible from said switching apparatus and a plurality of operator positions, an operator allotter operable to connect an available one of said operator positions to a toll ticketing equipment unit signalling for operator assistance, a first incoming repeater, a second incoming repeater, a first subscriber's station identified by a plural digit directory number, a second exchange provided with second switching apparatus, a second subscriber station identified by a plural digit directory number, a third repeater in said second exchange, a first trunk line tying said third repeater from said second exchange to said first exchange through said first repeater, first allotter means operable to connect said first repeater to an available one of said toll ticketing equipment units, the repeater in said second exchange accessible from said second switching equipment, a third exchange provided with third switching apparatus, a third subscriber station identified by plural digit directory number, a fourth repeater in said third exchange, a second trunk line tying said fourth repeater in said third exchange to said first exchange through said second repeater, a second allotter means operable to connect said second repeater to an available one of said toll ticketing equipment units, the fourth repeater in said third exchange accessible from said third switching equipment, a calling device at said first station for operating said first switching apparatus to extend the connection from said first station to said toll ticketing equipment, and means in said ticketing equipment controlled by said first station calling device for registering therein the directory number of the calling party station and the called party directory number, other means operated responsive to the registration to further extend said connection from the toll ticketing equipment to said called station and including timing means to time the duration of said call, first relay means responsive to the operation of said first repeater to operate said first allotter to operably seize an available one of said toll ticketing equipment units, means in said toll ticketing equipment unit when seized through said first allotter means operated to disable its own detecting means and to operate other circuit means to receive the calling party identification information from said second branch exchange through said first repeater and first trunk line in a one or two marking four element code form simultaneously with the dialling of called party directory number into the toll ticketing equipment, and to thereafter operate the timing means to time the duration of said call, second relay means responsive to the operation of said second repeater to operate said second allotter means to operably seize an available one of said toll ticketing equipment units, said toll ticketing equipment unit when seized through said second allotter means operated from said third exchange through said fourth repeater, said second trunk line and said second repeater to only register the called party's number from said third exchange, said toll ticketing equipment having a calling circuit means operated to operate said operator allotter to connect said repeater to an available one of said operator positions and thereafter to signal said available one of operator positions to obtain the calling subscriber's directory number verbally prior to completing the call, impulse sending means at s aid operator position and transfer means at said seized toll ticketing equipment unit operated upon signalling said operator position to operatively connect said impulse sending means to said toll ticketing equipment, said impulse sending means operated at said operator position to operate said register means to register the calling party identity, other means operated in response to the receipt of the calling party identity in said register to extend the call, and recording means operated upon termination of a call to make a record of all pertinent data relative to the call automatically.

References Cited in the file of this patent

UNITED STATES PATENTS

| | | |
|---|---|---|
| 2,535,510 | Ostline | Dec. 26, 1950 |
| 2,569,650 | Balzer et al. | Oct. 2, 1951 |
| 2,688,658 | Carpenter et al. | Sept. 7, 1954 |
| 2,782,257 | Blashfield et al. | Feb. 19, 1957 |
| 2,848,543 | Breed et al. | Aug. 19, 1958 |